US010089690B1

(12) United States Patent
Radha

(10) Patent No.: US 10,089,690 B1
(45) Date of Patent: Oct. 2, 2018

(54) METHOD IMPLEMENTING DATA ROW IDENTIFIER CONSTRUCTS TO ASSIST IN CONNECTING DISPARATE NON-RELATIONAL TABULAR DATABASES WHEN CONSTRUCTING AN ENHANCED EQUITY INDEX AND IN ORDER TO ESTABLISH THE ENHANCED INDEXES REPOSITORY

(71) Applicant: Sailesh S Radha, Blythewood, SC (US)

(72) Inventor: Sailesh S Radha, Blythewood, SC (US)

(73) Assignee: INTERMARKET RESEARCH AND ANALYTICS LLC (IMRA LLC), Blythewood, SC (US)

( * ) Notice: Subject to any disclaimer, the term of this patent is extended or adjusted under 35 U.S.C. 154(b) by 238 days.

(21) Appl. No.: 15/047,680

(22) Filed: Feb. 19, 2016

Related U.S. Application Data

(63) Continuation-in-part of application No. 14/148,352, filed on Jan. 6, 2014, now abandoned.

(51) Int. Cl.
*G06Q 40/00* (2012.01)
*G06Q 40/06* (2012.01)
*G06F 17/30* (2006.01)

(52) U.S. Cl.
CPC ......... *G06Q 40/06* (2013.01); *G06F 17/3053* (2013.01); *G06F 17/30321* (2013.01)

(58) Field of Classification Search
CPC ......... G06Q 40/00; G06Q 40/04; G06Q 40/06
See application file for complete search history.

(56) References Cited

U.S. PATENT DOCUMENTS

| | | | |
|---|---|---|---|
| 8,533,089 B1* | 9/2013 | Renshaw ............... | G06Q 40/06 705/36 R |
| 8,694,402 B2* | 4/2014 | Arnott ................... | G06Q 40/04 705/35 |
| 2014/0279693 A1* | 9/2014 | Roy ....................... | G06O 40/06 705/36 R |
| 2014/0317019 A1* | 10/2014 | Papenbrock ........... | G06Q 40/06 705/36 R |

* cited by examiner

*Primary Examiner* — Lalita M Hamilton

(57) ABSTRACT

Provided are a method, a technology apparatus and a database scheme that enable the tying of disparate, non-relational, tabular inputs and staging databases residing on flat files in order to automatically rank and weight all sub-indexes of a pre-determined type that constitute a pre-determined market-weighted, broad-based index universe or benchmark using a plurality of enriched comparative value factors, growth factors and correlation factors, to generate an enhanced equity index and/or a singular semi-active portfolio constructed of long-only, passive equity ETFs tracking the sub-indexes. The method also provides for data row identifier constructs, which along with the date values help link the non-relational tabular databases not residing on a commercially available Relational Database Management System (RDBMS) like Oracle or DB2 to form an integrated, unitary logical relational database enabling the creation of enhanced indexes repository with reduced utilization of CPU and I/O resources.

20 Claims, 19 Drawing Sheets

| TABULAR REPRESENTATION FOR DATA 01 | DATE | IDENTIFIER | VALUE FACTORS |
|---|---|---|---|
| | JAN-96 | PARENT INDEX | |
| | FEB-96 | PARENT INDEX | |
| | .. | PARENT INDEX | |
| | .. | PARENT INDEX | |
| | LATEST AVAILABLE MONTH | PARENT INDEX | |
| | JAN-96 | SUBINDEX1 | |
| | FEB-96 | SUBINDEX1 | |
| | .. | SUBINDEX1 | |
| | .. | SUBINDEX1 | ←75 |
| | LATEST AVAILABLE MONTH | SUBINDEX1 | |
| | JAN-96 | SUBINDEX2 | |
| | FEB-96 | SUBINDEX2 | |
| | .. | SUBINDEX2 | |
| | .. | SUBINDEX2 | |
| | LATEST AVAILABLE MONTH | SUBINDEX2 | |
| | .. | .. | |
| | .. | .. | |
| | JAN-96 | SUBINDEXN | |
| | FEB-96 | SUBINDEXN | ←97 |
| | .. | SUBINDEXN | |
| | .. | SUBINDEXN | |
| | LATEST AVAILABLE MONTH | SUBINDEXN | |

↑77  ↑87

| TABULAR REPRESENTATION FOR DATA 02 | IDENTIFIER | GROWTH FACTORS | CORRELATION FACTORS |
|---|---|---|---|
| | SUBINDEX1 | | |
| | SUBINDEX2 | | |
| | SUBINDEX3 | | |
| | SUBINDEX4 | | |
| | SUBINDEX5 | | ←375 |
| | SUBINDEX6 | | |
| | SUBINDEX7 | | |
| | .. | | |
| | .. | | |
| | .. | | ←397 |
| | SUBINDEXN | | |

| TABULAR REPRESENTATION OF ENRICHMENT FACTORS DATABASE | IDENTIFIER | ENRICHED COMPARATIVE VALUE FACTORS | GROWTH FACTORS | CORRELATION FACTORS |
|---|---|---|---|---|
| | SUBINDEX1 | | | |
| | SUBINDEX2 | | | |
| | SUBINDEX3 | | | |
| | SUBINDEX4 | | | |
| | SUBINDEX5 | | | |
| | SUBINDEX6 | | | |
| | SUBINDEX7 | | | |
| | .. | | | |
| | .. | | | |
| | .. | | | |
| | SUBINDEXN | | | |

→ 575
→ 597
→ 577   → 581   → 587

| TABULAR REPRESENTATION FOR DATA 03 | TRACKING INDEX | ETF TICKER | ETF PROVIDER | ETF DESCRIPTION |
|---|---|---|---|---|
| | SUBINDEX1 | | | |
| | SUBINDEX2 | | | |
| | SUBINDEX3 | | | |
| | SUBINDEX4 | | | |
| | SUBINDEX5 | | | |
| | SUBINDEX6 | | | |
| | SUBINDEX7 | | | |
| | .. | | | |
| | .. | | | |
| | .. | | | |
| | SUBINDEXN | | | |

SCHEMATIC REPRESENTATION OF A DATA ROW IDENTIFIER CONSTRUCT USED TO LINK DISPARATE TABULAR DATABASES

SCHEMATIC REPRESENTATION OF A DATA ROW IDENTIFIER CONSTRUCT USED TO LINK DISPARATE TABULAR DATABASES

SCHEMATIC REPRESENTATION OF A DATA ROW IDENTIFIER CONSTRUCT USED TO LINK DISPARATE TABULAR DATABASES

| DATE | IDENTIFIER | VALUE FACTORS ||||||
|------|-----------|----------------------------------|------------------------------------------|---------------------------------------|--------------------------------------------------|-----------------------------|----------------------------------|
|      |           | TRAILING PRICE-TO-EARNINGS RATIO | TRAILING ENTERPRISE-VALUE-TO-EBITDA RATIO | TRAILING ENTERPRISE-VALUE-TO-EBIT RATIO | FWD. ENTERPRISE-VALUE-TO-EBITDA RATIO | FWD. PRICE-TO-SALES RATIO | FWD. PRICE-TO-CASH-FLOW RATIO |
| 1/31/1999 | MXWDU.M3TW | ... | ... | ... | ... | ... | ... |
| 1/31/1999 | MXWDU.MXAT | ... | ... | ... | ... | ... | ... |
| 1/31/1999 | MXWDU.MXZA | ... | ... | ... | ... | ... | ... |
| 2/28/1999 | MXWDU.M3TW | ... | ... | ... | ... | ... | ... |
| 2/28/1999 | MXWDU.MXZA | ... | ... | ... | ... | ... | ... |
| 5/31/2005 | MXWDU.M3TW | ... | ... | ... | ... | ... | ... |
| 5/31/2005 | MXWDU.MXZA | ... | ... | ... | ... | ... | ... |
| 8/31/2015 | MXWDU.MXZA | ... | ... | ... | ... | ... | ... |
| 1/31/1999 | MXWD.M3TW | ... | ... | ... | ... | ... | ... |
| 1/31/1999 | MXWD.MXZA | ... | ... | ... | ... | ... | ... |
| 8/31/2015 | MXWD.M3TW | ... | ... | ... | ... | ... | ... |
| 8/31/2015 | MXWD.MXZA | ... | ... | ... | ... | ... | ... |
| 1/31/1999 | INDEXN.SUBINDEX1 | | | | | | |
| 8/31/2015 | INDEXN.SUBINDEXN | | | | | | |

REPRESENTATION OF TABULAR VALUE FACTORS DATABASE (100)

FIG. 12

| DATE | IDENTIFIER | ENRICHED COMPARATIVE VALUE FACTORS | | | | | |
|---|---|---|---|---|---|---|---|
| | | ENR. COMP. TRL. PRICE-TO-EARNINGS RATIO | ENR. COMP. TRL. ENTERPRISE-VALUE-TO-EBITDA RATIO | ENR. COMP. TRL. ENTERPRISE-VALUE-TO-EBIT RATIO | ENR. COMP. FWD. ENTERPRISE-VALUE-TO-EBITDA RATIO | ENR. COMP. FWD. PRICE-TO-SALES RATIO | ENR. COMP. FWD. PRICE-TO-CASH-FLOW RATIO |
| 1/31/1999 | MXWDU.M3TW | ... | ... | ... | ... | ... | ... |
| 1/31/1999 | MXWDU.MXZA | ... | ... | ... | ... | ... | ... |
| 2/28/1999 | MXWDU.M3TW | ... | ... | ... | ... | ... | ... |
| 2/28/1999 | MXWDU.MXZA | ... | ... | ... | ... | ... | ... |
| 8/31/2015 | MXWDU.M3TW | ... | ... | ... | ... | ... | ... |
| 8/31/2015 | MXWDU.MXZA | ... | ... | ... | ... | ... | ... |
| 1/31/1999 | MXWD.M3TW | ... | ... | ... | ... | ... | ... |
| 1/31/1999 | MXWD.MXZA | ... | ... | ... | ... | ... | ... |
| 8/31/2015 | MXWD.MXZA | ... | ... | ... | ... | ... | ... |
| 1/31/1999 | INDEXN.SUBINDEX1 | ... | ... | ... | ... | ... | ... |
| 8/31/2015 | INDEXN.SUBINDEXN | ... | ... | ... | ... | ... | ... |

REPRESENTATION OF TABULAR ENRICHED FACTORS DATABASE (200)

FIG. 13

| DATE | IDENTIFIER | ENRICHED COMPARATIVE VALUE FACTOR SCORES ||| GROWTH FACTOR SCORES || CORRELATION FACTOR SCORES | COMBINED SCORE |
| | | ENRICHED TRAILING PRICE-TO-EARNINGS FACTOR SCORE | ENRICHED TRAILING ENTERPRISE-VALUE-TO-EBITDA FACTOR SCORE | ENRICHED TRAILING ENTERPRISE-VALUE-TO-EBIT FACTOR SCORE | 12-M FWD. EPS GROWTH FORECAST FACTOR SCORE | GDP GROWTH FWD. 12 MTHS. FACTOR SCORE | AVG. 7-YR CORR. FACTOR SCORE | |
|---|---|---|---|---|---|---|---|---|
| 1/31/1999 | MXWDU.M3TW | ... | ... | ... | ... | ... | ... | ... |
| 1/31/1999 | MXWDU.MXZA | ... | ... | ... | ... | ... | ... | ... |
| 2/28/1999 | MXWDU.M3TW | ... | ... | ... | ... | ... | ... | ... |
| 2/28/1999 | MXWDU.MXMX | ... | ... | ... | ... | ... | ... | ... |
| 2/28/1999 | MXWDU.MXTR | ... | ... | ... | ... | ... | ... | ... |
| 5/31/2005 | MXWDU.M3TW | ... | ... | ... | ... | ... | ... | ... |
| 5/31/2005 | MXWDU.MXZA | ... | ... | ... | ... | ... | ... | ... |
| 8/31/2015 | MXWDU.MXZA | ... | ... | ... | ... | ... | ... | ... |
| 1/31/1999 | MXWD.M3TW | ... | ... | ... | ... | ... | ... | ... |
| 1/31/1999 | MXWD.MXZA | ... | ... | ... | ... | ... | ... | ... |
| 2/28/1999 | MXWD.M3TW | ... | ... | ... | ... | ... | ... | ... |
| 5/31/2005 | MXWD.MXZA | ... | ... | ... | ... | ... | ... | ... |
| 8/31/2015 | MXWD.M3TW | ... | ... | ... | ... | ... | ... | ... |
| 8/31/2015 | MXWD.MXZA | ... | ... | ... | ... | ... | ... | ... |
| 8/31/2015 | INDEXN.SUBINDEXN | ... | ... | ... | ... | ... | ... | ... |

REPRESENTATION OF TABULAR FACTOR SCORES DATABASE (300)

FIG. 14

| DATE | IDENTIFIER | ENHANCED INDEX WEIGHTS |
|---|---|---|
| 1/31/1999 | EXNDU. M3TW | ... |
| 1/31/1999 | EXNDU. MXAT | ... |
| 1/31/1999 | EXNDU. MXZA | ... |
| 2/28/1999 | EXNDU. M3TW | ... |
| 2/28/1999 | EXNDU. MXAT | ... |
| 2/28/1999 | EXNDU. MXTR | ... |
| 2/28/1999 | EXNDU. MXZA | ... |
| 5/31/2005 | EXNDU. M3TW | ... |
| 5/31/2005 | EXNDU. MXAT | ... |
| 5/31/2005 | EXNDU. MXZA | ... |
| 8/31/2015 | EXNDU. M3TW | ... |
| 8/31/2015 | EXNDU. MXAT | ... |
| 8/31/2015 | EXNDU. MXZA | ... |

| DATE | IDENTIFIER | ENHANCED INDEX WEIGHTS |
|---|---|---|
| 1/31/1999 | EXMD. M3TW | ... |
| 1/31/1999 | EXMD. MXAT | ... |
| 1/31/1999 | EXMD. MXZA | ... |
| 8/31/2015 | EXMD. MXZA | ... |
| 1/31/1999 | INDEXN. SUBINDEX1 | ... |
| 1/31/1999 | INDEXN. SUBINDEX2 | ... |
| 1/31/1999 | INDEXN. SUBINDEXN | ... |
| 5/31/2015 | INDEXN. SUBINDEXN | ... |
| 5/31/2015 | INDEXN. SUBINDEXN | ... |
| 8/31/2015 | INDEXN. SUBINDEXN | ... |

REPRESENTATION OF TABULAR ENHANCED INDEX WEIGHTS DATABASE (500)

FIG. 15

| TRACKING INDEX | ETF TICKER | ETF PROVIDER | ETF DESCRIPTION |
|---|---|---|---|
| M3TW | EWT | BLACKROCK | ISHARES MSCI TAIWAN ETF |
| MXAE | UAE | BLACKROCK | ISHARES MSCI UAE CAPPED ETF |
| MXAT | EWO | BLACKROCK | ISHARES MSCI AUSTRIA INVESTABLE MKT |
| MXAU | EWA | BLACKROCK | ISHARES MSCI AUSTRALIA INDEX FUND |
| MXBE | EWK | BLACKROCK | ISHARES MSCI BELGIUM CAPPED ETF |
| MXPT | PGAL | BLACKROCK | GLOBAL X FTSE PORTUGAL 20 ETF |
| MXQA | QAT | BLACKROCK | ISHARES MSCI QATAR CAPPED ETF |
| MXRU | RBL | ALPS ADVISORS INC. | SPDR S&P RUSSIA |
| MXSE | EWD | BLACKROCK | ISHARES MSCI SWEDEN ETF |
| S5COND | XLY | ALPS ADVISORS INC. | CONSUMER DISCRETIONARY SELECT SECTOR SPDR |
| S5CONS | XLP | ALPS ADVISORS INC. | CONSUMER STAPLES SELECT SECTOR SPDR |
| S5ENRS | XLE | ALPS ADVISORS INC. | ENERGY SELECT SECTOR SPDR |
| S5FINL | XLF | ALPS ADVISORS INC. | FINANCIALS SELECT SECTOR SPDR |
| S5HLTH | XLV | ALPS ADVISORS INC. | HEALTHCARE SELECT SECTOR SPDR |
| S5INDU | XLI | ALPS ADVISORS INC. | INDUSTRIALS SELECT SECTOR SPDR |
| S5INFT | XLK | ALPS ADVISORS INC. | INFORMATION TECHNOLOGY SELECT SECTOR SPDR |
| S5MATR | XLB | ALPS ADVISORS INC. | MATERIALS SELECT SECTOR SPDR |
| S5UTIL | XLU | ALPS ADVISORS INC. | UTILITIES SELECT SECTOR SPDR |

REPRESENTATION OF TABULAR ETF DESCRIPTOR DATABASE (800)

FIG. 16

METHOD IMPLEMENTING DATA ROW IDENTIFIER CONSTRUCTS TO ASSIST IN CONNECTING DISPARATE NON-RELATIONAL TABULAR DATABASES WHEN CONSTRUCTING AN ENHANCED EQUITY INDEX AND IN ORDER TO ESTABLISH THE ENHANCED INDEXES REPOSITORY

CROSS-REFERENCE TO PRIOR APPLICATION

Ser. No. 14/148,352

BACKGROUND OF THE INVENTION

The following references are incorporated in their entirety in the present application: Equity Portfolio Management. Managing Investment Portfolios: A Dynamic Process, Thirds Edition, John L Maginn CFA Donald L. Tuttle CFA, Jerald E. Pinto, CFA, and Dennis W. McLeavey, CFA, editors; U.S. Pat. No. 7,987,130 B2; The Arithmetic of Active Management, William F Sharpe, 1991: http://www-.stanford.edu/~wfsharpe/art/active/active.htm; and The Loser's Game—Charles D Ellis (1975). *Financial Analysts Journal*, July/August 1975, Vol. 31, No. 4: 19-26. A Relational Model of Data for Large Shared Data Banks, E. F. Codd, 1970: http://www.seas.upenn.edu/~zives/03f/cis550/codd.pdf.

Note: In the entire discussion, when "traditional" is used to qualify index/sub-index, it refers to market-weighted form of equity index. When it's used to qualify ETF (Exchange Traded Fund), it refers to long-only, passive ETFs. "Index/sub-index" used throughout the discussion is the shortened representation for "equity price index/sub-index", and is done so for brevity alone. Similarly, "enhanced index" or "enhanced index universe" are used interchangeably in the discussion, as they are one and the same. This discussion pertains only to equity indexes, and therefore, the reference to the word "equity" is dropped as qualifier in many of the references to the word "index". The word "relational" used in the discussion are synonymous to the word "relational" used by Relational Database Management System (RDBMS) providers like IBM Inc. and Oracle Inc. to describe their database products DB2 and Oracle respectively. It is used with the same connotation as that used by E. F. Codd in describing a RDBMS. The words "non-relational" used in the discussion are antonymous to the word "relational" used by IBM Inc. and Oracle Inc. to describe their database products and by Codd in describing a RDBMS. "Data row identifier" used in the discussion can also be referred to as "row identifier". The embodiment of the invention discussed here uses only Bloomberg tickers for representing the indexes and sub-indexes, but tickers to represent the same used by data providers like Thomson Reuters, Compustat or Factset may also be used to implement the invention. Types of sub-indexes include and are not limited to—sector sub-indexes, industry group sub-indexes, industry sub-indexes, sub-industry sub-indexes, country sub-indexes, geographical region sub-indexes, economic region sub-indexes, style sub-indexes, market cap sub-indexes and cap-cum-style sub-indexes. The databases Value Factors Database, Enriched Factors Database, Factor Scores Database, Enhanced Index Weights Database and ETF Descriptor Database as described in the invention are non-relational and tabular, and they reside on flat files. However, the qualifiers "non-relational" and "tabular" are excluded in many instances when referring to the databases in the following text for sake of brevity.

The invention ostensibly relates to implementing a linking scheme that ties various disparate non-relational tabular inputs (factors) and staging databases when creating an enhanced equity index and its associated semi-active portfolio. The invention more precisely relates to a technology apparatus and a method for automatic generation of an enhanced equity index (and/or a singular, diversified semi-active equity portfolio) in an economical manner, in terms of cost as well as computer CPU and I/O utilization, from a pre-determined traditional, broad-based equity index universe or benchmark by linking various non-relational tabular databases housing the various inputs and other factors for the enhanced index creation including and not limited to Value Factors Database, Enriched Factors Database, Factor Scores Database, Enhanced Index Weights Database and ETF Descriptor Database using data row identifier constructs. The associated semi-active portfolio based on the enhanced index can be used to create a closed-end fund, a separately managed account, or a unit investment trust. Furthermore, the enhanced index may be used as the basis for creating a passive index tracking fund like an ETF or a mutual fund. The enhanced index or semi-active portfolio may also be used by top-down active portfolio managers as a benchmark or a model portfolio to further enhance and create low-expense active equity portfolios. The semi-active portfolio can be used to fill in gaps and further diversify "complete" active portfolios of stocks, bonds or separately managed accounts in a core-satellite approach, as part of an investor's overall investment profile and diversification strategy.

The invention, while outwardly deploying an automated method to generate an enhanced index, underlines a process and a system that improves database technology for interconnecting disparate non-relational tabular inputs and staging databases, which are not housed in a Relational Database Management System (RDBMS) like DB2 or Oracle. Automated methods to generate an enhanced index and/or a semi-active portfolio are inherently entrenched in RDBMS like DB2, Oracle or SQL Server. However, the invention sets up a special database scheme that ties disparate inputs and staging tabular databases residing on "flat files", sourced from different data providers with disparate data formats and disparate update frequencies, in such a manner that the method to automatically construct an enhanced index of a pre-determined type may also be expanded to generate an enhanced indexes repository of all conceivable enhanced indexes made from all conceivable sub-index types underlying all conceivable broad-based index universes/benchmarks using the various embodiments of the method. The invention sets up the enhanced index and the enhanced indexes repository in an optimal manner with reduced computer CPU and I/O utilization. The special database scheme can be seamlessly transferred to create enhanced indexes and the enhanced indexes repository on relational databases housed in a commercially available Relational Database Management System (RDBMS) like DB2 as well.

Flat file databases consist of single or multiple record-type formats, and come in flavors of fixed-length definitions and delimited. The simplest form of flat file is a standard text file and consists of a single record definition. The record or "row" (as commonly referred to) repeats from one to many times, with each successive row representing a common definition. Every row is made up of a horizontal list of fields and the same definition of the row can be applied to every row in the file, and if the fields are constant in length throughout the rows, the file can be deemed as a non-relational tabular database in nature for all purpose. Flat file databases are typically independent of each other or self-contained and therefore, no relationship can be enforced between tabular databases housed on different flat files. They also require no outside architecture to define or store the data for later interpretation. To access the structure of the data in a flat file and manipulate it, the file must be read in its entirety into the computer's memory. Upon completion of the database operations, the file is again written out in its entirety to the host's file system. In this stored mode the database is "flat", which means it has no structure for indexing and there are usually no structural relationships between the records and as well as between databases. The invention integrates disparate tables on flat file databases with fields (columns) of fixed length and rows of single record definition (one table per flat file) through data row identifier constructs in to an integrated, single (unitary) logical relational database, which follows the integrity rules—entity integrity and referential integrity—that govern commercially available Relational Database Management System (RDBMS) like DB2 or Oracle or SQL Server. Since the data row identifier constructs enforce the integrity rules—entity integrity and referential integrity—, the invention including the method to construct an enhanced index and the enhanced indexes repository can be implemented on RDBMS like DB2 or Oracle. By hosting tabular databases on flat files, SQL (Structure Query Language) need not be used to access individual data rows from tables.

In the broadest sense, equity investment strategies are classified as passive, active, or semi-active. In a passive investing approach, portfolio managers do not react to changes in capital market opportunities in constructing and managing their portfolios. Indexing is the most common approach in passive equity investing, and it refers to holding a basket of securities designed to replicate the returns of a specified index. In contrast, active portfolio managers respond to changing capital market expectations. Active management of a portfolio involves identifying securities, which the portfolio manager thinks will outperform the benchmark, and using them to construct a portfolio. In other words, active portfolio managers attempt to construct a risky portfolio that maximizes the reward-to-variability (Sharpe) ratio. In 1991, William F. Sharpe in his classic article "The Arithmetic of Active Management" argued that average investors cannot hope to beat an equity index. He said, "If active and passive management styles are defined in sensible ways, it must be the case that:
1) before costs, the return on the average actively managed dollar will equal the return on the average passively managed dollar; and
2) after costs, the return on the average actively managed dollar will be less than the return on the average passively managed dollar"

Similar sentiments were also expressed by Charles D. Ellis in his 1975 landmark tome "The Loser's Game", "Gifted, determined, ambitious professionals have come into investment management in such large numbers during the past 30 years that it may no longer be feasible for any of them to profit from the errors of all the others sufficiently often and by sufficient magnitude to beat the market averages".

Many historical performance studies have concurred with Sharpe and Ellis, and by and large they have reinforced the notion that the average active institutional portfolio fails to beat the relevant benchmark index in the long-run after adjusting for expenses. Compared to the average actively managed strategy, a well-managed index strategy with similar investment objectives has an edge due to its superior long-term performance, after adjusting for expenses, because of its relatively low portfolio turnover and management fees. Moreover, the low portfolio turnover essentially provides tax efficiency advantages vis-à-vis an active strategy.

In spite of the popularity of indexing, active equity investing still accounts for the overwhelming majority of equity assets managed. Indexing as an investment strategy is optimal in markets with high efficiency. However, in inefficient markets where price discovery has premium, active strategy is endorsed. But higher management fees and higher turnover can eat in to the active returns, i.e., returns in excess of benchmark returns. Higher information gathering expenses prevalent in those markets can make management fees exorbitant and thereby making active strategies unattractive. Falling in between the extremities of passive investing and active investing is the semi-active investing, also known as "enhanced index" or "risk-controlled active" strategy. Semi-active approach is used to design and manage well-diversified equity portfolios that perform better than their benchmark indexes without taking on much additional risk. The portfolio manager creates such a portfolio by making use of his investment perceptions while managing risk characteristics that are incompatible with them. Enhanced index strategies increase the portfolio tracking risk, i.e., variability of active returns, but the higher returns more than compensate for the risk. Semi-active equity investing strategy produces an equity portfolio that has a higher information ratio than that of an equity portfolio derived from an average active equity investing strategy with similar investment objectives, and does so in a cost effective manner. Information ratio is nothing but the mean of the active returns divided by tracking risk, and represents the efficiency of a portfolio's tracking risk in delivering active returns. In other words, semi-active portfolios try to extract active returns like active portfolios, but by keeping their risk as close to the benchmark, they are tracking, like passive portfolios.

BRIEF SUMMARY OF THE INVENTION

The present invention is a method and a technology apparatus that combines the best principles of active and passive equity investing to construct a semi-active portfolio: extracting alpha (excess return with respect to the benchmark) while controlling tracking risk and management expenses using enriched comparative value factors, growth factors and correlation factors that reside on non-relational tabular databases, housed in flat files, which are not governed by principles of Relational Database Management System (RDBMS) like IBM's relational database product DB2. The enhanced index (as well as its associated semi-active portfolio) construction is as such inherently feasible only on relational tabular databases governed by RDBMS like IBM's DB2 or Oracle. However, the present invention using data row identifier constructs allows for the construction of enhanced indexes and/or semi-active portfolios using tabular inputs (factors) and staging databases housed on flat files. In other words, the invention and the accompanying apparatus manufactures a well-diversified portfolio that generates active returns while following a traditional passive index strategy, which replicates the constituents of the benchmark index, limits portfolio turnover (relative to active strategy), restricts portfolio management expenses and maintains tax efficiency using tabular inputs and staging databases residing on flat files. The portfolio departs from the traditional index strategy in that it is more dynamic in management, as the weights of its constituents are determined using investment valuation techniques (described in the present invention elsewhere) unlike traditional indexes, which weight their constituents purely by market weight. The diversified portfolio can also operate in both efficient and inefficient markets in an economic fashion.

The invention sets up a special database scheme that ties disparate inputs and staging tabular databases (used to generate enhanced indexes) residing on "flat files", sourced from different data providers with disparate data formats and disparate update frequencies, in such a manner that the method to automatically construct an enhanced index of a pre-determined type may also be expanded to generate an enhanced indexes repository of all conceivable enhanced indexes made from all conceivable sub-index types underlying all conceivable broad-based index universes/benchmarks using the various embodiments of the method. The invention sets up the enhanced index and the enhanced indexes repository in an optimal manner with reduced computer CPU and I/O utilization and without having to use SQL. The apparatus as specified in the invention is a computer organization (see FIG. 1), which is made of elements—memory, processor and storage—and configured in such a manner that the system does not have a commercially available Relational Database Management System (RDBMS) product like DB2 or Oracle installed on it. Even if a RDBMS product exists on the system, the disparate non-relational tabular databases housed on flat files can utilize relational database engines without making use of relational database principles.

The special database scheme as defined in the invention and as depicted in FIG. 1 and FIG. 10 is a special integration of disparate non-relational tabular databases that would enable the invention, the method to generate the enhanced index, to be executed economically on flat file databases, which comes free with a computer. The special database scheme deploys data row identifier constructs (as seen in FIG. 11A thru FIG. 11D) that improve the "flat file" database technology and facilitate the creation of a commercial enhanced indexes repository, resulting in reduced processor utilization and I/O cycles while creating all the conceivable enhanced indexes (by various embodiments of the invention) that go in to the enhanced index repository. The commercial enhanced indexes repository also can be used by end users like portfolio managers and investors as an off-the-rack store for enhanced indexes and their constituent weights. The special database scheme consisting of the data row identifier constructs can also be seamlessly transferred to create the various enhanced indexes and the enhanced indexes repository using the tabular inputs and staging databases housed in a commercially available Relational Database Management System (RDBMS) like DB2 as well. The invention also enables creation of enhanced indexes and enhanced indexes repository by less sophisticated investors on computers without an installed RDBMS and without usage of SQL (Structured Query Language), provided they are able to obtain the requisite data inputs.

The present invention is centered on the feasibility of dissecting any traditional (market-weighted) broad-based index universe or benchmark into various types of traditional sub-indexes including and not limited to—sector sub-indexes, industry group sub-indexes, industry sub-indexes, sub-industry sub-indexes, country sub-indexes, geographical region sub-indexes, economic region sub-indexes, style sub-indexes, market cap sub-indexes and cap-cum-style sub-indexes. Sector, industry group, industry and sub-industry are the GICS (Global Industry Classification Standards) nomenclature for its various categories of industry classification developed by MSCI and S&P. The embodiments of the present invention are not solely limited to industry classification pioneered by MSCI and S&P, and so they can be extended to any industry classification system adopted by index providers, as for example the ICB (Industry Classification Benchmark) used by FTSE indexes or the NAICS (North American Industry Classification System). Similarly, all embodiments of the present invention can also be applied to any traditional, broad-based index and their associated types of sub-indexes irrespective of the regional classification, country classification, style classification or market cap classification methodology used by the broad-based index provider.

The current invention is also grounded on the thesis that weighted sum of the returns of all the sub-indexes (whose market weights bear 100% of the weight of the parent index) of a given type underlying a traditional, broad-based parent index could be greater than the returns of the entire broad-based index if the weights of the sub-indexes that they bear to the broad-based index are reconstituted, and summing to 100%, to be anything other than market weights. Therefore, the present invention comprising of the technology apparatus and software application invokes a method that generates weights so that the new weighted sum of the returns of all the sub-indexes (whose market weights total to 100% of the parent index) of a given type underlying a traditional, broad-based parent index may be greater than the returns of the entire parent index.

The present invention is a technology apparatus that executes the rules-based software application, which automatically ranks and weights traditional sub-indexes of a pre-determined type constituting a pre-determined traditional, broad-based index universe or benchmark (for example the MSCI's All Country World Index ex USA) without any active judgment. Though no active judgment is involved, the present invention embraces the doctrine of active equity investing through the deployment of an automated valuation process that makes use of enriched comparative value factors, growth factors and correlation factors. The automated valuation process assesses the sub-indexes of the pre-determined type on a plurality of enriched comparative value factors, growth factors, and correlation factors. The present invention deploys an investing strategy that has a passive character, too, as it tries to reconstitute the pre-determined index-universe by manipulating the weightings of the underlying sub-indexes of the pre-determined type through a repeatable and transparent quantitative process. The novelty of the current invention is that it views any traditional, broad-based equity index universe or benchmark to be composed of various types of sub-indexes and that the weights of all the traditional sub-indexes of a given type underlying the broad-based index can be reconstituted in order to generate an enhanced index with modified weights as defined in the invention that are other than market weights.

At least one embodiment of the present invention also comprises the enrichment method, which enhances the plurality of relative (comparative) value factors. The plurality of enriched comparative value factors along with their (statistical) properties may have utility as an assessment instrument that could be used by portfolio managers for formulating tactical allocation changes—across countries, geographical regions, economic regions, sectors, industries, styles, or market caps—to existing equity portfolios.

The technology apparatus of the present invention (see FIG. 1) consists of a system specially made of a powerful processor connected to a large memory and a storage medium housing non-relational tabular databases on flat files. The system is designed such that it does not have a Relational Database Management System like Oracle or DB2 installed on it. The software application of the present invention is a coupling of two sub-applications called the enrichment application (see FIG. 2 for application flow) and the portfolio builder application (see FIG. 3 for application flow).

The center piece of the present invention in all its embodiments is the enrichment method, deployed by the enrichment application (see FIG. 2 for application flow) and executed by the technology apparatus, that generates enriched comparative value factors on a selection date. The selection date is a date on which the end user, for example, a portfolio manager, executes the method to generate enriched comparative value factors in order to produce a semi-active portfolio or an enhanced index. The enrichment application comprises of the following steps:

a) enabling the end user of the computing system to pre-determine as of a selection date, market-weighted, broad-based index universe/benchmark and an underlying sub-index type with plural sub-indexes for creating a semi-active portfolio and/or an enhanced index, and a rolling time-period for computing the properties of enriched comparative value factors; and wherein market weights of plural sub-indexes underlying said broad-based index universe/benchmark of said sub-index type sum up to 100% of the market weight of said broad-based index universe;

b) receiving into a tabular database Value Factors Database, as of said selection date, current as well as historical values of plurality of value factors corresponding to said broad-based index universe/benchmark and each sub-index of said underlying plural sub-indexes;

c) computing using instructions stored in memory and said tabular Value Factors Database the plurality of relative value factors, including the most current as well as historical values, corresponding to each sub-index of said plural sub-indexes;

d) computing using instructions stored in memory and said tabular Value Factors Database a plurality of enriched comparative value factors from said plurality of relative value factors, the most current as well as historical values, corresponding to each sub-index of said plural sub-indexes;

e) creating a tabular database Enriched Factors Database, as of said selection date, with current as well as historical values of said plurality of enriched comparative value factors for each sub-index of said plural sub-indexes; and f) computing using instructions stored in memory and said tabular Enriched Factors Database mean, volatility, upper bound (sum of mean and volatility) and lower bound (difference of mean and volatility) for each enriched comparative value factor of said plurality of enriched comparative value factors, using said rolling time-period, for each sub-index of said plural sub-indexes.

In step (a) above, in accordance with at least one embodiment of the present invention, examples of a pre-determined traditional, broad-based equity index universe or benchmark include and are not limited to the following price indexes: MSCI All Country World Index (ACWI) excluding US, MSCI Emerging Markets Index, MSCI All Country Asia Index, MSCI All Country Europe Index, MSCI Emerging Latin America Index, MSCI EAFE Index, MSCI Pacific Index, MSCI All Country Asia Index ex Japan, MSCI World Index, MSCI World Index ex USA, S&P 500 Large Cap Index, S&P 400 Mid Cap Index and S&P 600 Small Cap Index. Taking the example of the MSCI All Country World Index (ACWI) ex USA as the traditional, broad-based index universe or benchmark, a pre-determined type of traditional sub-indexes underlying the broad-based index could be the sector type of sub-indexes that include: MSCI ACWI ex US Consumer Staples Sector Index, MSCI ACWI ex US Consumer Discretionary Sector Index, MSCI ACWI ex US Energy Sector Index, MSCI ACWI ex US Financials Sector Index, MSCI ACWI ex US Health Care Sector Index, MSCI ACWI ex US Industrials Sector Index, MSCI ACWI ex US Information Technology Sector Index, MSCI ACWI ex US Materials Sector Index, MSCI ACWI ex US Telecommunications Sector Index and MSCI ACWI ex US Utilities Sector Index. Another pre-determined type of traditional sub-indexes underlying the MSCI ACWI ex US Index could be the country sub-indexes that includes 23 developed country sub-indexes and 22 emerging country sub-indexes (according to the MSCI classification scheme) totaling 45 sub-indexes. Examples of developed country sub-indexes include and are not limited to: MSCI France Index, MSCI United Kingdom Index, MSCI Italy Index, MSCI Switzerland Index, MSCI Sweden Index and MSCI Finland Index. Examples of emerging country sub-indexes include and are not limited to: MSCI China Index, MSCI India Index, MSCI Brazil Index, MSCI Egypt Index, MSCI Poland Index and MSCI Mexico Index. The rolling time-period in terms of years to compute the properties of the plurality of enriched comparative value factors depends on the normal duration of a full stock market cycle and it varies from one country to another. The norm in any embodiment of the present invention is to use 7 or 10 full calendar years.

In step (b), in accordance with at least one embodiment of the present invention, the plurality of value factors residing on the tabular Value Factors Database include and are not limited to: trailing price-to-earnings ratio, trailing price-to-earnings-to-growth (PEG) ratio, trailing price-to-book-value ratio, trailing price-to-sales ratio, trailing-enterprise-value-to-ebitda ratio, trailing-enterprise-value-to-ebit ratio, trailing price-to-cash-flow ratio, forward price-to-earnings ratio, forward price-to-earnings-to-growth (PEG) ratio, forward price-to-book-value ratio, forward price-to-sales ratio, forward-enterprise-value-to-ebitda ratio, forward-enterprise-value-to-ebit ratio and forward price-to-cash-flow ratio. The tabular Value Factors Database receives current and historical data values of value factors, as of the selection date (the date of construction of the portfolio or enhanced index), corresponding to the broad-based index universe or benchmark and each sub-index of the plural sub-indexes outlined in step (a). The current and historical values of the plurality of value factors of the sub-indexes, say, for example, of the sector type, underlying the S&P 500 Index date from the middle of the 1990s. Similarly, the current and historical values of the plurality of value factors of most of the sub-indexes of the country type, underlying the MSCI All Country World Index ex USA date from the middle of the 1990s. In at least one embodiment of the present invention, the frequency of values received in to the tabular Value Factors database for example include and are not limited to: monthly (values as of end of last trading day of month), and weekly (values as of end of last trading day of week). For better elucidation, the framework of the present invention describes only the monthly frequency implementation of the computation of enriched comparative value factors.

In step (c), in accordance with at least one embodiment of the present invention, the plurality of relative value factors computed include and are not limited to: relative trailing price-to-earnings ratio, relative trailing price-to-earnings-to-growth (PEG) ratio, relative trailing price-to-book value ratio, relative trailing price-to-sales ratio, relative trailing enterprise-value-to-ebitda ratio, relative trailing enterprise-value-to-ebit ratio, relative trailing price-to-cash-flow ratio, relative forward price-to-earnings ratio, relative forward price-to-earnings-to-growth (PEG) ratio, relative forward price-to-book-value ratio, relative forward price-to-sales ratio, relative forward enterprise-value-to-ebitda ratio, relative forward enterprise-value-to-ebit ratio, and relative forward price-to-cash-flow ratio. For example, the relative trailing price-to-earnings ratio of MSCI France Index, a traditional sub-index of country type underlying the traditional, broad-based index MSCI ACWI ex US Index, can be computed as of end of last trading day of March 2013 by dividing its trailing price-to-earnings ratio that day (at the end of trading) by the corresponding trailing price-to-earnings ratio of the broad-based index universe or benchmark, which in this case is MSCI ACWI ex US Index. In at least one embodiment of the present invention, current and historical values of the plurality of relative value factors corresponding to each sub-index of the plural sub-indexes of a pre-determined type may be computed, adopting the methodology discussed above in connection with the example of MSCI France index in the computation of relative trailing price-to-earnings ratio, using the corresponding values of the plurality of value factors of the sub-indexes as well as that of the broad-based index universe or benchmark, whose frequency were identified in step (a).

In step (d), in accordance with at least one embodiment of the present invention, the plurality of enriched comparative value factors computed include and are not limited to: enriched comparative trailing price-to-earnings ratio, enriched comparative trailing price-to-earnings-to-growth (PEG) ratio, enriched comparative trailing price-to-book-value ratio, enriched comparative trailing price-to-sales ratio, enriched comparative trailing enterprise-value-to-ebitda ratio, enriched comparative trailing enterprise-value-to-ebit ratio, enriched comparative trailing price-to-cash-flow ratio, enriched comparative forward price-to-earnings ratio, enriched comparative forward price-to-earnings-to-growth (PEG) ratio, enriched comparative forward price-to-book-value ratio, enriched comparative forward price-to-sales ratio, enriched comparative forward enterprise-value-to-ebitda ratio, enriched comparative forward enterprise-value-to-ebit ratio and enriched comparative forward price-to-cash-flow ratio. For example, the enriched comparative trailing price-to-earnings ratio of MSCI France Index, a traditional sub-index of the country type underlying the traditional, broad-based index MSCI ACWI ex US Index, can be computed as of end of last trading day of March 2013 by dividing its relative trailing price-to-earnings ratio that day (at the end of trading) by the average of its monthly relative price-to-earnings ratios as computed at the end of last trading day of month for the trailing 36 calendar months. FIG. 5 is a graphical representation of the values of enriched comparative trailing price-to-earnings ratio and its associated properties of MSCI France Index. In at least one embodiment of the present invention, current and historical values of the plurality of enriched comparative value factors corresponding to each sub-index of the plural sub-indexes of a pre-determined type may be computed, adopting the methodology discussed above in connection with the example of MSCI France index in the computation of enriched comparative trailing price-to-earnings ratio, using the corresponding values of the plurality of relative value factors of the sub-indexes, whose frequency were identified in step (a).

In step (e), the current values as well as the historical values of the plurality of enriched comparative value factors corresponding to each sub-index of the plural sub-indexes identified in step (a) are inserted into tabular Enriched Value Factors Database.

In step (f), in accordance with at least one embodiment of the present invention, the properties of the plurality of enriched comparative value factors include and are not limited to: upper bound, lower bound and mean. The properties referred to here are the current values as of the selection data (the date of construction of the portfolio or enhanced index); the historical values are excluded in the computation. For example, the current mean, as of the selection date, of the enriched comparative trailing price-to-earnings ratio of MSCI France Index, which was computed and discussed above, is the average of its monthly enriched comparative trailing price-to-earnings ratios, as computed at the end of the last trading day of month, for the trailing 120 (or, alternatively, 84) calendar months spread across 10 (or, alternatively, seven) full calendar years. Similarly, the current volatility as of the selection date of the enriched comparative trailing price-to-earnings ratio of MSCI France index, is the standard deviation of its monthly enriched comparative trailing price-to-earnings ratios for the trailing 120 (or, alternatively, 84) calendar months spread across 10 (or, alternatively, seven) full calendar years. The upper bound of the enriched comparative trailing price-to-earnings ratio of MSCI France index is the sum of its mean (or otherwise the current mean) and volatility (or otherwise the current volatility), whereas the lower bound is computed by subtracting its volatility (or otherwise the current volatility) from its mean (or otherwise the current mean). The properties of the enriched comparative trailing price-to-earnings ratio of MSCI France Index are identified in FIG. 5 as: EC-TRL-PE-M (mean), EC-TRL-PE-UB (upper bound) and EC-TRL-PE-LB (lower bound).

The portfolio builder application (see FIG. 3 for application flow), on selection date, with the aid of the computational power of the technology apparatus, ranks and weights traditional sub-indexes of the pre-determined type underlying the broad-based index or benchmark, outlined in the enrichment application described above, by executing the following steps:

a) adding to said tabular Enriched Factors Database recited in database creating of step e of the enrichment application, current values of plurality of growth factors and correlation factors for each sub-index of said plural sub-indexes;

b) ranking each sub-index of said plural sub-indexes using instructions in memory and said tabular Enriched Factors Database by applying individually said plurality of enriched comparative value factors, growth factors and correlation factors and wherein the ranking measure used is selected from percentile ranking, quartile ranking, quintile ranking or Z-score ranking, and then loading their individual factor ranks (scores) to a database by creating the tabular Factor Scores Database;

c) deriving a combined score, using instructions in memory and said tabular Factor Scores Database, for each index of said plural sub-indexes by weighting (using pre-determined weights) their said individual factor ranks (scores) and then storing them in said tabular Factor Scores Database and;

d) computing enhanced index weights, using instructions stored in memory and said tabular Factor Scores Database, for each sub-index of said plural sub-indexes by using their said individual combined scores and the sum of said individual combined scores of said plural sub-indexes, and then storing said weights in a database by creating the tabular Enhanced Index Weights Database;

e) constructing using instructions in memory the enhanced index using said plural sub-indexes and their computed weights stored in said tabular Enhanced Index Weights Database;

f) receiving into a tabular ETF Descriptor Database attributes regarding pertinent long-only equity ETFs that passively track each sub-index of said plural sub-indexes, said attributes include ETF ticker, the sub-index tracked by said ETF ticker, name of the provider of said ETF ticker and a description of said ETF ticker;

g) identifying ETF securities for the target ETF portfolio using instructions in memory by looking up each sub-index of said plural sub-indexes, underlying said enhanced index, in said tabular Enhanced Index Weights Database against said tabular ETF Descriptor Database; and h) constructing using instructions stored in memory a target portfolio populated by using said ETF securities and using said weights of said plural sub-indexes, stored in tabular Enhanced Index Weights Database, as identified in step (d).

In step (a), during the initial run of the application, historical values (monthly or weekly, depending on the frequency the embodiment of the invention uses) of plurality of growth factors and correlation factors for each sub-index of said plural sub-indexes need to be added to the Enriched Factors Database as well. In step (b), in accordance with at least one embodiment of the present invention, each sub-index of the plural sub-indexes may be ranked individually by each of their current individual factors drawn from the plurality of enriched comparative value factors, growth factors and correlation factors stored in tabular Enriched Factors Database, by using for example and not limited to: percentile ranking method, quartile ranking method, quintile ranking method and z-score ranking method. The said factor ranks (scores) are added to a new tabular database Factor Scores Database. In the initial run of the application, each index of the said plural sub-indexes needs to be ranked at various periods (monthly or weekly, depending on the frequency the embodiment of the invention uses) historically as well.

In step (b), in accordance with at least one embodiment of the present invention, the plurality of enriched comparative value factors include and are not limited to: enriched comparative trailing price-to-earnings ratio, enriched comparative trailing price-to-earnings-to-growth (PEG) ratio, enriched comparative trailing price-to-book-value ratio, enriched comparative trailing price-to-sales ratio, enriched comparative trailing enterprise-value-to-ebitda ratio, enriched comparative trailing enterprise-value-to-ebit ratio, enriched comparative trailing price-to-cash-flow ratio, enriched comparative forward price-to-earnings ratio, enriched comparative forward price-to-earnings-to-growth (PEG) ratio, enriched comparative forward price-to-book-value ratio, enriched comparative forward price-to-sales ratio, enriched comparative forward enterprise-value-to-ebitda ratio, enriched comparative forward enterprise-value-to-ebit ratio and enriched comparative forward price-to-cash-flow ratio.

In step (b), in accordance with at least one embodiment of the present invention, the plurality of growth factors include and are not limited to: twelve-month forward EPS (earnings per share) growth forecast, long-term forward earnings growth rate, long-term historical EPS growth trend, average EPS growth for the trailing three years, average EPS growth for the trailing two years, EPS growth for the trailing 12 months, trailing 3-month return, trailing 6-month return, real gross domestic product (GDP) growth forecast for the next 12 months, average real gross domestic product (GDP) growth for the trailing three years, average real gross domestic product (GDP) growth for the trailing two years, real gross domestic product (GDP) growth for the trailing 12 months, 12-month change in the real US dollar exchange rate with other currencies and 12-month change in the nominal US dollar exchange rate with other currencies. The growth factors pertaining to a country as a whole are associated with those embodiments of the present invention that are used to rank country type of traditional sub-indexes underlying a traditional, broad-based index universe or benchmark.

In step (b), in accordance with at least one embodiment of the present invention, the plurality of correlation factors include and are not limited to: average correlation co-efficient of monthly returns for the trailing 3 years, 5 years or 7 years. For example, the average correlation co-efficient of monthly returns for the trailing 3 years or 36 months of S&P 500 Consumer Discretionary index, a sector type of sub-index, would be computed by averaging the correlations of its monthly returns over the prior 36 months with the corresponding monthly returns of each sub-index of the plural sub-indexes (excluding itself) of sector type underlying the broad-based S&P 500 Large-cap index comprising of S&P 500 Consumer Staples index, S&P 500 Energy index, S&P 500 Financials index, S&P 500 Industrials index, S&P 500 Health Care index, S&P 500 Information Technology index, S&P 500 Materials index, S&P 500 Telecommunications index and S&P 500 Utilities index.

In step (c), in accordance with at least one embodiment of the present invention, the combined score for each sub-index of the plural sub-indexes can be derived by, for example and not limited to: weight averaging (pre-determined weights) the individual factor ranks of each sub-index computed in step (b). The said combined scores of the said plural sub-indexes are then added to the tabular Factor Scores Database. In the initial run of the application, combined score for each index of the said plural sub-indexes needs to be derived for various periods (monthly or weekly, depending on the frequency the embodiment of the invention uses) historically as well.

In step (d), in accordance with at least one embodiment of the present invention, the weights of each sub-index of the plural sub-indexes in the new and enhanced index may be computed, from the individual combined scores determined in step (c), by, for example and not limited to: expressing the combined score of each sub-index of the plural sub-indexes as percentage of the sum total of the individual combined scores of all the sub-indexes. The said weights of the said plural sub-indexes in the new enhanced index are then added to the tabular Factor Weights Database. In the initial run of the application, the weights of each index of the said plural sub-indexes underlying the enhanced index needs to be computed for various periods (monthly or weekly, depending on the frequency the embodiment of the invention uses) historically as well.

The non-relational tabular Value Factors Database resides on a flat file with a single record definition across all its rows. Each row is made of a horizontal list of fields (columns) of constant length consisting of the row identifier, date field and the list of value factors as identified in para [00020]. The Value Factors Database is schematically represented in FIG. 4A (upper table) as well as in FIG. 12 for better elucidation. The non-relational tabular Enriched Factors Database resides on a flat file with a single record definition across all its rows. Each row is made of a horizontal list of fields (columns) of constant length consisting of the row identifier, date and the list of enriched comparative value factors, growth factors and correlation factors as identified in paras [00027], [00028] and [00029]. Various sections of the Enriched Factors Database are schematically represented in FIG. 4A (lower table), FIG. 4B (upper table) and as well as in FIG. 13 for better elucidation. One single schematic representation of Enriched Factors Database reflecting the enriched comparative value factors, growth factors and correlation factors on a single sheet of paper has been impossible for want of space. The non-relational tabular Enriched Factor Scores Database resides on a flat file with a single record definition across all its rows. Each row is made of a horizontal list of fields (columns) of constant length consisting of the row identifier, date and the various enriched comparative value factor scores, growth factor scores and correlation factor scores. The Factor Scores Database is schematically represented in FIG. 14 for better elucidation. The non-relational tabular Enhanced Index Weights Database resides on a flat file with a single record definition across all its rows. Each row is made of a horizontal list of fields (columns) of constant length consisting of the row identifier, date and the weights of the sub-indexes underlying the enhanced index. The Enhanced Index Weights Database is schematically represented in FIG. 15 for better elucidation. The non-relational tabular ETF Descriptor Database resides on a flat file with a single record definition across all its rows. Each row is made of a horizontal list of fields (columns) of constant length consisting of the row tracking index, ETF ticker, ETF provider and ETF description. The ETF Descriptor Database is schematically represented in FIG. 4B (lower part) as well as FIG. 16 for better elucidation.

The special database scheme as defined in the invention is depicted in FIG. 1 and it involves linking up the various disparate tabular inputs and staging databases—Value Factors Database, Enriched Factors Database, Factor Scores Database, Enhanced Index Weights Database and ETF Descriptor Database—used by the method of the invention to create an enhanced index (and/or a semi-active portfolio). Each unique row in the tabular databases—Value Factors Database, Enriched Factors Database, Factor Scores Database and Enhanced Index Weights Database—is identified (for selecting, updating, inserting and deleting) by a combination of data in the identifier and date columns of the databases, while each unique row in the tabular database ETF Descriptor Database is identified by the data in the tracking index column of the database. The data that feeds into the date column would be the date corresponding to the last trading day of the month, if the embodiment of the invention to create the enhanced index (universe) uses monthly data frequency or the last trading day of the week, if the embodiment of the method and invention to create the enhanced index (universe) uses weekly data frequency. The data row identifier constructs define the various ways the data in the identifier columns (and the tracking index column in the ETF Descriptor Database) in the various databases can be setup depending on the database and the type of row to which they impart unique identification to. FIG. 11A provides the schematic representation of a data row identifier construct, which defines the format of the data in the identifier column to identify rows associated with a sub-index underlying a broad-based index universe in tabular databases—Value Factors Database, Enriched Factors Database and Factor Scores Database. The rows associated with a sub-index underlying a broad-based index universe/benchmark by nature of the invention and its associated method would be seen only in all tabular databases other than the Enhanced Index Weights Database. FIG. 11B provides the schematic representation of a data row identifier construct, which defines the format of the data in the identifier column to identify rows associated with a broad-based index universe/benchmark in tabular database—Value Factors Database. The rows associated with a broad-based index universe/benchmark by nature of the invention and its associated method would be seen only in the tabular database—Value Factors Database. FIG. 11C provides the schematic representation of a data row identifier construct, which defines the format of the data in the identifier column to identify rows associated with a sub-index underlying an enhanced index (or index universe) in tabular database—Enhanced Index Weights Database. The rows associated with a sub-index underlying an enhanced index (or index universe) by nature of the invention and its associated method would be seen only in the tabular database Enhanced Index Weights Database. FIG. 11D provides the schematic representation of a data row identifier construct, which defines the format of the data in the tracking index column to identify unique data rows associated with a sub-index underlying an enhanced index universe or a broad-based index universe in tabular database—ETF Descriptor Database. When the data row identifier construct defined in FIG. 11A populates the identifier field of the Value Factors Database, Enriched Factors Database or Enriched Factor Scores Database, the identifier field along with the date field can be used to identify unique sub-index (underlying a broad-based index universe/benchmark) data rows in their respective databases. When the data row identifier construct defined in FIG. 11B populates the identifier field of the Value Factors Database, the identifier field along with the date field can be used to identify unique broad-based index universe/benchmark data rows in the Value Factors Database. When the data row identifier construct defined in FIG. 11C populates the identifier field of the Enhanced Index Weights Database, the identifier field along with the date field can be used to identify unique sub-index (underlying an enhanced index universe) data rows in the Enhanced Index Weights Database. When the data row identifier construct defined in FIG. 11D populates the tracking index field of the Enhanced Index Weights Database, the tracking index field can be used to identify unique sub-index (underlying an enhanced index universe/broad-based index universe) data rows in the ETF Descriptor Database.

Using the example of MSCI ACWI ex US (All Countries World Index ex US) Index, a broad-based index universe/benchmark, and the example of MSCI Brazil Index, a country type of sub-index, underlying the broad-based index universe, the concept of data row identifier as explained in para [00033] and FIG. 11A thru FIG. 11D can be elucidated further. The format of the data in the identifier column in tabular database Value Factors Database to identify rows associated with a broad-based index universe/benchmark MSCI ACWI ex US Index would be MXWDU.MXWDU as explained in FIG. 11B—the first part and second part of the construct are made of the Bloomberg ticker name of MSCI ACWI ex US Index separated by a period. The format of the data in the identifier column in tabular databases—Value Factors Database, Enriched Factors Database and Enriched Factor Scores Database—to identify rows associated with the country type of sub-index MSCI Brazil Index underlying the broad-based MSCI ACWI ex US Index would be MXWDU.MXBR as explained in FIG. 11A—the first part and second part of the construct are made of the Bloomberg ticker names of MSCI ACWI ex US and MSCI Brazil respectively, separated by a period. FIGS. 12 thru 14, the sample representations of tabular databases Value Factors Database, Enriched Factors Database and Enriched Factor Scores Database, highlight the data row identifier constructs that feed into the identifier columns of the databases as described above and as defined in FIGS. 11A thru 11B. The constructs along with the date columns of those databases help impart uniqueness to each row in those databases.

The format of the data in the identifier column in tabular database—Enhanced Index Weights Database—to identify rows associated with the country type of sub-index MSCI Brazil Index underlying the enhanced index universe derived from the broad-based MSCI ACWI ex US Index using underlying country type of sub-indexes would be EXWDU.MXBR as explained in FIG. 11C—the first part and second part of the construct are made of the Bloomberg ticker names of MSCI ACWI ex US with its leading character replaced by 'E' (representing the ticker name for the newly created enhanced index universe) and the Bloomberg ticker name of MSCI Brazil Index respectively, separated by a period. FIG. 15, the sample representation of tabular databases Enhanced Index Weights Database, highlights the data row identifier construct that feeds in to the identifier column of the database as described above and as defined in FIG. 11C. The construct along with the date column of the database help impart uniqueness to each row in the database.

The format of the data in the tracking index column in tabular database—ETF Descriptor Database—to identify unique data rows associated with sub-indexes of any type (country, sector or industry) like for example MSCI Brazil Index, a country type of sub-index, would be MXBR as explained in FIG. 11D—the Bloomberg ticker name of the sub-index, which in this case of the example is MSCI Brazil Index. FIG. 16, the sample representation of tabular database ETF Descriptor Database, highlights the data row identifier construct that feeds in to the tracking index column of the database as described above and as defined in FIG. 11D to impart uniqueness to each row in the database.

The ticker names representing the indexes and sub-indexes used in the data row identifier constructs described in the paragraphs above are not limited to Bloomberg tickers alone, but tickers to represent the same used by data providers like Thomson Reuters or Compustat may also be used to implement the invention.

The steps associated with the enrichment application identified in para [00018] and as summarized in FIG. 2 elucidate the computation of plurality of enriched comparative value factors for a pre-determined type of sub-indexes underlying a pre-determined broad-based index universe/benchmark. Similarly, the steps associated with the portfolio builder application identified in para [00025] and FIG. 3 elucidate the creation of an enhanced index (and/or semi-active portfolio) derived from a pre-determined type of sub-indexes underlying a pre-determined broad-based index universe/benchmark using the enriched comparative value factors derived from the enrichment application, growth factors and correlation factors. The various data row identifier constructs described in para [00032] thru [00036] that feed in to the identifier columns of the various tabular databases (for the case of tabular ETF Descriptor Database, it's the tracking index column) along with the date columns (for the tabular ETF Descriptor Database, the date column does not exist and so not used) of the databases enable to expand the method to generate plurality of enriched comparative value factors from a plurality of value factors (using current as well as historical values), as defined in the enrichment application, for a single type of plural sub-indexes underlying a given broad-based index universe/benchmark to all conceivable types of sub-indexes underlying all conceivable broad-based index universes/benchmarks The data row identifier constructs also enable to expand the creation of an enhanced index (universe) from a plurality of sub-indexes of a given type underlying a given broad-based index universe or a benchmark to a repository of all conceivable enhanced indexes derived from all conceivable types of sub-indexes underlying all conceivable broad-based index universes or benchmarks. The database linking scheme using data row identifier constructs as depicted in FIG. 10 and FIGS. 11A thru 11D, and as defined in the invention ties up the disparate non-relational tabular databases Value Factors Database, Enriched Factors Database, Factor Scores Database, Enhanced Index Weights Database and ETF Descriptor Database in to an integrated, singular (unitary) logical relational database without using indexes, primary keys and foreign keys, the key elements that make up a physical Relational Database Management System (RDBMS) like Oracle to enforce entity integrity and referential integrity. While the invention with all its embodiments is implemented on non-relational tabular databases residing on flat files, can be transitioned over to a RDMS as well without any obstacles, and in such a transition the integrated, unitary logical relational database would transform in to a unitary physical relational database with the addition of indexes, foreign keys and primary keys enforcing physically the entity integrity and the referential integrity of the underlying tables (or tabular databases).

The resulting portfolio can be used to create a closed-end fund, a separately managed account, or a unit investment trust. Furthermore, the enhanced index may be used as the basis for creating an index tracking fund like a traditional passive ETF or a mutual fund. The enhanced index or semi-active portfolio may also be used by top-down active portfolio managers as a benchmark or as a model portfolio to further enhance and create low-expense active equity portfolios. The semi-active portfolio can be used to fill in gaps and further diversify "complete" active portfolios of stocks, bonds or separately managed accounts in a core-satellite approach, as part of an investor's overall investment profile and diversification strategy. The plurality of enriched comparative value factors along with their statistical properties spawned by the present invention may have utility as an assessment instrument that could be used by portfolio managers for formulating tactical allocation changes—across countries, geographical regions, economic regions, sectors, industries, styles, or market caps—to existing equity portfolios.

BRIEF DESCRIPTION OF THE DRAWINGS

FIG. 4A. is the tabular representation of all the data inputs—data input 01 and data input 02, and the Enriched Factors Database (200) in the structure of FIG. 1.

FIG. 4B. is the tabular representation of data input 03 and Enriched Factors Database (200).

FIG. 12. is a sample representation of the structure of Tabular Value Factors Database (100).

FIG. 13. is a sample representation of the structure of Tabular Enriched Factors Database (200) and reflects only enriched comparative value factors, and not the growth factors and correlation factors for want of space.

FIG. 14. is a sample representation of the structure of Tabular Factor Scores Database (300).

FIG. 15. is a sample representation of the structure of Enhanced Index Weights Database (500).

FIG. 16. is a sample representation of the structure of Tabular ETF Descriptor Database (800).

DETAILED DESCRIPTION AND BEST MODE OF IMPLEMENTATION

Figure 1:
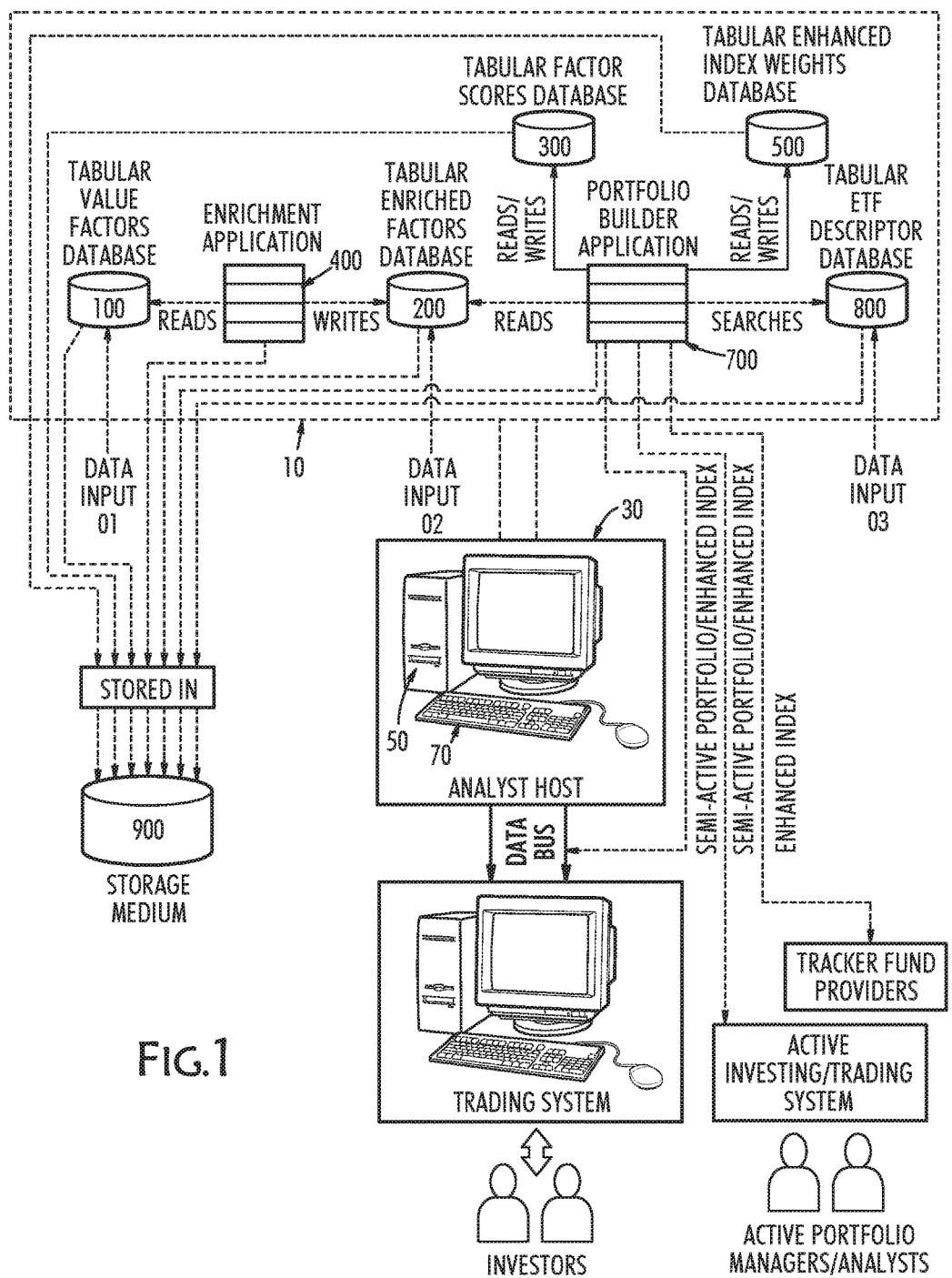
FIG. 1. is a schematic block diagram of the structure—the technology apparatus, software application and tabular databases—that embodies the present invention.

The present invention is a method and a technology apparatus that combines the best principles of active and passive equity investing to construct an enhanced index and/or a semi-active portfolio: extracting alpha (excess return with respect to the benchmark) while controlling tracking risk and management expenses using enriched comparative value factors, growth factors and correlation factors that reside on non-relational tabular databases, housed in flat files, which are not governed by principles of Relational Database Management System (RDBMS) like IBM's relational database product DB2. The enhanced index (as well as its associated semi-active portfolio) construction is as such inherently feasible only on relational tabular databases governed by RDBMS like IBM's DB2 or Oracle. However, the present invention using data row identifier constructs allows for the construction of enhanced indexes and/or semi-active portfolios using tabular inputs (factors) and staging databases housed on flat files. In other words, the new apparatus and invention manufactures a well-diversified portfolio that generates active returns while following a traditional, passive index strategy, which replicates the constituents of the equity benchmark, limits portfolio turnover (relative to active strategy), restricts portfolio management expenses and maintains tax efficiency. The portfolio departs from the traditional index strategy in that it is more dynamic in management than the traditional indexes as the weights of its constituents are determined using investment valuation techniques (described in the present invention elsewhere) unlike traditional indexes, which weight their constituents by market cap. The diversified equity portfolio can also operate in both efficient and inefficient markets in an economic fashion.

The major embodiment of the present invention, by adopting a quantitative allocation approach, produces an equity portfolio of traditional (long-only), passive ETFs (Exchange Traded Funds) of the same type. Examples of types of traditional passive ETFs include, but are not limited to: industry sector ETFs, industry ETFs, single country ETFs, investing style ETFs, market cap ETFs, cap-cum-style ETFs, economic region ETFs and geographical region ETFs. By generating a portfolio of traditional passive ETFs that track traditional, equity sub-indexes, of a pre-determined type, drawn from a pre-determined traditional, broad-based equity index universe or benchmark, the breadth of investment decisions utilized in managing the portfolio are limited, as the number of traditional sub-indexes of any type underlying any traditional, broad-based index are generally far less compared to the total number of stocks underlying the broad-based index. For example, the number of sectors (as per GICS industry classification) that are in existence for any pre-determined traditional broad index does not exceed 10. GICS is the Global Industry Classification Standards pioneered by MSCI and S&P. In fact, the other major index provider FTSE uses the Industrial Classification Benchmark (ICB) for its industry classification needs and it uses a different nomenclature scheme from the GICS, but its overall essence is still the same as that of GICS. Similarly, the number of countries in the developed and emerging worlds together under the country classification schemes of MSCI, S&P or FTSE, the major global index providers, is not more than 50. For example, MSCI All Country World Index excluding USA tracks more than 6000 stocks across the 10 GICS industry sectors, but they are domiciled across about 46 countries. Though limiting the constituents of the portfolio to traditional passive ETFs that tracks sub-indexes, of types discussed earlier, reduces the breadth aspect of the investment strategy, the present invention's method of enriching comparative (relative) value factors potentially raises the investment skill inherent in the automated semi-active investing strategy deployed by the present invention. The investment skill enhancement puts the present invention's semi-active investing strategy at least on par with average active equity investing strategies with similar investment objectives. The mean reversion property of the enriched comparative value factors, used in the present invention, has good performance prognostication capacity. The extremely high capital-markets forecast errors of average active equity portfolio managers who actively assess numerous constituents of a portfolio individually are virtually non-existent in the present invention.

The present invention enables portfolio managers and investors to produce semi-active equity portfolios with higher information ratio than that could be obtained by average active equity portfolios with similar investment objectives, and definitely so after factoring in expenses. Information ratio is nothing but the mean of the active returns divided by tracking risk, and represents the efficiency of a portfolio's tracking risk in delivering active returns. In other words, semi-active portfolios try to extract active returns like active portfolios, but by keeping their risk as close to the benchmark, they are tracking, like passive portfolios.

The invention also sets up a special database scheme that ties disparate inputs and staging tabular databases (used to generate enhanced indexes) residing on "flat files", sourced from different data providers with disparate data formats and disparate update frequencies, in such a manner that the method to automatically construct an enhanced index of a pre-determined type may also be expanded to generate an enhanced indexes repository of all conceivable enhanced indexes made from all conceivable sub-index types underlying all conceivable broad-based index universes/benchmarks using the various embodiments of the method. The invention sets up the enhanced index and the enhanced indexes repository in an optimal manner with reduced computer CPU and I/O utilization and without having to use SQL. The apparatus as specified in the invention is a computer organization (see FIG. 1), which is made of elements—memory, processor and storage—and configured in such a manner that the system does not have a commercially available Relational Database Management System (RDBMS) product like DB2 or Oracle installed on it. Even if a RDBMS product exists on the system, the disparate non-relational tabular databases housed on flat files can utilize relational database engines without making use of relational database principles.

As the number of ETFs offered in the marketplace has exploded, so has the number of traditional passive ETFs dedicated to sub-indexes of types as discussed in detail above. Even though ETFs are cheap, traditional ETFs that track traditional sub-indexes like sector ETFs, single country ETFs and so on are more expensive, in terms of expense ratios, than ETFs that track traditional, broad-based indexes. However, they are still cheaper than other equivalent active strategies. Additionally, they are also tax efficient due to low portfolio turnover.

The present invention, which is a rules-based technology apparatus and computer application, grounded in sound principles of portfolio management, quantitative financial theory and empirical evidence, has the capacity to produce a semi-active equity portfolio that has characteristics described in detail earlier. Quantitative investment strategies have also been reflected in U.S. Pat. No. 5,978,778 issued to O'Shaughnessy on Nov. 2, 1999, U.S. Pat. No. 5,132,899 issued to Fox on Jul. 21, 1992 and U.S. Pat. No. 8,346,649 issued to Waldron, et al.

Numerous consummate embodiments of the present invention are discussed in detail below. Even though particular implementations are discussed, one should be cognizant that this is done for illustration purposes alone. A person well-versed in investment and portfolio management can recognize the other elements and configurations, and they may be used without departing from the spirit and scope of the present invention.

The presently described embodiments relate largely to the technology apparatus, the software application, the method to generate enriched comparative value factors and the method to automatically rank and weight all traditional (market-weighted) plural sub-indexes of a pre-determined type that constitute a pre-determined traditional, broad-based equity index universe or benchmark, to generate an enhanced equity index and/or a singular, semi-active equity portfolio constructed of traditional (long-only), passive equity ETFs (Exchange Traded Funds) tracking the plural sub-indexes. The plural sub-indexes are automatically ranked and weighted by the present invention through using a plurality of enriched comparative value factors, growth factors, and correlation factors. The resulting semi-active equity portfolio and/or the enhanced index can be used as a benchmark to create other equity investment products. Active top-down portfolio managers can also apply applicable plurality of economic factors to the semi-active portfolio to engender a low-expense, actively managed top-down equity portfolio. The semi-active equity portfolio can be also be used to fill in gaps and further diversify existing "complete" portfolios (actively managed or passively managed) of stocks, bonds or separately managed accounts in a core-satellite approach, as part of an investor's overall investment profile and diversification strategy. The software application implemented by the present invention and executed by the technology apparatus comprises of two coupled automation systems: enrichment application and portfolio builder application. Enrichment application executed by the technology apparatus automates the generation of each factor of the plurality of enriched comparative value factors for each sub-index of the plural sub-indexes, of a pre-determined type, that constitute a pre-determined traditional, broad-based equity index universe or benchmark from current and historical values of their corresponding absolute value factors. The plurality of enriched comparative value factors, in addition to the plurality of growth factors and correlation factors, of the plural sub-indexes are subsequently deployed by the portfolio builder application (and executed by the technology apparatus) to rank and weight the plural sub-indexes in order to build an enhanced equity index and/or a semi-active equity portfolio made of long-only, passive ETFs tracking the plural sub-indexes. Overall, the rules based system comprising of the technology apparatus, the software application and the method of the present invention produces an equity portfolio that combines the best of active and passive equity investing to generate active returns with limited tracking risk (with respect to the benchmark) in an economical manner.

As used herein, a "traditional" index/sub-index or broad-based index universe/benchmark is: (1) a listing of stocks wherein each stock carrying a certain weight of the index forms a component of the index, (2) Weight of each stock is in the proportion that its market capitalization bears to the total market capitalization of all the component stocks identified in the index and (3) an arrangement reflecting the composite weighted price value of all the components in the index.

As used herein, a "traditional" ETF (Exchange Traded Fund) is an Exchange Traded Fund that is long-only and passively tracks an index as defined above.

As used herein, a "semi-active" equity portfolio is an equity portfolio that is built on a semi-active investing strategy, which seeks to outperform a given benchmark while limiting volatility around the benchmark's returns. In other words, semi-active portfolio is a well-diversified portfolio that generates active returns (portfolio returns excess of benchmark returns) while following a traditional passive index strategy, which replicates the constituents of the benchmark index, limits tracking risk (portfolio risk relative to the benchmark), limits portfolio turnover (relative to active strategy), restricts portfolio management expenses and maintains tax efficiency. The portfolio departs from the traditional index strategy in that it is more dynamic in management than the traditional indexes as the weights of its constituents are determined using fundamental investment valuation techniques including the enrichment method (described in the present invention elsewhere) unlike traditional passive indexes, which weight their constituents by market weights. Semi-active investing therefore is a variant of active investing that combines the principles of both active investing and passive investing. The semi-active strategy used herein adopts the form that is widely referred to in investment literature as "stock based".

In accordance with at least one embodiment of the present invention, the method and computer application of the presently described invention refers to traditional, broad-based equity index universe or benchmark as commercially available equity indexes that are only market weighted. Examples of broad-based indexes that can be used include, but are not limited to: FTSE All World Index, MSCI All Country World Index (ACWI) excluding US, FTSE Emerging Markets Index, MSCI Emerging Markets Index, MSCI All Country Asia Index, MSCI All Country Europe Index, MSCI Emerging Latin America Index, MSCI Emerging Asia Index, MSCI Emerging Europe, Middle East and Africa Index, MSCI EAFE Index, MSCI Pacific Index, MSCI All Country Asia Index ex Japan, MSCI All Country World Index, MSCI World Index, MSCI World Index ex USA, S&P 500 Large Cap US Index, S&P 400 Mid Cap US Index and S&P 600 Small Cap US Index. Pre-determining the broad-based equity index universe or benchmark is identified as part of step 410 of enrichment application 400 (see FIG. 2).

In accordance with at least one embodiment, the method of the present invention may start with at least one type of traditional plural sub-indexes underlying the traditional, broad-based equity index universe or benchmark. Pre-determining the sub-index type underlying the pre-determined index universe or benchmark is identified as part of step 410 of enrichment application 400 (see FIG. 2). Examples of types of plural sub-indexes that can be used include, but are not limited to—sector sub-indexes, industry group sub-indexes, industry sub-indexes, sub-industry sub-indexes, country sub-indexes, geographical region sub-indexes, economic region sub-indexes, style sub-indexes, market cap sub-indexes and cap-cum-style sub-indexes. Taking the example of the S&P 500 Index as the traditional, broad-based equity index universe or benchmark, a type of the traditional plural sub-indexes underlying the broad-based index can be the sector type of sub-indexes that include: S&P 500 Consumer Staples Sector Index, S&P 500 Consumer Discretionary Sector Index, S&P 500 Energy Sector Index, S&P 500 Financials Sector Index, S&P 500 Health Care Sector Index, S&P 500 Industrials Sector Index, S&P 500 Information Technology Sector Index, S&P 500 Materials Sector Index, S&P 500 Telecommunications Sector Index and S&P 500 Utilities Sector Index. Taking the example of the MSCI ACWI ex US Index as the traditional, broad-based index universe or benchmark, a type of traditional plural sub-indexes underlying the broad-based index can be the country type of sub-indexes that include: MSCI Australia Index, MSCI Austria Index, MSCI Belgium Index, MSCI Brazil Index, MSCI Canada Index, MSCI Chile Index, MSCI China Index, MSCI Columbia Index, MSCI Czech Republic Index, MSCI Denmark Index, MSCI Egypt Index, MSCI Finland Index, MSCI France Index, MSCI Germany Index, MSCI Greece Index, MSCI Hong Kong Index, MSCI Hungary Index, MSCI India Index, MSCI Indonesia Index, MSCI Ireland Index, MSCI Israel Index, MSCI Italy Index, MSCI Japan Index, MSCI Korea Index, MSCI Malaysia Index, MSCI Mexico Index, MSCI Netherlands Index, MSCI New Zealand Index, MSCI Norway Index, MSCI Peru Index, MSCI Philippines Index, MSCI Poland Index, MSCI Portugal Index, MSCI Qatar Index, MSCI Russia Index, MSCI Singapore Index, MSCI South Africa Index, MSCI Spain Index, MSCI Sweden Index, MSCI Switzerland Index, MSCI Taiwan Index, MSCI Thailand Index, MSCI Turkey Index, MSCI United Arab Emirates Index and MSCI United Kingdom Index.

Referring now to the FIG. 1, a computing system 30 comprises of at least a processor 50, at least a memory 10 and at least a keyboard 70. Memory 10 stores the tabular Value Factors Database (100), enrichment application (400), tabular Enriched Factors Database (200), tabular Factor Scores Database (300), tabular Enhanced Index Weights Database (500), portfolio builder application (700) and tabular ETF Descriptor Database (800). The first indexes database called the Value Factors Database identified as 100 receives data input (Data Input 01) using a computing system 30 (a conventional personal computer standing alone or connected to a server). The second indexes database called the Enriched Factors Database identified as 200 receives data input (Data Input 02) using a computing system 30 and also receives the output of enrichment application, which is identified as 400. The enrichment application (400) as well as the portfolio builder application (700) is executed sequentially by the processor 50 in order to carry out all steps in the method of the presently described invention. The third indexes database called the Factor Scores Database identified as 300 receives data as output of the portfolio builder application, which is identified as 700. The fourth indexes database called the Enhanced Index Weights Database identified as 500 receives data as output of portfolio builder application. Lastly, the ETF securities database called the ETF Descriptors Database identified as 800 receives data input (Data Input 03) using a computing system 30.

In at least one embodiment of the present invention, the method that constitutes the presently described invention and as depicted in FIG. 1 can be summarized into the following broad steps: 1. Population of the Value Factors Database (100), using data input (Data Input 01), with historical values (including current values) of the plurality of value factors of each sub-index of the plural sub-indexes, of the pre-determined type, underlying the pre-determined, broad-based equity index universe or benchmark and the broad-based index. 2. The translation of the historical values (including current values) of the plurality of value factors of each sub-index of the plural sub-indexes in database (100) into the corresponding current and historical values of plurality of enriched comparative value factors and their associated properties by the enrichment application (400). 3. Population of the Enriched Factors Database (200) with the current and historical values of plurality of enriched comparative value factors obtained as output from the enrichment application and the computation of their current associated properties of each sub-index of the plural sub-indexes by the enrichment application (400). 4. Appending the Enriched Factors Database (200) with current and historical values of the plurality of growth factors and correlation factors of each sub-index of the plural sub-indexes through data input (Data Input 02). 5. Ranking and weighting the plural sub-indexes using the plurality of factors in the Enriched Factors Database (200) by the portfolio builder application (700) to generate the enhanced index. Current and historical factor scores (ranks) and the combined score of each sub-index of the plural sub-indexes are added to the Factor Scores Database (300). Current and historical weights of each sub-index of the plural sub-indexes underlying the newly created enhanced index are added to the Enhanced Index Weights Database (500). 6. Matching each sub-index of the plural sub-indexes in the enhanced index with appropriate ETF securities from the ETF Descriptor Database (800), which is populated by data input (Data Input 03), to generate the semi-active portfolio.

Data may be manually entered into tabular database Value Factors Database 100 through-(1) keyboard 70 which is connected to the processor 50, (2) download from an internet server which is not shown in FIG. 1, or (3) data transfer from a local storage device which is not shown in FIG. 1. Table 75 in FIG. 4A is a tabular representation of data input Data Input 01. As you can see in FIG. 4A the data which is input (Data Input 01) to database 100 may include the names of, or representation of, the pre-determined, broad-based index universe or benchmark and the plural sub-indexes of the pre-determined type underlying the broad-based index universe or benchmark. The format of the names would follow the convention as outlined in the row identifier constructs that would be discussed in detail later in the specification (see paras [00134] thru [00137] and FIGS. 11A thru 11B). The format of the date would be of the format MM-DD-YYYY. Various embodiments of the present invention use the format MM/DD/YYYY. The listing of the names or representation of the plural sub-indexes is identified as 87 in table 75 of FIG. 4A. The listing of the names or representation of the plural sub-indexes identified as 87 is repeated depending on the adopted frequency of the historical values of the plurality of value factors of the plural sub-indexes. At least one embodiment of the present invention adopts the monthly frequency, identified as 77 in table 75 (see FIG. 4A), of the historical values. So, the listing in 87 may be repeated for every month since the beginning of the historical data, which for illustration purpose is listed as January of 1996 in 77 of table 75 (see FIG. 4A). The loading of database 100 with value factors is identified as step 420 in the application flow of enrichment application (400) as outlined in FIG. 2. The value factors in database 100 are used by the enrichment application (400) to translate the plurality of value factors of the pre-determined plural sub-indexes in to corresponding plurality of enriched comparative value factors.

In accordance with at least one embodiment of the present invention, the plurality of value factors, singularly identified as 97, that are characteristic of the indexes in database 100 include, but are not limited to: trailing price-to-earnings ratio, trailing price-to-earnings-to-growth (PEG) ratio, trailing price-to-book-value ratio, trailing price-to-sales ratio, trailing-enterprise-value-to-ebitda ratio, trailing-enterprise-value-to-ebit ratio, trailing price-to-cash-flow ratio, forward price-to-earnings ratio, forward price-to-earnings-to-growth (PEG) ratio, forward price-to-book-value ratio, forward price-to-sales ratio, forward-enterprise-value-to-ebitda ratio, forward-enterprise-value-to-ebit ratio and forward price-to-cash-flow ratio.

Trailing price-to-earnings ratio of an index is a valuation metric that can be calculated by dividing the last available price of the index by its trailing 12 months earnings per share (EPS) aggregate. The index earnings are calculated by summing up for each equity share in the index multiplied by its trailing 12 month earnings per share aggregate. Earnings used are before extra-ordinary items. This calculation may be performed by processor 50 using component values entered into database 100, and all such plurality of calculated trailing value factors may be stored in database 100. Alternatively, the plurality of calculated trailing value factors can be downloaded from webservers of third party data providers like Thomson Reuters, which relay I/B/E/S data, directly in to the database 100. Such pre-calculated trailing factors are singularly identified as 97 in table 75.

Trailing price-to-earnings-to-growth (PEG) ratio of an index is the product of trailing price-to-earnings of the index and the long-term historical EPS growth trend (see para [000109]).

Trailing price-to-book-value ratio of an index is a valuation metric that can be calculated by dividing its last available price of the index by the mean of its trailing 12 months weighted book value per share.

Trailing price-to-sales ratio of an index is a valuation metric that can be calculated by dividing the last available price of the index by its trailing 12 months sales per share aggregate. The index sales are calculated by summing up for each equity share in the index multiplied by its trailing 12 months sales per share aggregate.

Trailing enterprise-value-to-ebitda ratio of an index is a valuation metric that can be calculated by dividing the last available enterprise-value per share of the index by its trailing 12 months EBITDA per share aggregate. EBITDA per share, calculated by summing trailing 12 months EBITDA per share of the member companies times the shares in the index, divided by the index divisor.

Trailing enterprise-value-to-ebit ratio of an index is a valuation metric that can be calculated by dividing the last available enterprise-value per share of the index by its trailing 12 months EBIT per share aggregate. EBIT per share, calculated by summing trailing 12 months EBIT per share of the member companies times the shares in the index, divided by the index divisor.

Trailing price-to-cash-flow ratio of an index is a valuation metric that can be calculated by dividing the last available price of the index by its trailing 12 months cash flow per share aggregate. The index cash flow is calculated by summing up for each equity share in the index share multiplied by its trailing 12 months cash flow per share aggregate.

Forward price-to-earnings ratio of an index is a valuation metric that can be calculated by dividing the last available price of the index by the median of its forward 12 months (or 52 weeks) earnings per share (EPS) aggregate analyst estimates. The index forward earnings aggregate estimate is calculated by summing up for each equity share in the index multiplied by its forward 12 months (or 52 weeks) earnings per share aggregate estimate. For all purpose the plurality of pre-calculated forward value factors can be downloaded from webservers of third party data providers like Thomson Reuters, which relay I/B/E/S data, directly in to the database 100. Such plurality of forward value factors along with the trailing value factors are singularly identified as 97 in table 75.

Forward price-to-earnings-to-growth (PEG) ratio of an index is the product of forward price-to-earnings of the index and the long-term forward earnings growth rate (see para [000108]).

Forward price-to-book-value ratio of an index is a valuation metric that can be calculated by dividing the last available price of the index by the median of its forward 12 months weighted book value per share analyst estimates.

Forward price-to-sales ratio of an index is a valuation metric that can be calculated by dividing the last available price of the index by median of its forward 12 months (or 52 weeks) sales per share aggregate analyst estimates. The index sales are calculated by summing up for each equity share in the index multiplied by the forward 12 months (or 52 weeks) sales per share aggregate estimate.

Forward enterprise-value-to-ebitda ratio of an index is a valuation metric that can be calculated by dividing the last available enterprise-value per share of the index by its forward 12 months EBITDA per share aggregate estimate. EBITDA per share, calculated by summing forward 12 months EBITDA per share estimate of the member companies times the shares in the index, divided by the index divisor.

Forward enterprise-value-to-ebit ratio of an index is a valuation metric that can be calculated by dividing the last available enterprise-value per share of the index by its forward 12 months EBIT per share aggregate estimate. EBIT per share, calculated by summing forward 12 months EBIT per share estimate of the member companies times the shares in the index, divided by the index divisor.

Forward price-to-cash-flow ratio of an index is a valuation metric that can be calculated by dividing the last available price of the index by median of its forward 12 months (or 52 weeks) cash flow per share aggregate analyst estimates. The index cash flow estimate is calculated by summing up for each equity share in the index multiplied by the forward 12 months (or 52 weeks) cash flow per share aggregate estimate.

The plurality of enriched comparative value factors, growth factors and correlation factors used in the method of the present invention to rank the plural sub-indexes underlying the broad-based index or benchmark are their current (latest) values as of the selection date. The selection date is the day on which the method of the present invention is executed to rebalance existing portfolios or the enhanced index, or create from scratch portfolios or an enhanced index. However, the current values of the plurality of enriched comparative value factors are not determined solely by the selection date but equally by the frequency of historical values (inclusive of current values) of the plurality of value factors of the plural sub-indexes that may be received in to the database 100 for the computation of the plurality of enriched comparative value factors. For example, the frequency of historical values (inclusive of current values) of the plurality of value factors of the plural sub-indexes may include and are not limited to: monthly (values as of end of last trading day of month), and weekly (values as of end of last trading day of week). Therefore, depending on the frequency of the historical values of the plurality of value factors used in the computation of the plurality of enriched comparative value factors, the current values of the plurality of enriched comparative value factors as of a selection date may be—as of end of the last trading day of the previous week to the selection date (if the historical frequency of the value factors used is weekly), or as of end of the last trading day of the previous month to the selection date (if the historical frequency of the value factors used is monthly). For better elucidation and simplicity, the implementation of the present invention described here deals only with monthly frequency of historical values (including current values) of the plurality of value factors in the computation of the plurality of enriched comparative value factors. So, the values of the plurality of enriched comparative value factors, growth factors and correlation factors used in ranking the plural sub-indexes are their latest monthly values.

For example, the 45 sub-indexes of pre-determined type "country" underlying the broad-based MSCI All Country World Index ex USA and as well as the broad-based equity index can be used to form the data in the indexes database 100. A data entry person can make use of a table 75, or the like, to key in the data (Data Input 01) using keyboard 70 i.e. the data keyed through keyboard 70 is captured by processor 50 and loaded into database 100. Table 75 may include a listing, identified as 87, of each of the 45 sub-indexes as well as the parent broad-based index. The listing identified as 87 and as discussed earlier may be repeated for every month since the beginning of the historical data, which for illustration purpose is listed as January of 1996 in 77 of table 75. The calculation of value factors of the plural sub-indexes and the parent index may be performed by processor 50 using component values entered into database 100, and such plurality of calculated value factors, identified singularly as 97, may be stored in database 100 using a format similar to table 75. Alternatively, the plurality of pre-calculated value factors of the plural sub-indexes as well as the parent broad-based index can be downloaded from webservers of third party data providers like Thomson Reuters, which relay I/B/E/S data, directly in to the database 100 using the format of table 75 or can be keyed using the table format 75 through the keyboard 70 via the processor 50. Such pre-calculated value factors are singularly identified as 97 in table 75. The table below (see Table 1) is the reflection of table 75 adapted to illustrate an example. The value factors are then read in by the application 400. FIG. 12 is a sample representation of Value Factors Database like that represented by Table 1 below or by table 75 seen in FIG. 4A but it also reflects the data row identifier constructs that would be discussed later (see paras [00134] thru [00137] and FIGS. 11A thru 11B). FIG. 12 also gives a picture of how historical values of plurality of value factors of plural sub-indexes underlying a given broad-based index universe/benchmark as well as the broad-based index universe may be stored in the tabular Value Factors Database using the data row identifier constructs (as defined in FIGS. 11A and 11B) that populate the identifier field (column), and the date field (column) of the database. In Table 1 below, for sake of simplicity and clarification, the values in the identifier column are depicted in plain English. Similarly, it also exhibits how historical values of plurality of value factors of all conceivable types of sub-indexes underlying all conceivable broad-based index universes/benchmarks may be stored in the database and thereby enable the establishment of the enhanced indexes repository.

TABLE 1

| Month/Year | Identifier | Trailing Price-to-earnings Ratio | Trailing Price-to-book-value Ratio | Trailing Price-to-sales Ratio | Trailing Price-to-cash-flow Ratio | Forward Price-to-earnings Ratio | Forward Price-to-book-value Ratio | Forward Price-to-sales Ratio | Forward Price-to-cash-flow Ratio |
|---|---|---|---|---|---|---|---|---|---|
| January 1996 | MSCI ACWI ex USA | | | | | | | | |
| February 1996 | MSCI ACWI ex USA | | | | | | | | |
| — | — | | | | | | | | |
| May 2001 | MSCI ACWI ex USA | | | | | | | | |
| June 2001 | MSCI ACWI ex USA | | | | | | | | |
| — | — | | | | | | | | |
| December 2012 | MSCI ACWI ex USA | | | | | | | | |
| January 2013 | MSCI ACWI ex USA | | | | | | | | |
| January 1996 | MSCI Austria | | | | | | | | |
| February 1996 | MSCI Austria | | | | | | | | |
| — | — | | | | | | | | |
| May 2001 | MSCI Austria | | | | | | | | |
| June 2001 | MSCI Austria | | | | | | | | |
| — | — | | | | | | | | |
| December 2012 | MSCI Austria | | | | | | | | |
| January 2013 | MSCI Austria | | | | | | | | |
| — | — | | | | | | | | |
| — | — | | | | | | | | |
| January 1996 | MSCI Japan | | | | | | | | |
| February 1996 | MSCI Japan | | | | | | | | |
| — | — | | | | | | | | |
| May 2001 | MSCI Japan | | | | | | | | |
| June 2001 | MSCI Japan | | | | | | | | |
| — | — | | | | | | | | |
| December 2012 | MSCI Japan | | | | | | | | |
| January 2013 | MSCI Japan | | | | | | | | |
| — | — | | | | | | | | |
| — | — | | | | | | | | |
| January 1996 | MSCI United Kingdom | | | | | | | | |
| February 1996 | MSCI United Kingdom | | | | | | | | |
| — | — | | | | | | | | |
| May 2001 | MSCI United Kingdom | | | | | | | | |
| June 2001 | MSCI United Kingdom | | | | | | | | |
| — | — | | | | | | | | |
| December 12 | MSCI United Kingdom | | | | | | | | |
| January 13 | MSCI United Kingdom | | | | | | | | |

Figure 2:
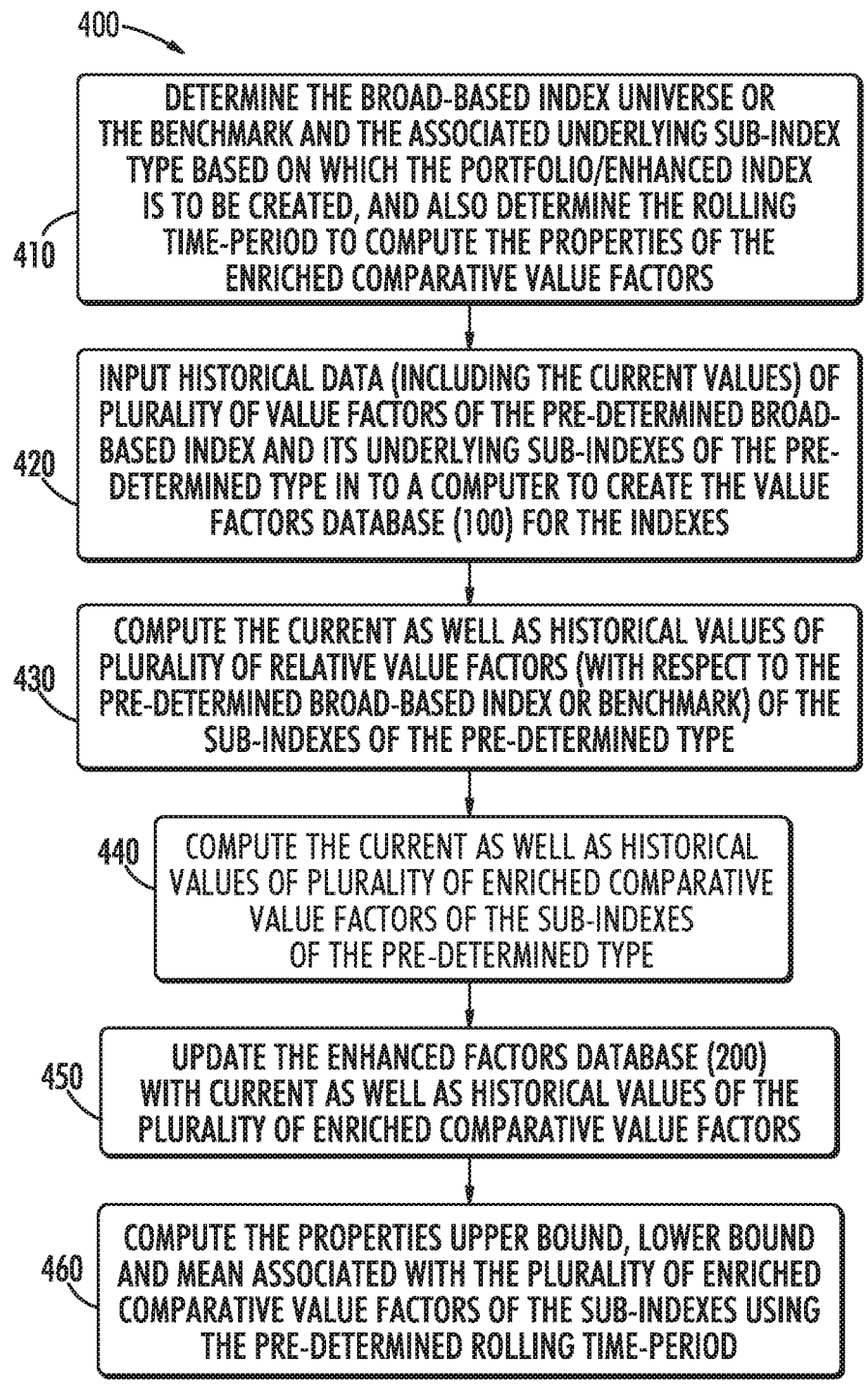
FIG. 2. is the schematic flow chart depicting the program flow of the software application "Enrichment Application" (400) in the structure of FIG. 1.

Referring again to FIG. 1, the enrichment application (400) is executed by processor 50, and the application's program flow is highlighted in FIG. 2 in accordance with at least one embodiment of the present invention. The center piece of the present invention in at least one of its embodiments is the enrichment method, deployed by the enrichment application and executed by the technology apparatus, which generates enriched comparative value factors.

Referring to FIG. 2, the flow of Enrichment application begins with step 410 by pre-determining the traditional, broad-based index universe or benchmark and its associated underlying traditional sub-index type on which the semi-active portfolio or an enhanced index is to be created. The pre-determination of the index-universe as well as the underlying index type has been in discussed in detail in an earlier section. The rolling time-period in terms of years to compute the properties of the plurality of enriched comparative value factors depends on the normal duration of a full stock market cycle and it varies from one country to another. In accordance with at least one embodiment, 10 full calendar years is used as the pre-determined rolling time-period to compute the properties of the plurality of enriched comparative value factors. In some embodiments, seven full calendar years may also be used.

Step 420 of enrichment application 400 handles population of Value Factors Database (100) and has been taken up in detail in an earlier section. The current as well as historical values of the plurality of relative value factors, of each sub-index of the plural sub-indexes of the pre-determined type underlying the pre-determined, broad-based index universe or benchmark, are computed using the corresponding current and historical values of plurality of value factors of each sub-index of the plural sub-indexes and the broad-based index universe or benchmark stored in database 100. Taking the example of MSCI All Country World Index ex USA as the broad-based index universe or benchmark, and using the country type of underlying plural sub-indexes, let's review in detail the computation of one of the plurality of relative value factors of MSCI Austria Index, one of the country type of sub-indexes underlying the MSCI All Country World Index ex USA. Specifically, let's take up the computation of relative trailing price-to-earnings ratio of the country index MSCI Austria. Referring to the table (see Table 2) below closer, in at least one embodiment of the present invention, the relative trailing price-to-earnings ratio of MSCI Austria Index as of, say for example, end of last trading day of March 2012, is computed by dividing the trailing price-to-earnings ratio of MSCI Austria Index as of last trading day of March 2012 by the trailing price-to-earnings ratio of MSCI All Country World Index ex USA as of end of trading that day. In other words, relative price-to-earnings ratio (P/E) of MSCI Austria Index as of end of last trading day of March 2012 as identified from the table (see Table 2) below is 0.96 (rounded to two decimal places)–13.2 (trailing price-to-earnings ratio of MSCI Austria Index as of end of last trading day of March 2012) divided by 13.7 (trailing price-to-earnings ratio of MSCI AC World Index ex USA as of end of last trading day of March 2012). Historical relative trailing P/E values for all months up to the selection date, which in this case is identified, for example, as Feb. 8, 2013, are computed in the same manner. In accordance with at least one embodiment of the present invention, the computation method may be applied to the computation of each factor of the plurality of relative value factors of each sub-index of the plural sub-indexes, of any pre-determined type, underlying any pre-determined, broad-based index universe or benchmark. In accordance with at least one embodiment of the present invention, the plurality of relative value factors computed may include and are not limited to: relative trailing price-to-earnings ratio, relative trailing price-to-earnings-to-growth (PEG) ratio, relative trailing price-to-book value ratio, relative trailing price-to-sales ratio, relative trailing enterprise-value-to-ebitda ratio, relative trailing enterprise-value-to-ebit ratio, relative trailing price-to-cash-flow ratio, relative forward price-to-earnings ratio, relative forward price-to-earnings-to-growth (PEG) ratio, relative forward price-to-book-value ratio, relative forward price-to-sales ratio, relative forward enterprise-value-to-ebitda ratio, relative forward enterprise-value-to-ebit ratio, and relative forward price-to-cash-flow ratio. The computation of relative value factors of the plural sub-indexes is identified as step 430 of enrichment application 400.

TABLE 2

| Date | MSCI AC World ex USA P/E | MSCI Austria P/E | MSCI Austria Rel P/E | MSCI Austria Enr. Cmp. P/E |
|---|---|---|---|---|
| August 2009 | 19.3 | 14.8 | 0.76 | 0.81 |
| September 2009 | 23.6 | 19.6 | 0.83 | 0.88 |
| October 2009 | 23.1 | 18.3 | 0.79 | 0.84 |
| November 2009 | 24.8 | 20.8 | 0.84 | 0.90 |
| December 2009 | 26.2 | 32.4 | 1.24 | 1.34 |
| January 2010 | 25.3 | 23.6 | 0.93 | 1.01 |
| February 2010 | 22.5 | 23.2 | 1.03 | 1.12 |
| March 2010 | 22.7 | 16.4 | 0.72 | 0.79 |
| April 2010 | 21.1 | 12.0 | 0.57 | 0.63 |
| May 2010 | 17.7 | 10.6 | 0.60 | 0.68 |
| June 2010 | 16.1 | 8.8 | 0.55 | 0.64 |
| July 2010 | 16.8 | 9.8 | 0.58 | 0.69 |
| August 2010 | 15.4 | 9.4 | 0.61 | 0.73 |
| September 2010 | 15.7 | 12.8 | 0.82 | 1.00 |
| October 2010 | 15.8 | 13.3 | 0.84 | 1.04 |
| November 2010 | 15.0 | 13.9 | 0.93 | 1.15 |
| December 2010 | 15.5 | 14.9 | 0.96 | 1.20 |
| January 2011 | 15.6 | 14.9 | 0.95 | 1.19 |
| February 2011 | 15.7 | 15.0 | 0.95 | 1.19 |
| March 2011 | 14.5 | 14.9 | 1.02 | 1.28 |
| April 2011 | 14.5 | 13.0 | 0.89 | 1.12 |
| May 2011 | 14.0 | 12.7 | 0.90 | 1.14 |
| June 2011 | 13.5 | 13.4 | 0.99 | 1.26 |
| July 2011 | 13.6 | 12.6 | 0.92 | 1.18 |
| August 2011 | 12.2 | 10.2 | 0.84 | 1.07 |
| September 2011 | 11.3 | 8.1 | 0.71 | 0.92 |
| October 2011 | 12.1 | 8.4 | 0.69 | 0.90 |
| November 2011 | 11.8 | 7.8 | 0.66 | 0.85 |
| December 2011 | 12.0 | 11.5 | 0.95 | 1.23 |
| January 2012 | 12.7 | 11.2 | 0.89 | 1.13 |
| February 2012 | 13.6 | 11.9 | 0.88 | 1.10 |
| March 2012 | 13.7 | 13.2 | 0.96 | 1.20 |
| April 2012 | 13.5 | 13.7 | 1.01 | 1.25 |
| May 2012 | 12.4 | 11.7 | 0.95 | 1.15 |
| June 2012 | 12.6 | 13.9 | 1.11 | 1.32 |
| July 2012 | 12.8 | 14.2 | 1.11 | 1.31 |
| August 2012 | 13.6 | 11.1 | 0.82 | 0.95 |
| September 2012 | 14.0 | 11.7 | 0.83 | 0.97 |
| October 2012 | 14.0 | 12.4 | 0.88 | 1.02 |
| November 2012 | 14.2 | 10.3 | 0.73 | 0.84 |
| December 2012 | 14.4 | 11.5 | 0.80 | 0.92 |
| January 2013 | 14.9 | 11.6 | 0.78 | 0.91 |

The current as well as historical values of the plurality of enriched comparative value factors, of each sub-index of the plural sub-indexes, of the pre-determined type, underlying the pre-determined, broad-based index universe or benchmark, are computed using the corresponding current and historical values of plurality of relative value factors of each sub-index of the plural sub-indexes computed in step 430. Taking the example used in the computation of relative value factors earlier (step 430), let's review in detail the computation of one of the plurality of enriched comparative value factors of MSCI Austria Index. Specifically, let's take up the computation of enriched comparative trailing price-to-earnings ratio of the country index MSCI Austria. Referring to the table (see Table 2) above again, in at least one embodiment of the present invention, the enriched comparative trailing price-to-earnings ratio of MSCI Austria Index as of end of, say for example, last trading day of December 2012 is computed by dividing the relative trailing price-to-earnings ratio of MSCI Austria Index as of last trading day of December 2012 by the average of monthly (as computed at the end of the last trading day of month) relative trailing price-to-earnings ratios of MSCI Austria Index for the trailing 36 calendar months. In other words, enriched comparative trailing price-to-earnings ratio (P/E) of MSCI Austria Index for December 2012 as that can be identified from the table above (see Table 2) is 0.92 (rounded to two decimal places): 0.80 (relative trailing price-to-earnings ratio of MSCI Austria Index as of end of last trading day of December 2012 rounded to two decimal places) divided by 0.86 (the average of monthly—as computed at the end of month–relative trailing price-to-earnings ratios of MSCI Austria Index from December 2009 to November 2012, a period of 36 calendar months, rounded to two decimal places). Similarly, historical values of enriched comparative trailing P/E of MSCI Austria Index, for all months up to the selection date, which in this case is identified as Feb. 8, 2013, are computed in the same manner. In accordance with at least one embodiment of the present invention, the computation method may be applied to the computation of each of the plurality of enriched comparative value factors of each sub-index of the plural sub-indexes, of any pre-determined type, underlying any pre-determined, broad-based index universe or benchmark. In accordance with at least one embodiment of the present invention, the plurality of enriched comparative value factors computed may include and are not limited to: enriched comparative trailing price-to-earnings ratio, enriched comparative trailing price-to-earnings-to-growth (PEG) ratio, enriched comparative trailing price-to-book-value ratio, enriched comparative trailing price-to-sales ratio, enriched comparative trailing enterprise-value-to-ebitda ratio, enriched comparative trailing enterprise-value-to-ebit ratio, enriched comparative trailing price-to-cash-flow ratio, enriched comparative forward price-to-earnings ratio, enriched comparative forward price-to-earnings-to-growth (PEG) ratio, enriched comparative forward price-to-book-value ratio, enriched comparative forward price-to-sales ratio, enriched comparative forward enterprise-value-to-ebitda ratio, enriched comparative forward enterprise-value-to-ebit ratio and enriched comparative forward price-to-cash-flow ratio. The computation of enriched comparative value factors of the plural sub-indexes is identified as step 440 of enrichment application 400.

Figure 5:
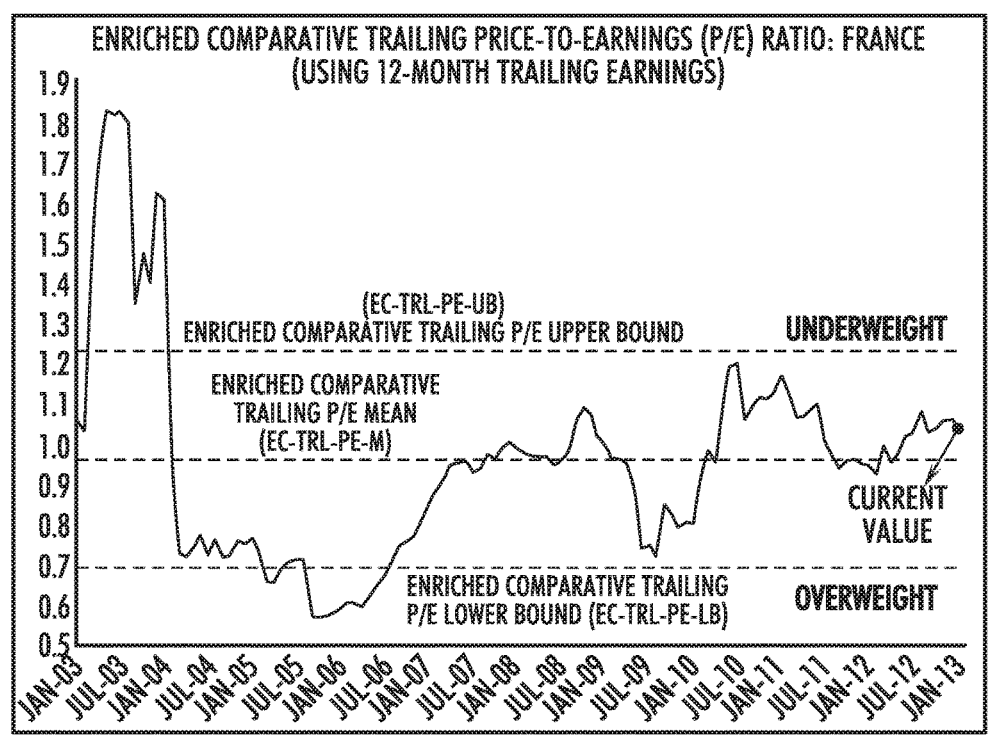
FIG. 5. is the graphical representation of the values of an enriched comparative value factor—the enriched comparative trailing price-to-earnings ratio—and its accompanying properties of MSCI France Index, an example of a country type of sub-index underlying the broad-based MSCI All Country World Index ex USA.
Figure 6:
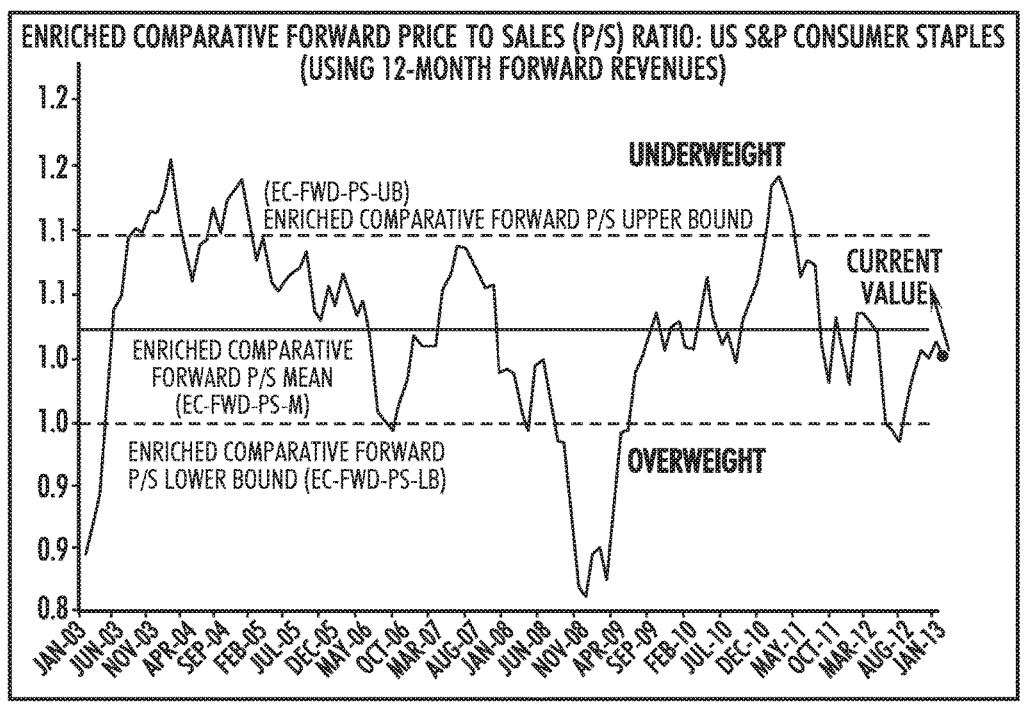
FIG. 6. is the graphical representation of the values of an enriched comparative value factor—the enriched comparative forward price-to-sales ratio—and its accompanying properties of S&P 500 Consumer Staples Index, an example of a sector type of sub-index underlying the broad-based S&P 500 Index.

FIG. 5 is a graph depicting values of one of the plurality of enriched comparative value factors and its associated properties generated by the enrichment method of the current invention: enriched comparative trailing price-to earnings ratio of the MSCI France Index, country type of sub-index underlying the MSCI All Country World Index ex USA. Similarly FIG. 6 is a graph depicting values of another of the plurality of enriched comparative value factors: enriched comparative forward price-to-sale ratio of S&P 500 Consumer Staples index, a sector type of sub-index underlying the S&P 500 US Large Cap Index.

In accordance with at least one embodiment of the present invention, the properties of the plurality of enriched comparative value factors include and are not limited to the current values, as of the selection date, of: upper bound, lower bound and mean. Taking the example of MSCI Austria Index as used in step 440, let's review the computation of the properties of one of the plurality of enriched comparative value factors. Specifically, let's take up the computation of the (statistical) properties of enriched comparative trailing price-to-earnings ratio of MSCI Austria Index whose computation was discussed in detail earlier. The mean (or otherwise the current mean), as of the selection date, of the enriched comparative trailing price-to-earnings ratio of MSCI Austria Index that was computed in step 440 is the average of the monthly enriched comparative trailing price-to-earnings ratios (as computed at the end of the last trading day of month) for the trailing 120 calendar months spread across ten full calendar years. Alternatively, in some embodiments of the present invention, the monthly enriched comparative trailing price-to-earnings ratios for the trailing 84 calendar months spread across seven full calendar years are used. So the mean (or otherwise the current mean) of enriched comparative trailing price-to-earnings ratio (P/E) of MSCI Austria Index as of the selection date, say for example, Feb. 8, 2013, that can be identified from the table (see Table 2) above (all values not shown) is 1.3 (rounded to one decimal place): average of the monthly enriched comparative trailing price-to-earnings ratios (as computed at the end of the last trading day of month) of MSCI Austria Index from January 2003 thru December 2012 (a total of 120 calendar months). As the historical values of the (statistical) properties of the plurality of enriched comparative value factors are exempted in the computation of the properties, the current mean, the current upper bound and the current lower bound are synonymous with mean, upper bound and lower bound respectively.

The volatility (or otherwise the current volatility) of the enriched comparative trailing price-to-earnings ratio of MSCI Austria Index that was computed in step 440 is the standard deviation of the monthly enriched comparative trailing price-to-earnings ratios (as computed at the end of the last trading day of month) for the trailing 120 calendar months spread across ten full calendar years. Alternatively, in some embodiments of the present invention, the monthly enriched comparative trailing price-to-earnings ratios for the trailing 84 months spread across seven full calendar years are used. So the volatility (or otherwise the current volatility) of enriched comparative trailing price-to-earnings ratio (P/E) of MSCI Austria Index as of the selection date, say for example, Feb. 8, 2013, that can be identified from the table (see Table 2) above (not all values shown) is 0.8 (rounded to one decimal place): standard deviation of the monthly enriched comparative trailing price-to-earnings ratios (as computed at the end of month) of MSCI Austria Index from January 2003 thru December 2012 (a total of 120 calendar months). The upper bound (or the current value of upper bound) of the enriched comparative trailing price-to-earnings ratio of MSCI Austria index is the sum of its current mean and current volatility whereas the lower bound (or the current value of lower bound) is computed by subtracting its current volatility from its current mean. So the upper bound of enriched comparative trailing price-to-earnings ratio (P/E) of MSCI Austria Index as of, say for example, Feb. 8, 2013, that can be identified from the table (see Table 2) above is 2.1 (sum of 1.3, the current mean and 0.8, the current volatility). The lower bound of enriched comparative trailing price-to-earnings ratio (P/E) of MSCI Austria Index for the same selection date that can be identified from the table (see Table 2) above is 0.5 (difference of 1.3, the current mean and 0.8, the current volatility). Values of the plurality of enriched comparative value factors are bounded at 5.0 for easier scaling during graphical representation. The computation of properties (statistical) including the current mean, current volatility, lower bound and upper bound of the plurality of enriched comparative value factors is identified as step 460 of the enrichment application 400.

As stated earlier, FIG. 5 is a graph depicting values of one of the plurality of enriched comparative value factors generated by the enrichment method of the current invention: enriched comparative trailing price-to earnings ratio of MSCI France Index, the country type of sub-index underlying the MSCI All Country World Index ex USA. The properties of the enriched comparative trailing price-to-earnings ratio of MSCI France Index are identified in FIG. 5 as: EC-TRL-PE-M (mean), EC-TRL-PE-UB (upper bound) and EC-TRL-PE-LB (lower bound). Similarly, FIG. 6 is a graphical representation of another of the plurality of enriched comparative value factors: enriched comparative forward price-to-sales ratio of S&P 500 Consumer Staples Index, a sector type of sub-index underlying the S&P 500 US Large Cap Index. The properties of the enriched comparative forward price-to-sales ratio of S&P 500 Consumer Staples Index are identified in FIG. 6 as: EC-FWD-PS-M (mean), EC-FWD-PS-UB (upper bound) and EC-FWD-PS-LB (lower bound).

In some embodiments of the present invention, the enrichment application 400 in FIG. 1 may also be used to generate trade signals for the sub-indexes of a pre-determined type underlying a pre-determined traditional, broad-based index universe or benchmark. The trade signals for the sub-indexes are in turn trade signals for passive equity ETFs or other equity products that track the sub-indexes. In at least one embodiment of the present invention, the top-down active portfolio managers can use the enrichment application 400 and any weighted combination of the plurality of enriched comparative value factors and may be other external factors of type including and not limited to: economic and growth, to determine trading calls on the sub-indexes. For example taking into consideration only the enriched comparative trailing price-to-earnings ratio of MSCI France Index in FIG. 5, one can determine that MSCI France Index is over-valued (so should be under-weighted) when the enriched comparative trailing price-to-earnings ratio of the index crosses the upper bound (EC-TRL-PE-UB) on its rise. Similarly, when the enriched comparative trailing price-to-earnings ratio of the index crosses the lower bound (EC-TRL-PE-LB) on its fall, one can determine that MSCI France Index is under-valued (so should be over-weighted). Likewise, when the enriched comparative trailing price-to-earnings ratio of the index is around the mean (EC-TRL-PE-M), one can determine that MSCI France Index is fairly valued (so should be market-weighted).

The enrichment application by deploying the enrichment method that yields plurality of enriched comparative value factors and their associated properties may also be a valuable instrument for portfolio managers. The plurality of enriched comparative value factors along with their (statistical) properties could help portfolio managers assess and formulate tactical allocation changes—across countries, geographic regions, economic regions, sectors, industries, styles, or market caps—to existing equity portfolios. For example, the assessment done on MSCI France Index (see FIG. 5) in the manner discussed above, and along with additional factors of type including and not limited to: economic and growth, could help determine changes in exposure—over-weight, under-weight or market-weight—to France in an existing equity portfolio, with respect to its benchmark. Similarly, deploying the enrichment method, for example, across all country indexes underlying the broad-based MSCI All Country World Index ex USA could help portfolio managers determine overall tactical changes to a portfolio that uses the traditional, broad-based index as a benchmark.

Taking the example of the broad-based MSCI All Country World Index ex US, and considering economic region as the pre-determined type of sub-index, the underlying plural sub-indexes of the broad-based index are the MSCI World Index ex US (tracks only the developed markets of the world ex US) and MSCI Emerging Markets Index. The enrichment method, as discussed earlier, when applied to the plural sub-indexes produces plurality of enriched comparative value factors along with their properties, and they together with a plurality of other external factors including and not limited to: economic factors and growth factors, can help portfolio managers and asset allocation strategists devise tactical asset allocation changes to portfolios in terms of altering exposure to developed markets and emerging markets equities with reference to their traditional benchmarks. Similarly, the enrichment method can also be used to devise tactical asset changes to portfolios in terms of altering equity exposures to various geographic regions—North America, South America, Europe, Asia, Africa and Oceania—with reference to their benchmarks.

The current and historical values of the plurality of enriched comparative value factors, as of the selection date, of plural sub-indexes of the pre-determined type underlying the pre-determined, broad-based index universe or benchmark are loaded into the Enriched Factors Database 200 by the enrichment application 400. The loading of the Enriched Factors Database 200 is identified as step 450 (see FIG. 2) in the program flow of enrichment application (400). In at least one embodiment of the present invention, the Enriched Factors Database 200 may assume the tabular structure identified as 575 of FIG. 4B. The listing of the names or representation of the plural sub-indexes underlying the given broad-based index universe is identified as 577 in table 575 of FIG. 4B. The format of the names of the sub-indexes would follow the convention as outlined in the row identifier constructs that would be discussed in detail later in the specification (see paras [00134] thru [00137] and FIG. 11A). In accordance with at least one embodiment of the present invention, the enriched comparative value factors generated by the enrichment application populate the column singularly identified as 581 of table 575. The other two columns 587 and 597 are populated by the portfolio builder application 700 (see FIG. 1 and FIG. 3). The date field (or column) has been excluded in table 575 as it represents the enriched comparative value factors, correlation factors and growth factors of the plural sub-indexes underlying a broad-based index/universe at a given point in time. The same tabular format of Enriched Factors Database represented by table 575 can also be used to depict historical enriched comparative value factors, growth factors and correlation factors of the plural sub-indexes when the date field (or column) is appended to the beginning of the table 575 as reflected in FIG. 13. The format of the date would be of the format MM-DD-YYYY. Many embodiments of the present invention may use date in the MM/DD/YYYY format.

The table (see Table 3) below with sample data is the reflection of table 575 adapted to illustrate the example of using the present invention to rank the 45 sub-indexes of pre-determined type "country", underlying the MSCI All Country World Index ex USA. Table 3 reflects the table structure 575 (see FIG. 4B) representing the Enriched Factors Database after the enrichment application 400 has updated the database with the current (latest) values of enriched comparative value factors (step 450 of application 400). The growth factors and correlation factors of the plural sub-indexes in the table (see Table 3) below would be updated later through the portfolio builder application 700 (See FIG. 1 and FIG. 3). The identifier column in the table below (see Table 3) is identified as 577 in the tabular representation of Enrichment Factors Database 200, which is identified as 575 in FIG. 4B. The format of the data in the identifier field (column) would be the convention as outlined in the row identifier constructs that would be discussed in detail later in the specification (see paras [00134] thru [00137] and FIG. 11A). In Table 3 below, for sake of simplicity and clarification, the values in the identifier column are depicted in plain English. The enriched comparative value factors in the table below (see Table 3) are identified singularly as 581 in the tabular representation 575. FIG. 13 is a sample representation (growth factors and correlation factors have been excluded for want of space) of Enriched Factors Database like that represented by Table 3 below or by table 575 seen in FIG. 4B, but it also reflects the data row identifier constructs that would be discussed later (see paras [00134] thru [00137] and FIG. 11A). FIG. 13 also gives a picture of how historical values of plurality of enriched comparative value factors of plural sub-indexes underlying a given broad-based index universe/benchmark may be stored in the tabular Enhanced Factors Database using the data row identifier construct (as defined in FIG. 11A) that populates the identifier field (column), and the date field (column) of the database. Similarly, it also exhibits how historical values of plurality of enriched comparative value factors of all conceivable types of sub-indexes underlying all conceivable broad-based index universes/benchmarks may be stored in the database and thereby enable the establishment of the enhanced indexes repository.

ditional, broad-based index or benchmark as identified in step 410 of enrichment application 400.

Additional data, the current values as of the selection date, pertaining to growth factors and correlation factors may be manually appended into the already partially filled Enriched Factors Database 200 (filled prior in step 450 of enrichment application 400) through: (1) keyboard 70 which is connected to the processor 50, (2) download from an internet server, which is not shown in FIG. 1, or (3) transfer from a local storage device, which is not shown in FIG. 1. As you can see in FIG. 4A, the data which is input (Data Input 02) to fill the remaining elements of database 200 may include

TABLE 3

| Identifier | Enriched Trailing Price-to-earnings Ratio | Enriched Trailing Price-to-book-value Ratio | Enriched Trailing Price-to-sales Ratio | Enriched Trailing Price-to-cash-flow Ratio | Enriched Forward Price-to-earnings Ratio | Enriched Forward Price-to-book-value Ratio | Enriched Forward Price-to-sales Ratio | Enriched Forward Price-to-cash-flow Ratio | Gowth Factors | Correlation Factors |
|---|---|---|---|---|---|---|---|---|---|---|
| MSCI Australia index | 0.36 | 0.66 | 0.89 | 1.30 | 1.00 | 0.53 | 1.10 | 0.83 | — | — |
| MSCI Austria index | 1.00 | 0.36 | 0.96 | 0.70 | 0.70 | 0.27 | 0.60 | 0.99 | — | — |
| MSCI Belgium index | 0.21 | 0.86 | 0.47 | 1.20 | 1.10 | 0.64 | 1.30 | 1.04 | — | — |
| MSCI Brazil index | 1.00 | 0.75 | 0.43 | 0.90 | 0.90 | 0.63 | 0.80 | 0.77 | — | — |
| MSCI Canada index | 1.20 | 0.95 | 0.73 | 1.30 | 1.30 | 0.79 | 1.20 | 1.63 | — | — |
| MSCI Chile index | 0.89 | 0.69 | 0.36 | 1.10 | 1.00 | 0.60 | 1.10 | 1.13 | — | — |
| MSCI China index | 0.96 | 0.73 | 1.00 | 1.20 | 1.10 | 0.57 | 1.20 | 0.64 | — | — |
| MSCI Colombia index | 0.47 | 0.98 | 0.21 | 1.00 | 1.00 | 2.85 | 0.76 | 10.15 | — | — |
| MSCI Czech Republic index | 0.43 | 0.86 | 1.00 | 1.10 | 1.10 | 0.70 | 1.10 | 0.29 | — | — |
| MSCI Denmark index | 0.73 | 0.80 | 1.20 | 1.10 | 0.90 | 0.67 | 1.20 | 0.56 | — | — |
| MSCI Egypt index | 0.35 | 0.88 | 0.35 | 1.20 | 1.10 | 0.76 | 1.20 | 0.92 | — | — |
| MSCI Finland index | 1.00 | 0.81 | 1.00 | 0.80 | 0.80 | 0.70 | 0.70 | 0.76 | — | — |
| MSCI France index | 1.13 | 1.93 | 1.13 | 0.30 | 0.30 | 3.96 | 0.30 | 1.18 | — | — |
| MSCI Germany index | 0.71 | 1.02 | 0.71 | 1.00 | 1.00 | 0.83 | 1.10 | 0.77 | — | — |
| MSCI Greece index | 0.80 | 0.79 | 1.51 | 1.20 | 1.20 | 1.34 | 1.00 | 0.85 | — | — |
| MSCI Hong Kong index | 1.23 | 0.38 | 0.50 | 0.40 | 0.40 | 1.06 | 0.40 | 1.11 | — | — |
| MSCI Hungary index | 1.30 | 0.41 | 1.23 | 0.70 | 0.70 | 0.34 | 0.70 | 2.88 | — | — |
| MSCI India index | 0.90 | 1.13 | 1.00 | 1.00 | 1.10 | 0.87 | 1.20 | 1.36 | — | — |
| MSCI Indonesia index | 3.23 | 1.07 | 1.31 | 1.00 | 0.90 | 1.02 | 1.00 | 1.04 | — | — |
| MSCI Ireland index | 1.87 | 0.99 | 0.80 | 1.10 | 1.10 | 0.81 | 1.10 | 1.06 | — | — |
| MSCI Israel index | 1.51 | 0.84 | 0.98 | 0.80 | 0.90 | 1.65 | 0.80 | 1.12 | — | — |
| MSCI Italy index | 0.50 | 0.50 | 2.30 | 0.90 | 1.10 | 0.43 | 0.90 | 0.81 | — | — |
| MSCI Japan index | 1.23 | 1.10 | 0.70 | 1.30 | 1.40 | 0.88 | 1.60 | 1.59 | — | — |
| MSCI Malaysia index | 1.00 | 1.47 | 0.81 | 0.57 | 0.76 | 0.82 | 0.76 | 1.12 | — | — |
| MSCI Mexico index | 1.31 | 0.92 | 1.49 | 1.10 | 1.20 | 0.77 | 1.10 | 0.89 | — | — |
| MSCI Netherlands index | 0.57 | 0.73 | 1.30 | 0.50 | 0.50 | 1.70 | 0.60 | 0.81 | — | — |
| MSCI New Zealand index | 0.69 | 1.04 | 0.78 | 1.00 | 1.00 | 1.46 | 1.00 | 1.05 | — | — |
| MSCI Norway index | 0.52 | 0.84 | 0.52 | 1.10 | 1.10 | 0.84 | 1.10 | 1.45 | — | — |
| MSCI Peru index | 1.30 | 0.63 | 1.30 | 0.90 | 1.00 | 0.66 | 0.90 | 1.28 | — | — |
| MSCI Philippines index | 0.98 | 0.73 | 1.20 | 0.90 | 0.90 | 0.87 | 0.80 | 2.07 | — | — |
| MSCI Poland index | 2.30 | 0.55 | 2.30 | 0.80 | 0.90 | 0.60 | 0.90 | 1.07 | — | — |
| MSCI Portugal index | 0.70 | 1.14 | 0.70 | 1.10 | 1.00 | 0.98 | 1.20 | 2.08 | — | — |
| MSCI Qatar index | 0.81 | 0.56 | 0.81 | 0.60 | 0.60 | 0.97 | 0.60 | 1.16 | — | — |
| MSCI Republic of South Africa index | 1.49 | 1.10 | 1.10 | 1.50 | 1.50 | 0.65 | 1.40 | 1.16 | — | — |
| MSCI Russia index | 1.30 | 0.82 | 1.00 | 1.00 | 1.00 | 0.71 | 1.00 | 0.88 | — | — |
| MSCI Singapore index | 0.78 | 0.63 | 0.23 | 1.10 | 0.90 | 0.50 | 1.10 | 0.70 | — | — |
| MSCI South Korea index | 1.00 | 0.82 | 0.87 | 1.10 | 1.00 | 0.68 | 1.20 | 1.49 | — | — |
| MSCI Spain index | 0.89 | 0.83 | 0.63 | 1.30 | 1.20 | 0.76 | 1.30 | 1.29 | — | — |
| MSCI Sweden index | 0.17 | 0.90 | 0.69 | 1.20 | 1.00 | 0.94 | 1.10 | 1.19 | — | — |
| MSCI Switzerland index | 0.37 | 0.88 | 0.52 | 0.90 | 0.80 | 0.68 | 0.90 | 11.11 | — | — |
| MSCI Taiwan index | 1.10 | 0.79 | 1.30 | 1.20 | 1.10 | 0.72 | 1.20 | 1.75 | — | — |
| MSCI Thailand index | 1.00 | 0.95 | 0.98 | 1.10 | 1.10 | 0.90 | 1.10 | 1.23 | — | — |
| MSCI Turkey index | 0.23 | 0.95 | 2.30 | 1.00 | 1.00 | 0.92 | 1.10 | 1.29 | — | — |
| MSCI United Arab Emirates index | 0.87 | 0.81 | 0.87 | 1.30 | 1.30 | 0.69 | 1.20 | 1.40 | — | — |
| MSCI United Kingdom index | 0.63 | 0.13 | 1.17 | 2.13 | 0.31 | 0.21 | 0.89 | 1.27 | — | — |

The portfolio builder application 700 with the aid of computational power of the technology apparatus of the present invention ranks and weights plural sub-indexes of the pre-determined type underlying the pre-determined trathe names of, or representation of, the sub-indexes of the pre-determined type underlying the broad-based index universe or benchmark identified in enrichment application 400 (step 410). Table 375 in FIG. 4A is a tabular representation of data input Data Input 02. The listing of the names or representation of the indexes is identified as 377 in table 375 of FIG. 4A. The listing of the names or representation of the indexes identified as 377 in table 375 is identical to the listing identified as 577 in the tabular representation 575 of the already partially populated Enrichment Factors Database 200 (see FIGS. 4A & 4B). The format of the names of the sub-indexes would follow the convention as outlined in the row identifier constructs that would be discussed in detail later in the specification (see paras [00134] thru [00137] and FIG. 11A). The appending of database 200 with growth factors and correlation factors is identified as step 710 in the application flow of portfolio builder application (700) as outlined in FIG. 3. The growth factors and correlation factors along with the enriched comparative value factors (loaded at the end of enrichment application) in database 200 are used by the portfolio builder application (700) to rank and weight the pre-determined plural sub-indexes to construct an enhanced index or equivalent semi-active portfolio. The plurality of growth factors in 375 is singularly identified as 387 and the plurality of correlation factors, is singularly identified as 397. The date field (or column) has been excluded in table 375 as it represents the correlation factors and growth factors of the plural sub-indexes underlying a broad-based index/universe at a given point in time. The same tabular format of DATA 02 represented by table 375 can also be used to load historical growth factors and correlation factors if the date field (or column) is appended to the beginning of the table 375. The format of the date would be of the format MM-DD-YYYY. Many embodiments of the present invention may use date in the MM/DD/YYYY format.

In accordance with at least one embodiment of the present invention, the growth factors 387 that are characteristic of the plural sub-indexes in database 200 include, but are not limited to: twelve-month forward EPS (earnings per share) growth forecast, long-term forward earnings growth rate, long-term historical EPS growth trend, average EPS growth for the trailing three years, average EPS growth for the trailing two years, EPS growth for the trailing 12 months, trailing 3-month return, trailing 6-month return, real gross domestic product (GDP) growth forecast for the next 12 months, average real gross domestic product (GDP) growth for the trailing three years, average real gross domestic product (GDP) growth for the trailing two years, real gross domestic product (GDP) growth for the trailing 12 months, 12-month change in the real US dollar exchange rate with other currencies and 12-month change in the nominal US dollar exchange rate with other currencies.

12-month forward EPS (Earnings per Share) growth forecast of an index is derived by using the median of all analyst estimates of the index's 12-month forward EPS (after excluding all extraordinary items) expressed in annual terms. The growth rate is computed by taking the percentage change in the 12-month forward EPS forecast with respect to the recently reported EPS. The sources for the 12-month forward EPS include Thomson Reuters.

The long-term forward earnings growth rate is the consensus of analysts' earnings growth rate estimates typically provided for the next 3 to 5 years. The sources for the long-term forward earnings growth rate include MSCI, I/B/E/S and Thomson Reuters.

The long-term historical EPS growth trend is the historical reported EPS growth rate over trailing five years.

Average EPS growth for the trailing three years is obtained by computing the percentage change in reported EPS (after excluding all extraordinary items) over the trailing 12 quarter period expressed on an annual basis.

Average EPS growth for the trailing two years is obtained by computing the percentage change in reported EPS (after excluding all extraordinary items) over the trailing eight quarter period expressed on an annual basis.

Average EPS growth for the trailing 12 months is obtained by computing the percentage change in reported EPS (after excluding all extraordinary items) over the trailing four quarter period.

Real gross domestic product (GDP) forecast for the next 12 months of a country is the median of all forecasts of real GDP of the country for the forward four quarters on an annual basis provided by financial and forecasting institutions including IMF, Global Insight and Oxford Economic Forecasting.

Average real gross domestic product (GDP) growth of a country for the trailing three years is a metric that can be computed by averaging the trailing 12 quarters of real GDP growth of the country on annual basis.

Average real gross domestic product (GDP) growth of a country for the trailing two years is a metric that can be computed by averaging the trailing eight quarters of real GDP growth of the country on annual basis.

Average real gross domestic product (GDP) growth for the trailing 12 months of a country is a metric that can be computed by averaging the trailing four quarters of real GDP growth of the country on annual basis.

Trailing 3-month return of an index is a metric that is obtained by computing the percentage change in price of the index for the trailing three-month period.

Trailing 6-month return of an index is a metric that is obtained by computing the percentage change in price of the index for the trailing six-month period.

In accordance with at least one embodiment of the present invention, the correlation factors 397 (see FIG. 4A) that are characteristic of the indexes in database 200 include, but are not limited to: average correlation co-efficient of monthly returns for the trailing 3 years, 5 years or 7 years. The average correlation co-efficient of monthly returns of a sub-index of a given type underlying a broad-based index universe or benchmark is the average of the correlations of its monthly returns spread over trailing 36 months or 60 months or 72 months with the corresponding monthly returns of each of the other plural sub-indexes (the relationship explored one index at a time) of the given type underlying the broad-based index universe or benchmark. For example, the average correlation co-efficient of monthly returns for the trailing 3 years or 36 months of S&P 500 Consumer Discretionary index would be computed by averaging the correlations of its monthly returns over the prior 36 months with the corresponding monthly returns of nine similar other sub-indexes of sector type (the relationships explored one index at a time) underlying the broad-based S&P 500 Large-cap index: S&P 500 Consumer Staples index, S&P 500 Energy index, S&P 500 Financials index, S&P 500 Industrials index, S&P 500 Health Care index, S&P 500 Information Technology index, S&P 500 Materials index, S&P 500 Telecommunications index and S&P 500 Utilities index.

The 45 sub-indexes of pre-determined type "country" underlying the MSCI All Country World Index ex USA that was used as an example in elucidating the enrichment application 400 and for partially populating the Enriched Factors Database 200 in step 450 of application 400, can naturally be used as an example to form the data pertaining to growth factors and correlation factors in the Enriched Factors Database 200. A data entry person can make use of a table 375, or the like, to key in the data (Data Input 02) using keyboard 70 i.e. the data keyed through keyboard 70 is captured by processor 50 and appended to database 200. Table 375 may include a listing, identified as 377, of each of the 45 sub-indexes. The calculation of growth factors and correlation factors of the sub-indexes may be performed by processor 50 using component values entered into database 200, and such plurality of calculated growth factors, identified singularly as 387, and such plurality of calculated correlation factors identified singularly as 397, may be stored in database 200 in a table format like that of table 375. Alternatively, the plurality of pre-calculated growth and correlation factors of the sub-indexes can be downloaded from webservers of third party data providers like Thomson Reuters directly in to the database 200 or can be keyed using table format 375 through the keyboard 70 via the processor 50. The table (see Table 4) with partially populated sample data below is the reflection of table 375 used to append data to database 200, and is adapted to illustrate the example. The growth factors and correlation factors along with the enriched comparative value factors are later read in by the application 700. The same tabular format of DATA 02 represented by table 375 can also be used to load historical growth factors and correlation factors if the date field (or column) is appended to the beginning of the table 375. The format of the date would be of the format MM-DD-YYYY. In Table 4 below, for sake of simplicity and clarification, the values in the identifier column are depicted in plain English.

TABLE 4

| | Growth Factors | | | | | | | | | | Correlation Factors | | |
|---|---|---|---|---|---|---|---|---|---|---|---|---|---|
| Identifier | 12-m Fwd. EPS Growth Forecast (%) | Avg. EPS Growth Trailing 3 yrs (%) | Avg. EPS Growth Trailing 2 yrs (%) | EPS Growth Trailing 12 Mths. (%) | 3-m Rtn (%) | 6-m Rtn. (%) | GDP Growth Forecast Fwd. 12-m (%) | Avg. GDP Growth Trailing 3 yrs (%) | Avg. GDP Growth Trailing 2 yrs (%) | GDP Growth Trailing 12 Mths. (%) | Avg. 3-yr Corr. Coefficient | Avg. 5-yr Corr. Coefficient | Avg. 7-yr Corr. Coefficient |
| MSCI Australia index | 11.2 | 8.3 | 9.2 | 10.0 | 7.0 | −3.2 | 2.3 | 1.8 | 1.6 | 2.1 | 0.6 | 0.7 | 0.3 |
| MSCI Austria index | 3.2 | 0.1 | 0.6 | 1.2 | −5.2 | 4.7 | 0.8 | −2.3 | −1.2 | −0.6 | 0.5 | 0.4 | 0.4 |
| MSCI Belgium index | — | — | — | — | — | — | — | — | — | — | — | — | — |
| MSCI Brazil index | — | — | — | — | — | — | — | — | — | — | — | — | — |
| MSCI Canada index | — | — | — | — | — | — | — | — | — | — | — | — | — |
| MSCI Chile index | — | — | — | — | — | — | — | — | — | — | — | — | — |
| MSCI China index | — | — | — | — | — | — | — | — | — | — | — | — | — |
| MSCI Colombia index | — | — | — | — | — | — | — | — | — | — | — | — | — |
| MSCI Czech Republic index | — | — | — | — | — | — | — | — | — | — | — | — | — |
| MSCI Denmark index | — | — | — | — | — | — | — | — | — | — | — | — | — |
| MSCI Egypt index | — | — | — | — | — | — | — | — | — | — | — | — | — |
| MSCI Finland index | — | — | — | — | — | — | — | — | — | — | — | — | — |
| MSCI France index | — | — | — | — | — | — | — | — | — | — | — | — | — |
| MSCI Germany index | — | — | — | — | — | — | — | — | — | — | — | — | — |
| MSCI Greece index | — | — | — | — | — | — | — | — | — | — | — | — | — |
| MSCI Hong Kong index | — | — | — | — | — | — | — | — | — | — | — | — | — |
| MSCI Hungary index | — | — | — | — | — | — | — | — | — | — | — | — | — |
| MSCI India index | — | — | — | — | — | — | — | — | — | — | — | — | — |
| MSCI Indonesia index | — | — | — | — | — | — | — | — | — | — | — | — | — |
| MSCI Ireland index | — | — | — | — | — | — | — | — | — | — | — | — | — |
| MSCI Israel index | 6.2 | 9.2 | 8.7 | 10.3 | 8.2 | 7.8 | 2.3 | 0.2 | 0.3 | 0.7 | 0.5 | 0.6 | 0.6 |
| MSCI Italy index | 4.7 | 3.7 | 3.9 | 3.4 | −1.5 | −0.3 | 1.2 | −0.8 | −0.3 | 0.5 | 0.5 | 0.4 | 0.4 |
| MSCI Japan index | — | — | — | — | — | — | — | — | — | — | — | — | — |
| MSCI Malaysia index | — | — | — | — | — | — | — | — | — | — | — | — | — |
| MSCI Mexico index | — | — | — | — | — | — | — | — | — | — | — | — | — |
| MSCI Netherlands index | — | — | — | — | — | — | — | — | — | — | — | — | — |
| MSCI New Zealand index | — | — | — | — | — | — | — | — | — | — | — | — | — |
| MSCI Norway index | — | — | — | — | — | — | — | — | — | — | — | — | — |
| MSCI Peru index | — | — | — | — | — | — | — | — | — | — | — | — | — |
| MSCI Philippines index | — | — | — | — | — | — | — | — | — | — | — | — | — |
| MSCI Poland index | — | — | — | — | — | — | — | — | — | — | — | — | — |
| MSCI Portugal index | — | — | — | — | — | — | — | — | — | — | — | — | — |
| MSCI Qatar index | — | — | — | — | — | — | — | — | — | — | — | — | — |
| MSCI Republic of South Africa index | — | — | — | — | — | — | — | — | — | — | — | — | — |
| MSCI Russia index | — | — | — | — | — | — | — | — | — | — | — | — | — |
| MSCI Singapore index | — | — | — | — | — | — | — | — | — | — | — | — | — |
| MSCI South Korea index | — | — | — | — | — | — | — | — | — | — | — | — | — |
| MSCI Spain index | — | — | — | — | — | — | — | — | — | — | — | — | — |
| MSCI Sweden index | — | — | — | — | — | — | — | — | — | — | — | — | — |
| MSCI Switzerland index | — | — | — | — | — | — | — | — | — | — | — | — | — |
| MSCI Taiwan index | — | — | — | — | — | — | — | — | — | — | — | — | — |
| MSCI Thailand index | — | — | — | — | — | — | — | — | — | — | — | — | — |
| MSCI Turkey index | — | — | — | — | — | — | — | — | — | — | — | — | — |
| MSCI United Arab Emirates index | 23.2 | 9.2 | 8.7 | 10.3 | 7.8 | 9.7 | 5.6 | 4.8 | 3.8 | 2.1 | 0.1 | −0.2 | 0.2 |
| MSCI United Kingdom index | 2.3 | 1.8 | 2.7 | 3.6 | −1.5 | 2.3 | 1.2 | −0.8 | −0.3 | 0.5 | 0.5 | 0.4 | 0.4 |

After the Enriched Factors Database 200 is appended with the plurality of growth factors and correlation factors of the MSCI country indexes, the Enriched Factors Database 200 may assume the format of the table (see Table 5) below, a reflection of table 575, the tabular representation of database 200 outlined earlier. Table 5 is set up for purely illustration purpose with partially filled sample values. In Table 5 below, for sake of simplicity and clarification, the values in the identifier column are depicted in plain English.

TABLE 5

| Identifier | Enriched Value Factors | | | | | | | | Growth Factors | | |
| --- | --- | --- | --- | --- | --- | --- | --- | --- | --- | --- | --- |
| | Enriched Trailing Price-to-earnings Ratio | Enriched Trailing Price-to-book-value Ratio | Enriched Trailing Price-to-sales Ratio | Enriched Trailing Price-to-cash-flow Ratio | Enriched Trailing Price-to-earnings Ratio | Enriched Forward Price-to-book-value Ratio | Enriched Forward Price-to-sales Ratio | Enriched Forward Price-to-cash-flow Ratio | 12-m Fwd. EPS Growth Forecast (%) | Avg. EPS Growth Trailing 3 yrs (%) | Avg. EPS Growth Trailing 2 yrs (%) |
| MSCI Australia index | 0.36 | 0.69 | 0.87 | 3.31 | 1.00 | 0.53 | 1.10 | 0.83 | 11.20 | 8.30 | 9.20 |
| MSCI Austria index | 1.00 | 1.70 | 0.96 | 0.70 | 0.63 | 1.27 | 2.30 | 0.92 | 3.20 | 0.10 | 0.60 |
| MSCI Belgium index | 0.21 | 0.85 | 3.47 | 1.20 | 1.10 | 0.64 | 1.30 | 1.04 | 4.30 | 6.80 | 5.80 |
| MSCI Brazil index | — | — | — | — | — | — | — | — | — | — | — |
| MSCI Canada index | — | — | — | — | — | — | — | — | — | — | — |
| MSCI Chile index | — | — | — | — | — | — | — | — | — | — | — |
| MSCI China index | — | — | — | — | — | — | — | — | — | — | — |
| MSCI Columbia index | — | — | — | — | — | — | — | — | — | — | — |
| MSCI Czech Republic index | — | — | — | — | — | — | — | — | — | — | — |
| MSCI Denmark index | — | — | — | — | — | — | — | — | — | — | — |
| MSCI Egypt index | — | — | — | — | — | — | — | — | — | — | — |
| MSCI Finland index | — | — | — | — | — | — | — | — | — | — | — |
| MSCI France index | — | — | — | — | — | — | — | — | — | — | — |
| MSCI Germany index | — | — | — | — | — | — | — | — | — | — | — |
| MSCI Greece index | — | — | — | — | — | — | — | — | — | — | — |
| MSCI Hong Kong index | — | — | — | — | — | — | — | — | — | — | — |
| MSCI Hungary index | — | — | — | — | — | — | — | — | — | — | — |
| MSCI India index | — | — | — | — | — | — | — | — | — | — | — |
| MSCI Indonesia index | — | — | — | — | — | — | — | — | — | — | — |
| MSCI Ireland index | — | — | — | — | — | — | — | — | — | — | — |
| MSCI Israel index | 1.51 | 0.84 | 0.98 | 0.81 | 0.98 | 1.65 | 0.43 | 1.12 | 7.8 | 6.2 | 7.2 |
| MSCI Italy index | 0.52 | 0.55 | 2.30 | 0.90 | 3.26 | 0.43 | 1.39 | 0.44 | 12.2 | 5.6 | 6.2 |
| MSCI Japan index | — | — | — | — | — | — | — | — | — | — | — |
| MSCI Malaysia index | — | — | — | — | — | — | — | — | — | — | — |
| MSCI Mexico index | — | — | — | — | — | — | — | — | — | — | — |
| MSCI Netherlands index | — | — | — | — | — | — | — | — | — | — | — |
| MSCI New Zealand index | — | — | — | — | — | — | — | — | — | — | — |
| MSCI Norway index | — | — | — | — | — | — | — | — | — | — | — |
| MSCI Peru index | — | — | — | — | — | — | — | — | — | — | — |
| MSCI Philippines index | — | — | — | — | — | — | — | — | — | — | — |
| MSCI Poland index | — | — | — | — | — | — | — | — | — | — | — |
| MSCI Portugal index | — | — | — | — | — | — | — | — | — | — | — |
| MSCI Qatar index | — | — | — | — | — | — | — | — | — | — | — |
| MSCI Republic of South Africa index | — | — | — | — | — | — | — | — | — | — | — |
| MSCI Russia index | — | — | — | — | — | — | — | — | — | — | — |
| MSCI Singapore index | — | — | — | — | — | — | — | — | — | — | — |
| MSCI South Korea index | — | — | — | — | — | — | — | — | — | — | — |
| MSCI Spain index | — | — | — | — | — | — | — | — | — | — | — |
| MSCI Sweden index | — | — | — | — | — | — | — | — | — | — | — |
| MSCI Switzerland index | — | — | — | — | — | — | — | — | — | — | — |
| MSCI Taiwan index | — | — | — | — | — | — | — | — | — | — | — |
| MSCI Thailand index | — | — | — | — | — | — | — | — | — | — | — |
| MSCI Tukey index | — | — | — | — | — | — | — | — | — | — | — |
| MSCI United Arab Emirates index | 0.87 | 0.81 | 0.87 | 1.30 | 1.87 | 0.69 | 1.20 | 1.40 | 23.20 | 11.20 | 12.30 |
| MSCI United Kingdom index | 0.63 | 0.13 | 1.17 | 2.13 | 0.31 | 0.21 | 0.89 | 1.27 | 2.30 | 1.80 | 2.70 |

TABLE 5-continued

| | Growth Factors | | | | | | | Correlation Factors | | |
|---|---|---|---|---|---|---|---|---|---|---|
| | EPS | | | GDP | Avg. | Avg. | | | | |
| Identifier | Growth Trailing 12 Mths. (%) | 3-m Rtn (%) | 6-m Rtn. (%) | Growth Forecast Fwd. 12-m (%) | GDP Growth Trailing 3 yrs (%) | GDP Growth Trailing 2 yrs (%) | GDP Growth Trailing 12 Mths. (%) | Avg. 3-yr Corr. Coefficient | Avg. 5-yr Corr. Coefficient | Avg. 7-yr Corr. Coefficient |
| MSCI Australia index | 10.00 | 7.00 | −3.20 | 2.30 | 1.80 | 1.60 | 2.10 | 0.60 | 0.70 | 0.30 |
| MSCI Austria index | 1.20 | −5.20 | 4.70 | 0.80 | −2.30 | −1.20 | −0.60 | 0.52 | 0.40 | 0.40 |
| MSCI Belgium index | 7.20 | 6.20 | 5.30 | 1.50 | 1.00 | 0.90 | 1.20 | 0.70 | 0.70 | 0.70 |
| MSCI Brazil index | — | — | — | — | — | — | — | — | — | — |
| MSCI Canada index | — | — | — | — | — | — | — | — | — | — |
| MSCI Chile index | — | — | — | — | — | — | — | — | — | — |
| MSCI China index | — | — | — | — | — | — | — | — | — | — |
| MSCI Columbia index | — | — | — | — | — | — | — | — | — | — |
| MSCI Czech Republic index | — | — | — | — | — | — | — | — | — | — |
| MSCI Denmark index | — | — | — | — | — | — | — | — | — | — |
| MSCI Egypt index | — | — | — | — | — | — | — | — | — | — |
| MSCI Finland index | — | — | — | — | — | — | — | — | — | — |
| MSCI France index | — | — | — | — | — | — | — | — | — | — |
| MSCI Germany index | — | — | — | — | — | — | — | — | — | — |
| MSCI Greece index | — | — | — | — | — | — | — | — | — | — |
| MSCI Hong Kong index | — | — | — | — | — | — | — | — | — | — |
| MSCI Hungary index | — | — | — | — | — | — | — | — | — | — |
| MSCI India index | — | — | — | — | — | — | — | — | — | — |
| MSCI Indonesia index | — | — | — | — | — | — | — | — | — | — |
| MSCI Ireland index | — | — | — | — | — | — | — | — | — | — |
| MSCI Israel index | 5.8 | 11.3 | 9.7 | 2.1 | −0.3 | 0.2 | 0.4 | 0.6 | 0.8 | 0.8 |
| MSCI Italy index | 7.8 | 7.2 | 9.8 | 1.2 | 0.2 | 0.8 | 1.0 | 0.6 | 0.7 | 0.8 |
| MSCI Japan index | — | — | — | — | — | — | — | — | — | — |
| MSCI Malaysia index | — | — | — | — | — | — | — | — | — | — |
| MSCI Mexico index | — | — | — | — | — | — | — | — | — | — |
| MSCI Netherlands index | — | — | — | — | — | — | — | — | — | — |
| MSCI New Zealand index | — | — | — | — | — | — | — | — | — | — |
| MSCI Norway index | — | — | — | — | — | — | — | — | — | — |
| MSCI Peru index | — | — | — | — | — | — | — | — | — | — |
| MSCI Philippines index | — | — | — | — | — | — | — | — | — | — |
| MSCI Poland index | — | — | — | — | — | — | — | — | — | — |
| MSCI Portugal index | — | — | — | — | — | — | — | — | — | — |
| MSCI Qatar index | — | — | — | — | — | — | — | — | — | — |
| MSCI Republic of South Africa index | — | — | — | — | — | — | — | — | — | — |
| MSCI Russia index | — | — | — | — | — | — | — | — | — | — |
| MSCI Singapore index | — | — | — | — | — | — | — | — | — | — |
| MSCI South Korea index | — | — | — | — | — | — | — | — | — | — |
| MSCI Spain index | — | — | — | — | — | — | — | — | — | — |
| MSCI Sweden index | — | — | — | — | — | — | — | — | — | — |
| MSCI Switzerland index | — | — | — | — | — | — | — | — | — | — |
| MSCI Taiwan index | — | — | — | — | — | — | — | — | — | — |
| MSCI Thailand index | — | — | — | — | — | — | — | — | — | — |
| MSCI Tukey index | — | — | — | — | — | — | — | — | — | — |
| MSCI United Arab Emirates index | 10.30 | 7.80 | 9.7 | 5.60 | 4.80 | 3.80 | 2.10 | 0.10 | −0.20 | 0.20 |
| MSCI United Kingdom index | 3.60 | −1.50 | 2.30 | 1.20 | −0.80 | −0.30 | 0.50 | 0.52 | 0.40 | 0.40 |

Step 720 of portfolio builder application 700 handles ranking of the plural sub-indexes of the pre-determined type underlying the pre-determined, broad-based index universe or benchmark that was identified in step 410 of enrichment application 400. In at least one embodiment of the present invention, each sub-index of the plural sub-indexes may be ranked separately by each factor of the plurality of factors that include and are not limited to: plurality of enriched comparative value factors, plurality of growth factors and plurality of correlation factors. In at least one embodiment of the present invention, each sub-index of the plural sub-indexes may be ranked on a scale from 1 to 100, when using the percentile ranking method, on each factor of the plurality of factors—enriched comparative value factors, growth factors and correlation factors, with 100 being the best and 1 the worst. When ranking each sub-index of the plural sub-indexes by each of the plurality of enriched comparative value factors, lower values of enriched comparative value factors are assigned higher (or better) ranks, and the higher values are assigned lower (or worse) ranks. Say for example, MSCI Austria index with an enriched comparative trailing price-to-earnings ratio of 0.2 will be assigned a higher (or better) rank for that factor compared to the MSCI Belgium index with a value of 1.2. However, when ranking the plural sub-indexes by plurality of growth factors, higher values are assigned higher (or better) ranks. Say for example, MSCI Sweden index with 12-month forward annual GDP growth rate forecast of 3.2% will be assigned a higher (or better) rank for that factor compared to the MSCI Belgium index with a growth forecast of 2.4%. And, when ranking the plural sub-indexes by plurality of correlation factors, the lower values of the factors are assigned higher (or better) ranks. Say for example, the monthly returns of MSCI New Zealand Index with an average correlation of 0.3 (with the monthly returns of other country type of sub-indexes underlying MSCI All Country World Index ex USA) for the trailing 3 years or 36 months will receive a higher (or better) rank than MSCI India Index with a correlation of 0.7. The selection of each factor of the plural factors used in ranking the plural sub-indexes may be left to the discretion of the portfolio managers. In at least one embodiment of the present invention, at least one factor from each of the factor groups—enriched comparative value, growth and correlation—may be used in ranking the plural sub-indexes of the pre-determined type underlying a pre-determined index universe or benchmark. In at least one embodiment of the present invention, the methodology to rank for example may include and is not limited to: the percentile ranking, Z-score ranking, quintile ranking and quartile ranking.

Continuing to take the example of MSCI All Country World Index ex USA as the index universe or benchmark, and using the country type of underlying plural sub-indexes to develop the enhanced index, the partially filled table (see Table 6) below reflects sample ranks of the plural sub-indexes based on each factor of the plurality of factors—enriched comparative value, growth and correlation. In this example, the portfolio manager has chosen his/her 8 factors for ranking the 45 sub-indexes—three enriched comparative value factors, four growth factors and one correlation factor. The three enriched comparative value factors used are: enriched trailing price-to-earnings ratio, enriched forward price-to-earnings ratio and enriched forward price-to-sales ratio. The four growth factors used are: 12 months forward earnings per share growth forecast, average earnings per share growth trailing 3 yrs, GDP growth forecast forward 12 months and average GDP growth trailing 2 years. The lone correlation factor is the average correlation coefficient over trailing three years or 36 months.

After each sub-index of the 45 sub-indexes underlying the MSCI All Country World Index ex US are ranked separately by each factor as described earlier, in at least one embodiment of the present invention, a combined score is computed for each sub-index of the plural sub-indexes by weighting their individual factor ranks using pre-determined weights. The factor ranks and the combined score for each sub-index underlying a broad-based index universe/benchmark are added to the Factor Scores Database (step 720 and 730). FIG. 14 also gives a picture of how historical values of plurality of factor scores (ranks) and the combined scores of plural sub-indexes underlying a given broad-based index universe/benchmark may be stored in the tabular Factor Scores Database using data row identifier construct (as defined in FIG. 11A) that populates the identifier field (column), and the date field (column) of the database. Similarly, it also exhibits how historical values of plurality of factor scores (ranks) and the combined scores of all conceivable types of sub-indexes underlying all conceivable broad-based index universes/benchmarks may be stored in the database and thereby help establish the enhanced indexes repository. For illustration purposes, the table (see Table 6) below uses an equal weighting method. The computation of the combined score is identified as step 730 in the program flow of Portfolio Builder application 700 (see FIG. 3). For example in the table (see Table 6) below, the MSCI Australia Index has received ranks of 23, 31, 89, 97, 89, 66, 37 and 79 based on enriched trailing price-to-earnings ratio, enriched forward price-to-earnings ratio, enriched forward price-to-sales ratio, 12 months forward earnings per share growth forecast, average earnings per share growth trailing 3 yrs, real GDP growth forecast forward 12 months, average real GDP growth trailing 2 years and average correlation coefficient over trailing three years respectively. The average of the ranks amount to a combined score of 64. The weights of the factor ranks in the combined score may be left to the discretion of the portfolio manager. In at least one embodiment of the present invention, the methodology to compute the combined score for example may include and not limited to: weighted average. In Table 6 below, for sake of simplicity and clarification, the values in the identifier column are depicted in plain English.

TABLE 6

| Identifier | Enriched Value Factors | | | Growth Factors | | | | Correlation Factors | Combined Score |
| --- | --- | --- | --- | --- | --- | --- | --- | --- | --- |
| | Enriched Trailing Price-to-earnings Ratio Rank | Enriched Forward Price-to-earnings Ratio Rank | Enriched Forward Price-to-sales Ratio Rank | 12-m Fwd. EPS Growth Forecast Rank | Avg. EPS Growth Trailing 3 yrs Rank | GDP Growth Forecast Fwd. 12-m Rank | Avg. GDP Growth Trailing 2 yrs Rank | Avg. 3-yr Corr. Coefficient Rank | |
| MSCI Australia index | 23 | 31 | 89 | 97 | 89 | 66 | 37 | 79 | 64 |
| MSCI Austria index | 62 | 65 | 94 | 1 | 23 | 57 | 99 | 89 | 61 |
| MSCI Belgium index | — | — | — | — | — | — | — | — | — |
| MSCI Brazil index | — | — | — | — | — | — | — | — | — |
| MSCI Canada index | — | — | — | — | — | — | — | — | — |
| MSCI Chile index | — | — | — | — | — | — | — | — | — |
| MSCI China index | — | — | — | — | — | — | — | — | — |
| MSCI Colombia index | — | — | — | — | — | — | — | — | — |
| MSCI Czech Republic index | — | — | — | — | — | — | — | — | — |
| MSCI Denmark index | — | — | — | — | — | — | — | — | — |
| MSCI Egypt index | — | — | — | — | — | — | — | — | — |
| MSCI Finland index | — | — | — | — | — | — | — | — | — |
| MSCI France index | — | — | — | — | — | — | — | — | — |
| MSCI Germany index | — | — | — | — | — | — | — | — | — |
| MSCI Greece index | — | — | — | — | — | — | — | — | — |
| MSCI Hong Kong index | — | — | — | — | — | — | — | — | — |
| MSCI Hungary index | — | — | — | — | — | — | — | — | — |
| MSCI India index | — | — | — | — | — | — | — | — | — |
| MSCI Indonesia index | — | — | — | — | — | — | — | — | — |
| MSCI Ireland index | — | — | — | — | — | — | — | — | — |

TABLE 6-continued

| | Enriched Value Factors | | | Growth Factors | | | | | |
| --- | --- | --- | --- | --- | --- | --- | --- | --- | --- |
| Identifier | Enriched Trailing Price-to-earnings Ratio Rank | Enriched Forward Price-to-earnings Ratio Rank | Enriched Forward Price-to-sales Ratio Rank | 12-m Fwd. EPS Growth Forecast Rank | Avg. EPS Growth Trailing 3 yrs Rank | GDP Growth Forecast Fwd. 12-m Rank | Avg. GDP Growth Trailing 2 yrs Rank | Correlation Factors Avg. 3-yr Corr. Coefficient Rank | Combined Score |
| MSCI Israel index | 87 | 43 | 72 | 33 | 23 | 1 | 47 | 82 | 49 |
| MSCI Italy index | — | — | — | — | — | — | — | — | — |
| MSCI Japan index | — | — | — | — | — | — | — | — | — |
| MSCI Malaysia index | — | — | — | — | — | — | — | — | — |
| MSCI Mexico index | — | — | — | — | — | — | — | — | — |
| MSCI Netherlands index | — | — | — | — | — | — | — | — | — |
| MSCI New Zealand index | — | — | — | — | — | — | — | — | — |
| MSCI Norway index | — | — | — | — | — | — | — | — | — |
| MSCI Peru index | — | — | — | — | — | — | — | — | — |
| MSCI Philippines index | — | — | — | — | — | — | — | — | — |
| MSCI Poland index | — | — | — | — | — | — | — | — | — |
| MSCI Portugal index | — | — | — | — | — | — | — | — | — |
| MSCI Qatar index | — | — | — | — | — | — | — | — | — |
| MSCI Republic of South Africa index | — | — | — | — | — | — | — | — | — |
| MSCI Russia index | — | — | — | — | — | — | — | — | — |
| MSCI Singapore index | — | — | — | — | — | — | — | — | — |
| MSCI South Korea index | — | — | — | — | — | — | — | — | — |
| MSCI Spain index | — | — | — | — | — | — | — | — | — |
| MSCI Sweden index | — | — | — | — | — | — | — | — | — |
| MSCI Switzerland index | — | — | — | — | — | — | — | — | — |
| MSCI Taiwan index | — | — | — | — | — | — | — | — | — |
| MSCI Thailand index | — | — | — | — | — | — | — | — | — |
| MSCI Turkey index | — | — | — | — | — | — | — | — | — |
| MSCI United Arab Emirates index | 77 | 69 | 46 | 3 | 52 | 34 | 63 | 21 | 46 |
| MSCI United Kingdom index | 38 | 35 | 6 | 99 | 77 | 43 | 1 | 11 | 39 |

Figure 7:
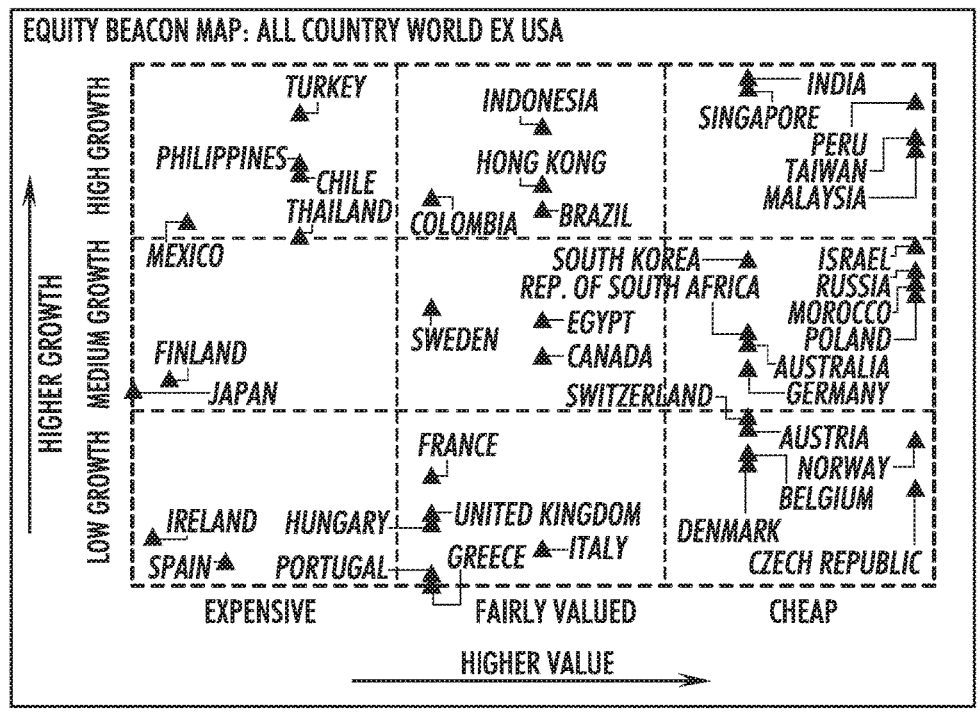
FIG. 7. is the graphical representation that casts all the country type of sub-indexes constituting the broad-based MSCI All Country World Index ex USA on a value-growth factors plane. The coordinates for each of the individual country sub-indexes on the plane is determined by its combined rank, among the country sub-indexes constituting the broad-based index, derived using plurality of enriched comparative value factors (x-coordinate) and its combined rank derived using the plurality of growth factors (y-coordinate).

FIG. 7 is the beacon map that casts all the 45 country type of sub-indexes constituting the broad-based MSCI All Country World Index ex USA on a value-growth factors plane. The coordinates for each sub-index of the country sub-indexes on the plane is determined by their combined rank, among the country sub-indexes constituting the broad-based index universe or benchmark, derived using plurality of enriched comparative value factors (x-coordinate) and their combined rank derived using the plurality of growth factors (y-coordinate). In at least one embodiment of the present invention, the combined value rank of each sub-index of the plural sub-indexes may be determined by weight averaging their value factor ranks based on the plurality of enriched comparative value factors. Similarly, the combined growth rank of each sub-each index of the plural sub-indexes may be determined by weight averaging their growth factor ranks based on the plurality of growth factors. In the example in FIG. 7, the combined value rank for each sub-index is determined by its enriched comparative value factor rank based on enriched comparative trailing P/E. The combined growth rank for each sub-index in the FIG. 7 is determined by averaging (equal weighting) its growth factor ranks derived from real gross domestic product (GDP) growth forecast forward 12 months and average real gross domestic product (GDP) growth trailing two years.

Figure 8:
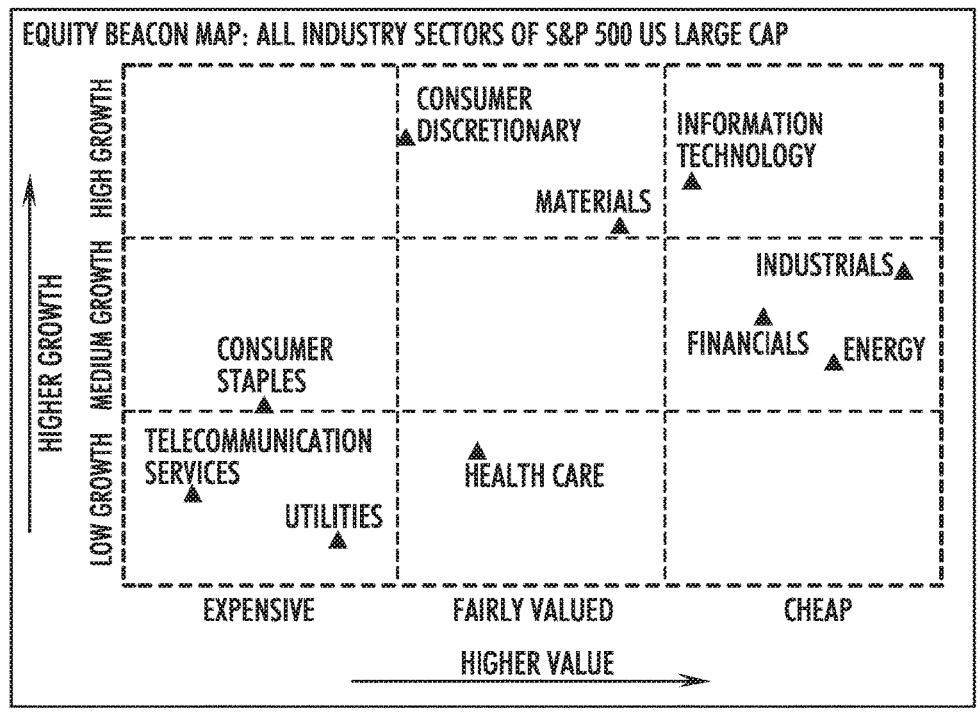
FIG. 8. is the graphical representation that casts all the sector type of sub-indexes constituting the broad-based S&P 500 Index on a value-growth factors plane. The coordinates for each of the individual sector sub-indexes on the plane is determined by its combined value rank, among the sector sub-indexes constituting the broad-based index, derived using plurality of enriched comparative value factors (x-coordinate) and its combined growth rank derived using the plurality of growth factors (y-coordinate).

FIG. 8 is the beacon map that casts all the sector type of plural (10 in number) sub-indexes constituting the broad-based S&P 500 Index on a value-growth factors plane. Like in FIG. 7, the coordinates for each sub-index of the sector sub-indexes on the plane is determined by their combined value rank, among the sector sub-indexes constituting the broad-based index, derived using plurality of enriched comparative value factors (x-coordinate) and their combined growth rank derived using the plurality of growth factors (y-coordinate).

Figure 9:
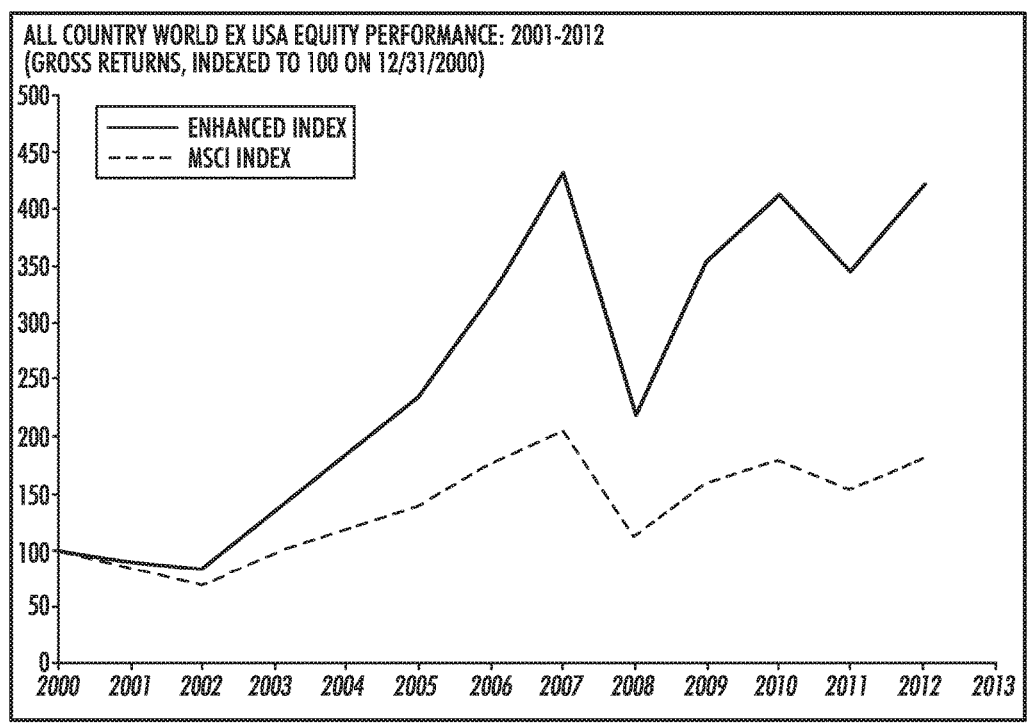
FIG. 9. is the graphical representation of the performance of an enhanced index produced by an embodiment of the present invention, and the comparison to the performance of the pre-determined, broad-based index universe or benchmark from which the enhanced index is derived from. The pre-determined index universe or benchmark in this embodiment is the MSCI All Country World Index ex USA.
Figure 10:
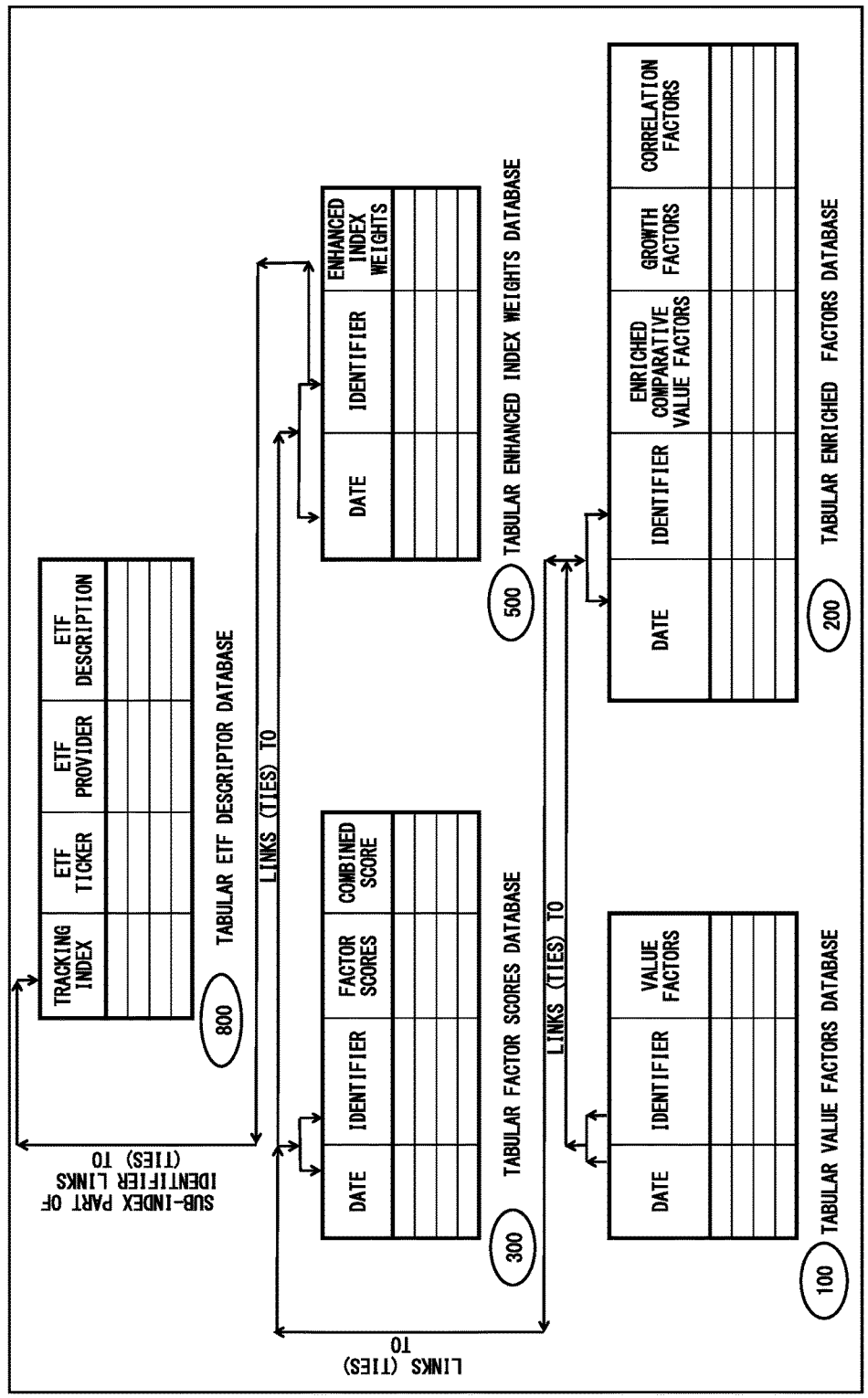
FIG. 10. is a schematic diagram elucidating the linking of disparate tabular databases Tabular Value Factors Database (100), Tabular Enriched Factors Database (200), Tabular Factor Scores Database (300), Tabular Enhanced Index Weights Database (500) and Tabular ETF Descriptor Database (800), which are also defined in FIG. 1.

For example, FIG. 9 describes the returns of an enhanced index derived from the broad-based index universe or benchmark MSCI All Country World Index ex USA, using an embodiment of the present invention, vis-à-vis the returns of the broad-based benchmark. The equal-weighted factors that were used individually in ranking the country sub-indexes underlying the universe or benchmark were: enriched comparative trailing price-to-earnings ratio, real GDP growth forecast forward 12 months, average real GDP growth trailing 2 years and average correlation coefficient over trailing three years. In other words, the underlying plural sub-indexes were ranked on one enriched comparative value factor, two growth factors and one correlation factor. As can be seen in the figure, the enhanced index developed using the current invention has performed superior to the benchmark from 2000 to beginning of 2013.

In at least one embodiment of the present invention, the combined score of each of the plural sub-indexes of the pre-determined type underlying a pre-determined, broad-based index universe or benchmark (computed in step 730 earlier) expressed as percentage of the sum total of the combined scores of all the pre-determined sub-indexes, establishes the weight of each sub-index of the plural sub-indexes in the newly computed enhanced index. The weights of the plural sub-indexes are stored in the tabular Enhanced Index Weights Database (see step 740). FIG. 15 also gives a picture of how historical weights of plural sub-indexes underlying a newly created enhanced index may be stored in the tabular Enhanced Index Weights Database using the data row identifier construct (as defined in FIG. 11C) that populates the identifier field (column), and the date field (column) of the database. Similarly, it also exhibits how historical weights of all sub-indexes underlying all conceivable enhanced indexes, which are derived from all conceivable types of sub-indexes underlying all conceivable broad-based index universes/benchmarks, may be stored in the database. By using the data row identifier construct defined in FIG. 11C, Enhanced Index Weights Database is transformed from a database housing historical index weights of sub-indexes underlying an enhanced index to a repository housing historical index weights of sub-indexes underlying all conceivable enhanced indexes derived from all conceivable sub-index types underlying all conceivable broad-based index universes/benchmarks. Using the example of MSCI Australia Index above, the weight of the sub-index in the new enhanced index would be its combined score (which is 64, see Table 6 above) expressed as percentage of the sum total of the combined scores of all the 45 country type sub-indexes underlying the broad-based MSCI All Country World Index ex USA. Say if the sum total of the combined scores of all the 45 sub-indexes is 720, then the weight of the Australia sub-index in the new enhanced index would be around 8.9% (64/720). A sub-index with a higher combined score is bound to have a higher weight in the enhanced index. Likewise, a sub-index with a lower combined score is bound to have a lower weight in the enhanced index. Computing the weights of the plural sub-indexes in the enhanced index are identified as step 740 in the program flow of portfolio builder application (700) (see FIG. 3). The enhanced index is derived by re-weighting the pre-determined sub-indexes underlying the pre-determined, broad-based index or benchmark by using the weights computed in step 740, instead of using market weights. This reconstitution methodology that gives way to the enhanced index is identified as step 750 in the program flow of portfolio builder application (700).

Figure 3:
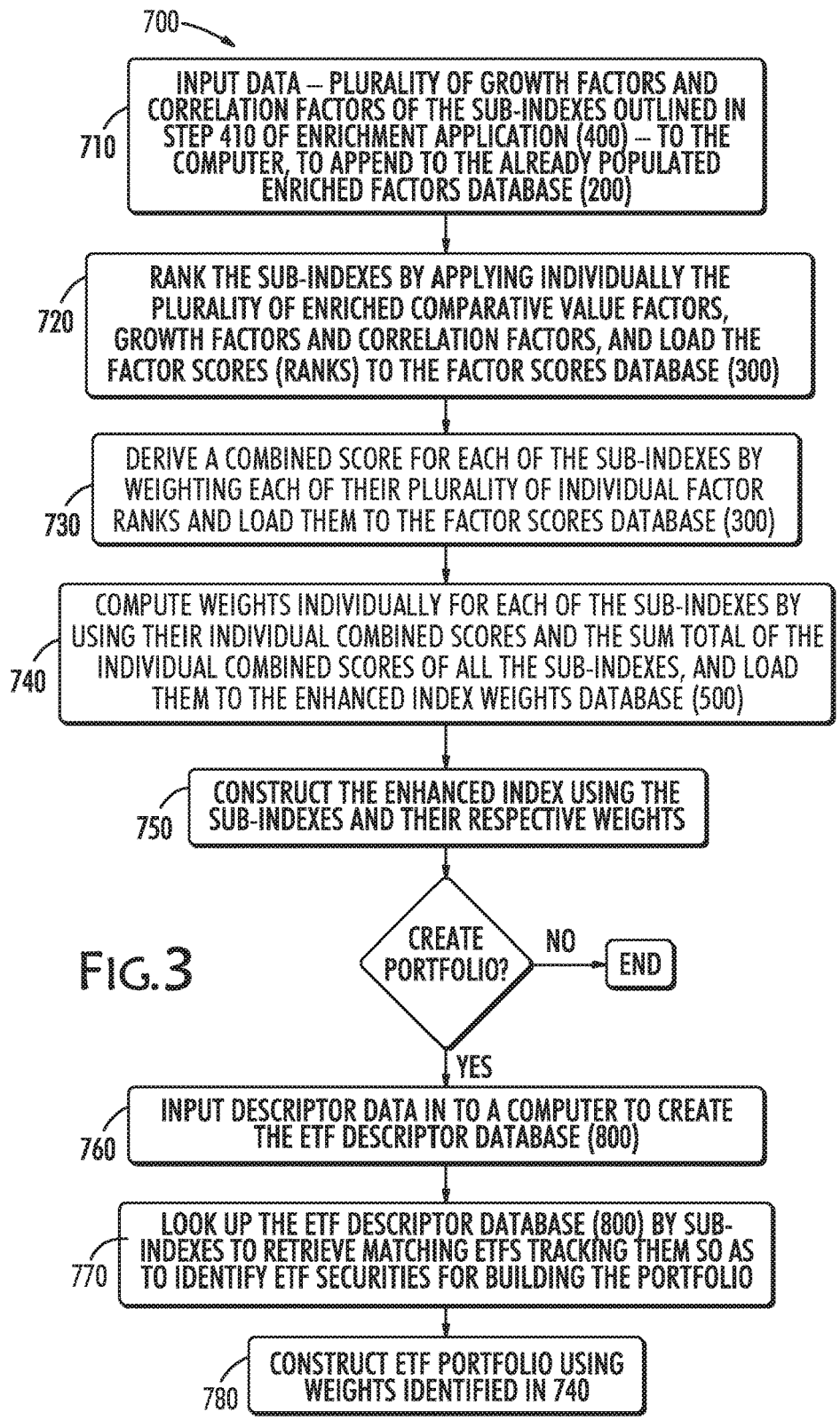
FIG. 3. is the schematic flow chart depicting the program flow of the software application "Portfolio Builder Application" (700) in the structure of FIG. 1.

Step 760 thru 780 in the program flow of portfolio builder application (700) are associated with implementing the newly created enhanced index in Step 750 as a benchmark to build a semi-active portfolio (see FIG. 3).

Data may be manually entered into database ETF Descriptor Database 800 (see FIG. 1) thru (1) keyboard 70 which is connected to the processor 50, (2) download from an internet server, which is not shown in FIG. 1, or (3) transfer from a local storage device, which is not shown in FIG. 1. Table 875 in FIG. 4B is a tabular representation of data input Data Input 03. As you can see in FIG. 4B, the data which is input (Data Input 03) to database 800 may include the names of, or representation of, the plural sub-indexes constituting the enhanced index or a broad-based index universe. The listing of the names or representation of the plural sub-indexes is identified as 877 in table 875 of FIG. 4B. The loading of database 800 with long-only ETFs tracking the plural sub-indexes underlying the enhanced index is identified as step 760 in the application flow of portfolio builder application (700) as outlined in FIG. 3. The ETF tickers in database 800 are used by the portfolio builder application (700) to populate the semi-active portfolio with ETFs that track the corresponding sub-indexes identified in the enhanced index.

For example, if the 10 sub-indexes of pre-determined type "sector" underlying the S&P 500 are the constituents of an enhanced index implemented using the current invention, then they can be used to form the data in the ETF Descriptor Database 800 (see FIG. 1). A data entry person can make use of a table 875 (see FIG. 4B), or the like, to key in the data (Data Input 03) using keyboard 70 i.e. the data keyed through keyboard 70 is captured by processor 50 and loaded into database 800. Table 875 may include a listing, identified as 877, of each of the 10 sub-indexes. The plurality of descriptors of the ETFs that track the plural sub-indexes can be downloaded from webservers of third party data providers like ETF Database or Index Universe, directly in to the database 800 or can be keyed using the table format 875 through the keyboard 70 via the processor 50. The screening of ETFs from third party data providers should be done with utmost care by analysts by looking at attributes including expense ratios. Even though two ETFs track the same index, there may be other differences in terms of styles, expense ratios, and other elements. Therefore, analysts should evaluate each ETF as rigorously as possible so that each ETF that is loaded into database 800 aligns closely with the investment philosophy of the present invention as well as the characteristics of the sub-indexes underlying the enhanced index. For every sub-index underlying the enhanced index, there should be a corresponding long-only ETF in the database after its population in step 760 of the application flow of portfolio builder application 700. The descriptors may include and are not limited to: ETF Ticker identified as 881, ETF Provider identified as 887, and ETF description identified as 897. In the example of 10 sector type of sub-indexes, underlying the broad-based index universe S&P 500, constituting the enhanced index referred to earlier, the database 800 should be loaded with descriptors for the 10 sector ETFs tracking them in order to construct a semi-active portfolio based on the enhanced index. In cases where equivalent ETFs tracking the sub-indexes constituting the enhanced index are not found, analysts may use equivalent Mutual Funds. Therefore, ETFs and Mutual Funds can be used interchangeably in the present invention. But, it should be noted that the mutual funds are in general more expensive than the ETFs. In extreme scenarios where no security tracking a sub-index can be found, the semi-active portfolio derived from the enhanced index can be reconstituted by reallocating the allocated weight of the missing security among the rest of the securities proportionally. The table below (see Table 7) is the reflection of table 875 adapted to illustrate the example. As you can see, the Telecommunications sector index underlying S&P 500 does not have a matching ETF that tracks it, and so the semi-active portfolio derived from the enhanced index has to be reconstituted by allocating its weight among the remaining nine sector ETFs proportionally. FIG. 16 is a sample representation of tabular ETF Descriptor Database like that represented by Table 7 below or by table 875 seen in FIG. 4B but it also reflects the data row identifier constructs that would be discussed later (see paras [00134] thru [00137]) and FIG. 11D. FIG. 16 also gives a picture of how attributes of long-only passive ETFs tracking the sub-indexes underlying enhanced indexes or broad-based index universes are stored in the database. FIG. 16 also reflects the data row identifier construct (as defined in FIG. 11D) that populates the tracking index field (column) of the database.

TABLE 7

| Tracking Index | ETF Ticker | ETF Provider | ETF Description |
|---|---|---|---|
| S5CONS | XLP | State Stree Global Advisors | S&P 500 Consumer Discretionary ETF |
| S5COND | XLY | State Stree Global Advisors | S&P 500 Consumer Staples ETF |
| S5ENR | XLE | State Stree Global Advisors | S&P 500 Energy ETF |
| S5FINL | XLF | State Stree Global Advisors | S&P 500 Financials ETF |
| S5HLTH | XLV | State Stree Global Advisors | S&P 500 Healthcare ETF |
| S5INDU | XLI | State Stree Global Advisors | S&P 500 Industrials ETF |

TABLE 7-continued

| Tracking Index | ETF Ticker | ETF Provider | ETF Description |
|---|---|---|---|
| S5INFT | XLK | State Stree Global Advisors | S&P 500 Information Technology ETF |
| S5MATR | XLB | State Stree Global Advisors | S&P 500 Materials ETF |
| S5TELS | | | |
| S5UTIL | XLU | State Stree Global Advisors | S&P 500 Utility ETF |

The database 800 is read by the portfolio builder application 700 to populate the target portfolio with ETFs. In at least one embodiment of the present invention, the application retrieves the appropriate ETF for each sub-index underlying the enhanced index from the ETF Descriptor Database, and then it is allocated the corresponding weight of the sub-index in the enhanced index. The matching of the sub-indexes with their corresponding ETFs is identified as step 770 of application 700, and the construction of the portfolio with corresponding weights from the enhanced index is identified as step 780.

The non-relational tabular Value Factors Database resides on a flat file with a single record definition across all its rows. Each row is made of a horizontal list of fields (columns) of constant length consisting of the row identifier, date field and the list of value factors as identified in para [00020]. The Value Factors Database is schematically represented in FIG. 4A (upper table) as well as in FIG. 12 for better elucidation. The non-relational tabular Enriched Factors Database resides on a flat file with a single record definition across all its rows. Each row is made of a horizontal list of fields (columns) of constant length consisting of the row identifier, date and the list of enriched comparative value factors, growth factors and correlation factors as identified in paras [00027], and [00029]. Various sections of the Enriched Factors Database are schematically represented in FIG. 4A (lower table), FIG. 4B (upper table) and as well as in FIG. 13 for better elucidation. One single schematic representation of Enriched Factors Database reflecting the enriched comparative value factors, growth factors and correlation factors on a single sheet of paper has been impossible for want of space. The non-relational tabular Enriched Factor Scores Database resides on a flat file with a single record definition across all its rows. Each row is made of a horizontal list of fields (columns) of constant length consisting of the row identifier, date and the various enriched comparative value factor scores, growth factor scores and correlation factor scores. The Factor Scores Database is schematically represented in FIG. 14 for better elucidation. The non-relational tabular Enhanced Index Weights Database resides on a flat file with a single record definition across all its rows. Each row is made of a horizontal list of fields (columns) of constant length consisting of the row identifier, date and the weights of the sub-indexes underlying the enhanced index. The Enhanced Index Weights Database is schematically represented in FIG. 15 for better elucidation. The non-relational tabular ETF Descriptor Database resides on a flat file with a single record definition across all its rows. Each row is made of a horizontal list of fields (columns) of constant length consisting of the row tracking index, ETF ticker, ETF provider and ETF description. The ETF Descriptor Database is schematically represented in FIG. 4B (lower part) as well as FIG. 16 for better elucidation.

Figure 11A:
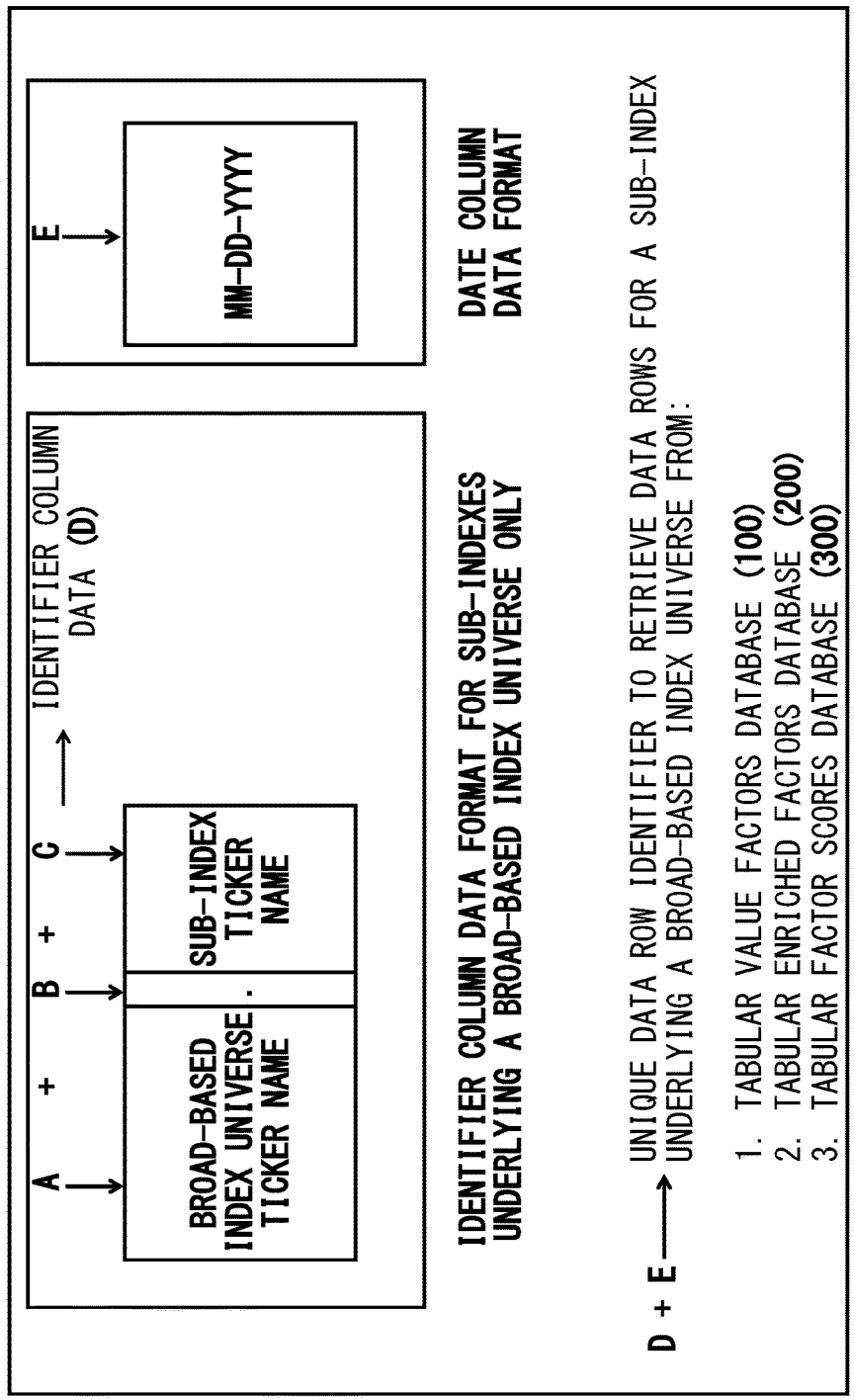
FIGS. 11A, 11B, 11C and 11D. are schematic representations of data row identifier constructs used to link various disparate tabular databases identified in FIG. 1 and FIG. 10.
Figure 11B:
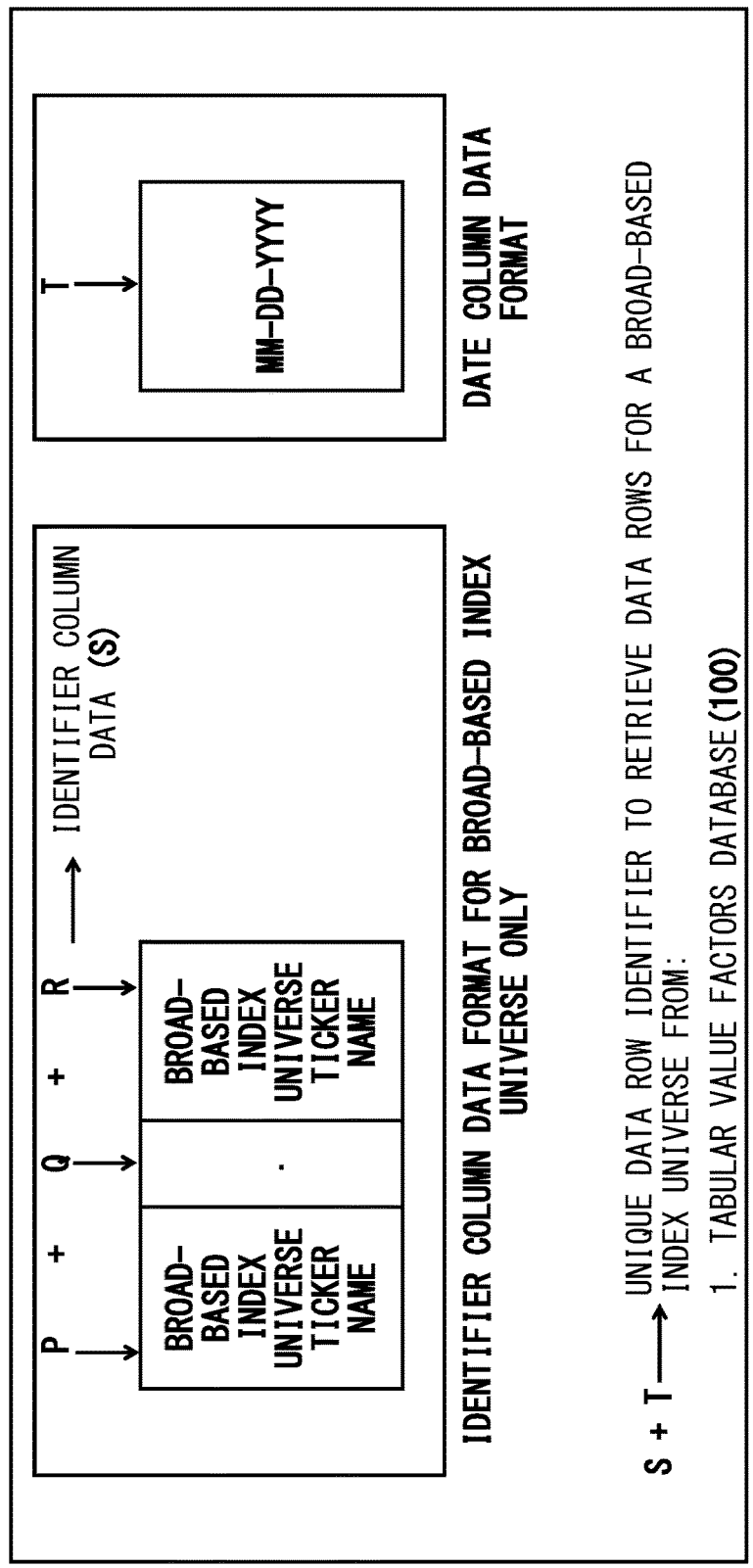
Figure 11C:
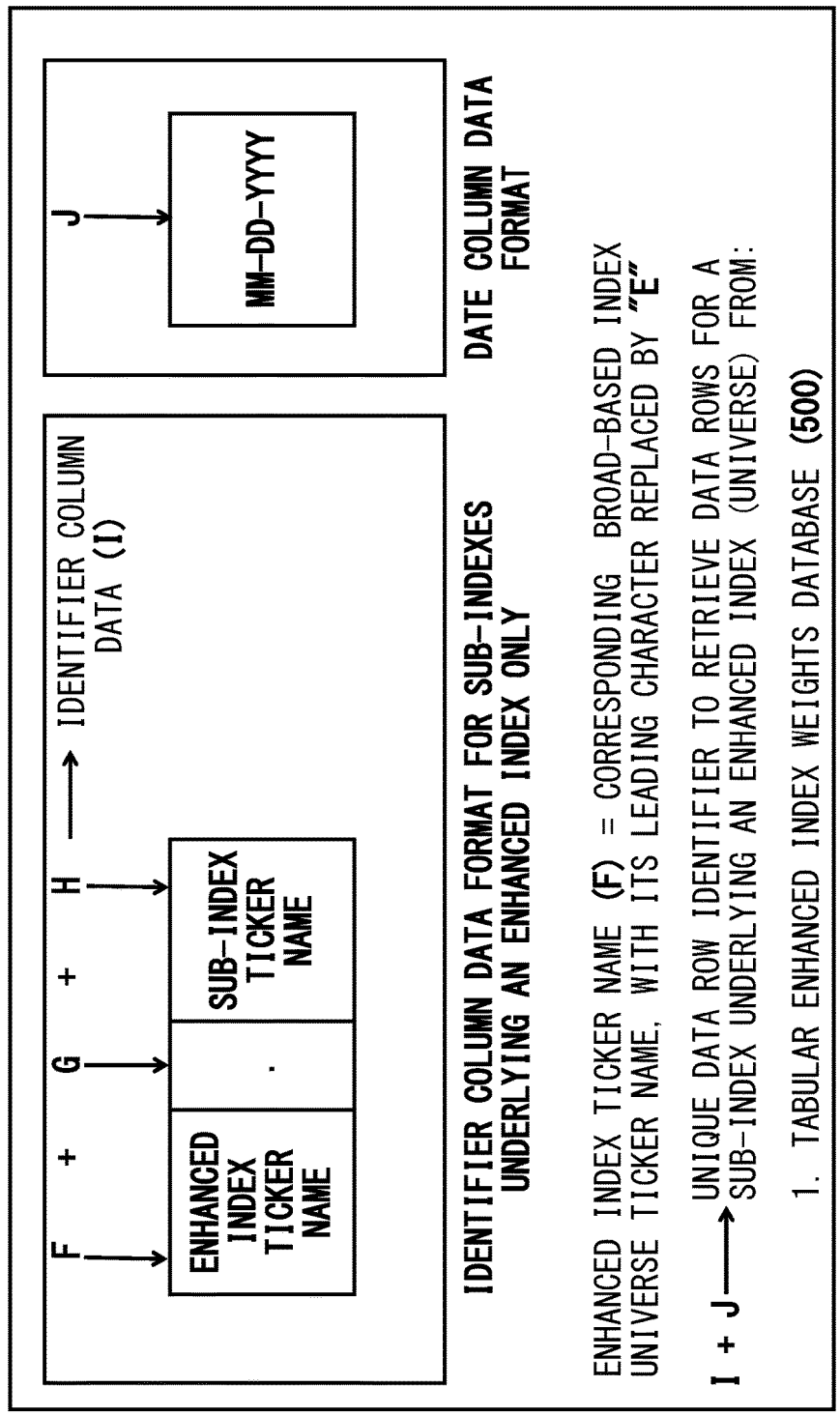
Figure 11D:
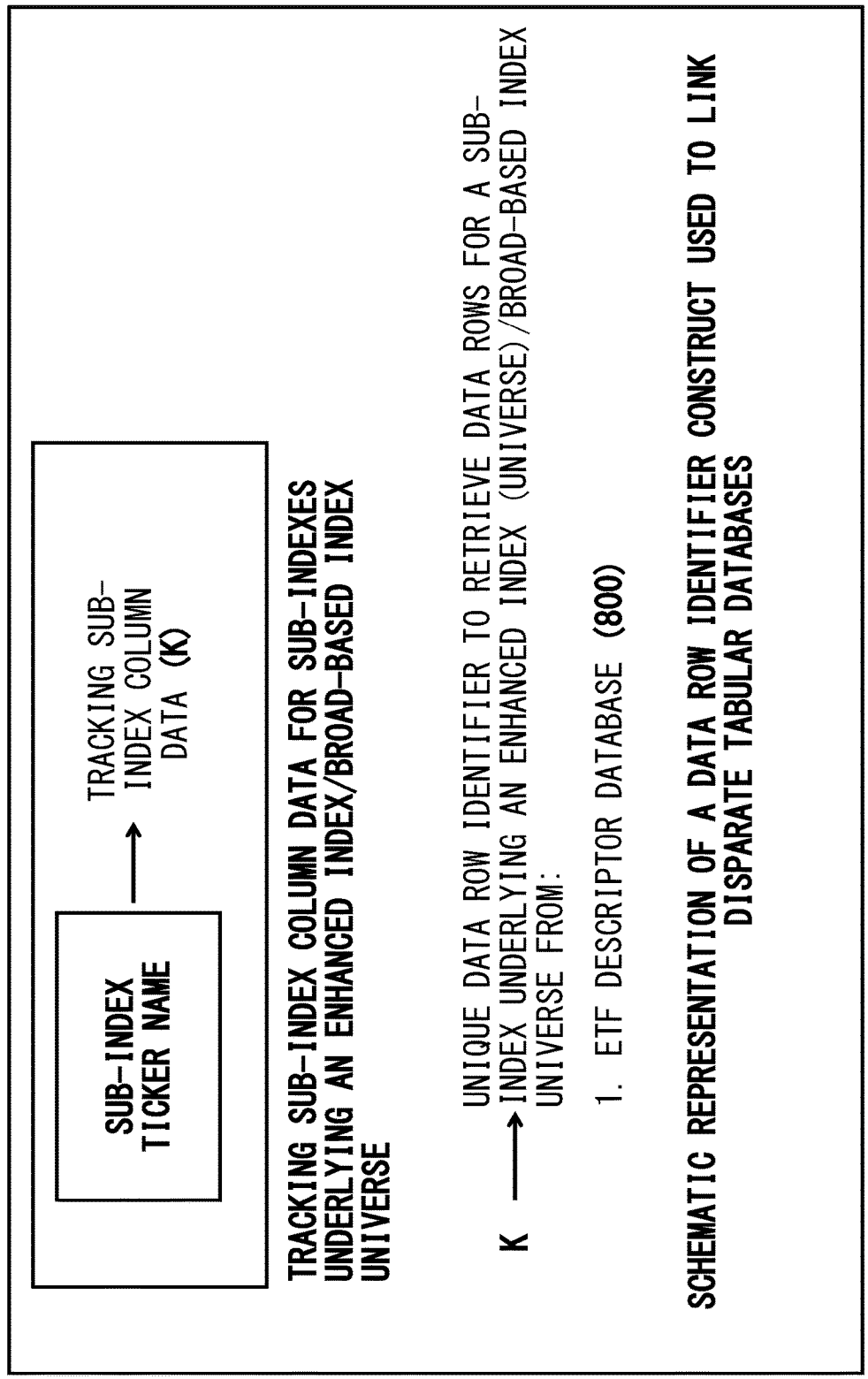

The special database scheme as defined in the invention is depicted in FIG. 1 and it involves linking up the various disparate tabular inputs and staging databases—Value Factors Database, Enriched Factors Database, Factor Scores Database, Enhanced Index Weights Database and ETF Descriptor Database—used by the method of the invention to create an enhanced index (and/or a semi-active portfolio). Each unique row in the tabular databases—Value Factors Database, Enriched Factors Database, Factor Scores Database and Enhanced Index Weights Database—is identified (for selecting, updating, inserting and deleting) by a combination of data in the identifier and date columns of the databases, while each unique row in the tabular database ETF Descriptor Database is identified by the data in the tracking index column of the database. The data that feeds into the date column would be the date corresponding to the last trading day of the month, if the embodiment of the invention to create the enhanced index (universe) uses monthly data frequency or the last trading day of the week, if the embodiment of the method and invention to create the enhanced index (universe) uses weekly data frequency. The data row identifier constructs define the various ways the data in the identifier columns (and the tracking index column in the ETF Descriptor Database) in the various databases can be setup depending on the database and the type of row to which they impart unique identification to. FIG. 11A provides the schematic representation of a data row identifier construct, which defines the format of the data in the identifier column to identify rows associated with a sub-index underlying a broad-based index universe in tabular databases—Value Factors Database, Enriched Factors Database and Factor Scores Database. The rows associated with a sub-index underlying a broad-based index universe/benchmark by nature of the invention and its associated method would be seen only in all tabular databases other than the Enhanced Index Weights Database. FIG. 11B provides the schematic representation of a data row identifier construct, which defines the format of the data in the identifier column to identify rows associated with a broad-based index universe/benchmark in tabular database—Value Factors Database. The rows associated with a broad-based index universe/benchmark by nature of the invention and its associated method would be seen only in the tabular database—Value Factors Database. FIG. 11C provides the schematic representation of a data row identifier construct, which defines the format of the data in the identifier column to identify rows associated with a sub-index underlying an enhanced index (or index universe) in tabular database—Enhanced Index Weights Database. The rows associated with a sub-index underlying an enhanced index (or index universe) by nature of the invention and its associated method would be seen only in the tabular database Enhanced Index Weights Database. FIG. 11D provides the schematic representation of a data row identifier construct, which defines the format of the data in the tracking index column to identify unique data rows associated with a sub-index underlying an enhanced index universe or a broad-based index universe in tabular database—ETF Descriptor Database. When the data row identifier construct defined in FIG. 11A populates the identifier field of the Value Factors Database, Enriched Factors Database or Enriched Factor Scores Database, the identifier field along with the date field can be used to identify unique sub-index (underlying a broad-based index universe) data rows in their respective databases. When the data row identifier construct defined in FIG. 11B populates the identifier field of the Value Factors Database, the identifier field along with the date field can be used to identify unique broad-based index universe/benchmark data rows in the Value Factors Database. When the data row identifier construct defined in FIG. 11C populates the identifier field of the Enhanced Index Weights Database, the identifier field along with the date field can be used to identify unique sub-index (underlying an enhanced index universe) data rows in the Enhanced Index Weights Database. When the data row identifier construct defined in FIG. 11D populates the tracking index field of the Enhanced Index Weights Database, the tracking index field can be used to identify unique sub-index (underlying an enhanced index universe/broad-based index universe) data rows in the ETF Descriptor Database.

Using the example of MSCI ACWI ex US (All Countries World Index ex US) Index, a broad-based index universe/benchmark, and the example of MSCI Brazil Index, a country type of sub-index, underlying the broad-based index universe, the concept of data row identifier as explained in para [00033] and FIG. 11A thru FIG. 11D can be elucidated further. The format of the data in the identifier column in tabular database Value Factors Database to identify rows associated with a broad-based index universe/benchmark MSCI ACWI ex US Index would be MXWDU.MXWDU as explained in FIG. 11B—the first part and second part of the construct are made of the Bloomberg ticker name of MSCI ACWI ex US Index separated by a period. The format of the data in the identifier column in tabular databases—Value Factors Database, Enriched Factors Database and Enriched Factor Scores Database—to identify rows associated with the country type of sub-index MSCI Brazil Index underlying the broad-based MSCI ACWI ex US Index would be MXWDU.MXBR as explained in FIG. 11A—the first part and second part of the construct are made of the Bloomberg ticker names of MSCI ACWI ex US and MSCI Brazil respectively, separated by a period. FIGS. 12 thru 14, the sample representations of tabular databases Value Factors Database, Enriched Factors Database and Enriched Factor Scores Database, highlight the data row identifier constructs that feed into the identifier columns of the databases as described above and as defined in FIGS. 11A thru 11B. The constructs along with the date columns of those databases help impart uniqueness to each row in those databases.

The format of the data in the identifier column in tabular database—Enhanced Index Weights Database—to identify rows associated with the country type of sub-index MSCI Brazil Index underlying the enhanced index universe derived from the broad-based MSCI ACWI ex US Index using underlying country type of sub-indexes would be EXWDU.MXBR as explained in FIG. 11C—the first part and second part of the construct are made of the Bloomberg ticker names of MSCI ACWI ex US with its leading character replaced by 'E' (representing the ticker name for the newly created enhanced index universe) and the Bloomberg ticker name of MSCI Brazil Index respectively, separated by a period. FIG. 15, the sample representation of tabular databases Enhanced Index Weights Database, highlights the data row identifier construct that feeds in to the identifier column of the database as described above and as defined in FIG. 11C. The construct along with the date column of the database help impart uniqueness to each row in the database.

The format of the data in the tracking index column in tabular database—ETF Descriptor Database—to identify unique data rows associated with sub-indexes of any type (country, sector or industry) like for example MSCI Brazil Index, a country type of sub-index, would be MXBR as explained in FIG. 11D—the Bloomberg ticker name of the sub-index, which in this case of the example is MSCI Brazil Index. FIG. 16, the sample representation of tabular database ETF Descriptor Database, highlights the data row identifier construct that feeds in to the tracking index column of the database as described above and as defined in FIG. 11D to impart uniqueness to each row in the database.

The ticker names representing the indexes and sub-indexes used in the data row identifier constructs described in the paragraphs above are not limited to Bloomberg tickers alone, but tickers to represent the same used by data providers like Thomson Reuters or Compustat may also be used to implement the invention.

The steps associated with the enrichment application identified in para [00018] and as summarized in FIG. 2 elucidate the computation of plurality of enriched comparative value factors for a pre-determined type of sub-indexes underlying a pre-determined broad-based index universe/benchmark. Similarly, the steps associated with the portfolio builder application identified in para [00025] and FIG. 3 elucidate the creation of an enhanced index (and/or semi-active portfolio) derived from a pre-determined type of sub-indexes underlying a pre-determined broad-based index universe/benchmark using the enriched comparative value factors derived from the enrichment application, growth factors and correlation factors. The various data row identifier constructs described in para [000133] thru [000137] through a combination of identifier field and date field (for the case of tabular ETF Descriptor Database, it's only the tracking index field) enable to expand the method to generate plurality of enriched comparative value factors from a plurality of value factors (using current as well as historical values), as defined in the enrichment application, for a single type of plural sub-indexes underlying a given broad-based index universe/benchmark to all conceivable types of sub-indexes underlying all conceivable broad-based index universes/benchmarks The data row identifier constructs also enable to expand the creation of an enhanced index (universe) from a plurality of sub-indexes of a given type underlying a given broad-based index universe or a benchmark to a repository of all conceivable enhanced indexes derived from all conceivable types of sub-indexes underlying all possible underlying broad-based index universes or benchmarks. The database linking scheme using data row identifier constructs as depicted in FIG. 10 and FIGS. 11A thru 11D, and as defined in the invention ties up the non-relational tabular databases Value Factors Database, Enriched Factors Database, Factor Scores Database, Enhanced Index Weights Database and ETF Descriptor Database in to an integrated, singular (unitary) logical relational database without using indexes, primary keys and foreign keys, the key elements that make up a physical Relational Database Management System (RDBMS) like Oracle to enforce entity integrity and referential integrity. While the invention with all its embodiments is implemented on non-relational tabular databases residing on flat files, can be transitioned over to a RDMS as well without any obstacles, and in such a transition the logical relational database would transform in to a physical relational database with indexes, foreign keys and primary keys enforcing entity integrity and referential integrity.

By using the data row identifier construct defined in FIG. 11C, which populates the identifier field of the database Enhanced Index Weights Database, and the date field, the Enhanced Index Weights Database is able to populated with the historical weights of all sub-indexes underlying all conceivable enhanced indexes, which are derived from all conceivable types of sub-indexes underlying all conceivable broad-based index universes/benchmarks. By using the data row identifier construct defined in FIG. 11C, Enhanced Index Weights Database is transformed from a database housing historical index weights of sub-indexes underlying an enhanced index in to a repository housing historical index weights of all sub-indexes underlying all conceivable enhanced indexes derived from all conceivable sub-index types underlying all conceivable broad-based index universes/benchmarks. Transformation of Enhanced Index Weights Database in to enhanced indexes repository also made possible (as discussed in detail in this specification) by data row identifier constructs defined in FIG. 11A and FIG. 11B, which are applicable only to tabular Value Factors Database, tabular Enriched Factors Database and tabular Factor Scores Databases. These databases house the plurality of factors (enriched comparative value, growth and correlation) and their respective factor scores that are used to create enhanced indexes or enhanced index universes and whose constituent weights are defined in the Enhanced Index Weights Database.

The resulting semi-active portfolio can be used to create a closed-end fund, a separately managed account, or a unit investment trust. Furthermore, the enhanced index may be used as the basis for creating an index tracking fund like a traditional passive ETF or a mutual fund. The enhanced index or semi-active portfolio may also be used by top-down active portfolio managers as a benchmark or a model portfolio to further enhance and create low-expense top-down active equity portfolios. Active portfolio managers may overlay additional economic factors over the model semi-active portfolio and manage it actively. The semi-active portfolio can also be used to fill in gaps and further diversify "complete" active portfolios of stocks, bonds or separately managed accounts in a core-satellite approach, as part of an investor's overall investment profile and diversification strategy.

While the present technology has been elucidated with reference to certain embodiments, but it will be recognized by those skilled in investment and portfolio management that various changes may be made to the implementation and equivalents may be used instead without deviating from the scope of the invention. Moreover, many modifications may be made to adapt a particular situation or material to the implementations of the invention without diverging from its scope. Therefore, it is intended that the invention not be limited to the particular embodiment disclosed.

Various embodiments of the present invention instead of using individual factors from the groups of enriched comparative value factors, growth factors and correlation factors may use ratios of those various factors—ratios combining any of the enriched comparative value factors with any of the growth factors or value factors. One embodiment may, for example, include using the ratio of enriched comparative forward price-to-earnings ratio to enriched comparative trailing price-to-earnings ratio. Another embodiment may, for example, include using the ratio of forward price-to-earnings ratio to enriched comparative trailing price-to-earnings ratio.

What is claimed is:

1. A method of constructing an enhanced index comprises:
   pre-determining, by at least one processor, as of a selection date:
      capitalization weighted broad-based index benchmark, and
      sub-index type of plurality of sub-indexes underlying said broad-based index benchmark to be selected;
   selecting, by at least one processor, all sub-indexes of said sub-index type underlying said broad-based index benchmark;
   receiving into Value Factors Database, by at least one processor, as of said selection date, current as well as historical values of plurality of value factors of said broad-based index benchmark and said underlying sub-indexes;
   computing, by at least one processor, using said Value Factors Database, plurality of relative value factors from said corresponding plurality of value factors, current as well as historical values, of said sub-indexes;
   computing, by at least one processor, using said Value Factors Database, plurality of enriched comparative value factors from said corresponding plurality of relative value factors, current as well as historical values, of said sub-indexes;
   loading, by at least one processor, Enriched Factors Database, said values of enriched comparative value factors of said sub-indexes;
   computing, by at least one processor, using Enriched Factors Database:
      mean,
      volatility,
      upper bound, and
      lower bound,
      of said plurality of enriched comparative value factors, using a pre-selected rolling time-period, for said sub-indexes;
   adding, by at least one processor, to said tabular Enriched Factors Database current and historical values of plurality of growth factors and correlation factors for said sub-indexes;
   ranking, by at least one processor, said sub-indexes using said tabular Enriched Factors Database by:
      said plurality of enriched comparative value factors,
      said plurality of growth factors, and
      said plurality of correlation factors;
   loading, by at least one processor, said individual factor scores (ranks) of said sub-indexes to Factor Scores Database;
   deriving, by at least one processor, combined score for each sub-index of said sub-indexes by weight averaging said individual factor scores and storing them in said Factor Scores Database;
   computing, by at least one processor, using said Factor Scores Database, weight of each sub-index in said enhanced index and storing them in Enhanced Index Weights Database;
   receiving, by at least one processor, into ETF Descriptor Database attributes about long-only equity ETFs that passively track said sub-indexes.

2. The method of claim 1, wherein said pre-determined, broad-based index benchmark is at least one index of:
   MSCI family of equity indexes consisting of:
      MSCI All Cap Regional indexes,
      MSCI Investable Market Regional indexes,
      MSCI Standard Regional indexes,
      MSCI SMid Regional indexes,
      MSCI Small Cap+Micro Cap Regional indexes,
      MSCI Large Cap Regional indexes,
      MSCI Mid Cap Regional indexes,
      MSCI Regional Small Cap indexes,
      MSCI Regional Micro Cap indexes,
      MSCI All Cap Country indexes,
      MSCI Investable Market Country indexes,
      MSCI Standard Country indexes, MSCI Smid Country indexes,
MSCI Small Cap+Micro Cap Country indexes,
MSCI Large Cap Country indexes,
MSCI Mid Cap Country indexes,
MSCI Small Cap Country indexes, or
MSCI Micro Cap Country indexes;
S&P Dow Jones family of equity indexes consisting of:
S&P US Indexes,
S&P Global Indexes,
S&P Developed Indexes,
S&P Emerging Indexes,
S&P Regional Indexes, or
S&P Country Indexes; or
FTSE family of equity indexes consisting of:
FTSE Global Indexes, or
FTSE Regional Indexes.

3. The method of claim 1, wherein said sub-index type is at least one of:
GICS sector,
ICB sector,
GICS industry group,
GICS industry,
ICB industry,
GICS sub-industry,
ICB sub-sector,
ICB super sector,
country,
geographical region,
economic region,
style,
market cap, or
cap-cum-style.

4. The method of claim 1, wherein sum of market cap weights of said sub-indexes is 100% of said broad-based index benchmark.

5. The method of claim 1, wherein said plurality of value factors comprises at least one of:
trailing price-to-earnings ratio,
trailing price-to-earnings-to-growth (PEG) ratio,
trailing price-to-book-value ratio,
trailing enterprise-value-to-ebitda ratio,
trailing enterprise-value-to-ebit ratio,
trailing price-to-cash-flow ratio,
forward price-to-earnings ratio,
forward price-to-earnings-to-growth (PEG) ratio,
forward price-to-book-value ratio,
forward enterprise-value-to-ebitda ratio,
forward enterprise-value-to-ebit ratio,
forward price-to-sales ratio, or
forward price-to-cash-flow ratio.

6. The method of claim 1, wherein a relative value factor of said sub-indexes is the ratio of corresponding value factor of said sub-indexes to that of said broad-based index, and comprises at least one of:
relative trailing price-to-earnings ratio,
relative trailing price-to-earnings-to-growth (PEG) ratio,
relative trailing price-to-book-value ratio,
relative trailing enterprise-value-to-ebitda ratio,
relative trailing enterprise-value-to-ebit ratio,
relative trailing price-to-cash-flow ratio,
relative forward price-to-earnings ratio,
relative forward price-to-earnings-to-growth (PEG) ratio,
relative forward price-to-book-value ratio,
relative forward enterprise-value-to-ebitda ratio,
relative forward enterprise-value-to-ebit ratio,
relative forward price-to-sales ratio, or
relative forward price-to-cash-flow ratio.

7. The method of claim 1, wherein an enriched comparative value factor of said sub-indexes is the ratio of the corresponding relative factor to its average across trailing three years.

8. The method of claim 1, wherein the frequency of the data values of said plurality of value factors is at least one of:
monthly, as in data values at the end of last trading day of the month, or
weekly, as in data values at the end of last trading day of the week.

9. The method of claim 1, wherein:
said plurality of growth factors comprise at least one of:
twelve-month forward EPS (earnings per share) growth forecast,
long-term forward earnings growth rate,
long-term historical EPS growth trend,
average EPS growth for the trailing three years,
average EPS growth for the trailing two years,
EPS growth for the trailing 12 months,
trailing 3-month return,
trailing 6-month return,
real gross domestic product (GDP) growth forecast for the next 12 months,
average real gross domestic product (GDP) growth for the trailing three years,
average real gross domestic product (GDP) growth for the trailing two years,
real gross domestic product (GDP) growth for the trailing 12 months,
12-month change in the nominal US dollar exchange rate, or
12-month change in the real US dollar exchange rate;
said plurality of correlation factors comprise at least one of:
average correlation co-efficient of monthly returns for the trailing 3 years,
average correlation co-efficient of monthly returns for the trailing 5 years, or
average correlation co-efficient of monthly returns for the trailing 7 years; and
said plurality of enriched comparative value factors comprise at least one of:
enriched comparative trailing price-to-earnings ratio,
enriched comparative trailing price-to-earnings-to-growth (PEG) ratio,
enriched comparative trailing price-to-book value ratio,
enriched comparative trailing enterprise-value-to-ebitda ratio,
enriched comparative trailing enterprise-value-to-ebit ratio,
enriched comparative trailing price-to-cash-flow ratio,
enriched comparative forward price-to-earnings ratio,
enriched comparative forward price-to-earnings-to-growth (PEG) ratio,
enriched comparative forward price-to-book-value ratio,
enriched comparative forward enterprise-value-to-ebitda ratio,
enriched comparative forward enterprise-value-to-ebit ratio,
enriched comparative forward price-to-sales ratio, or
enriched comparative forward price-to-cash-flow ratio.

10. The method of claim 1, wherein the approach used to rank said sub-indexes by said plurality of enriched value factors, said plurality of growth factors, and said plurality of correlation factors is at least one of: percentile ranking, quartile ranking, quintile ranking, or Z-score ranking.

11. The method of claim 1, wherein combined factor score of each said sub-index is derived from its said plurality of factor scores by equal weighting said plurality of factor scores.

12. The method of claim 1, wherein said rolling time-period for computing the properties namely mean, upper bound, and lower bound of said enriched comparative value factors is at least one of: 7 years or 10 years.

13. The method of claim 1, wherein:
said mean of enriched comparative value factor is its average across trailing said rolling time-period of full calendar years;
said volatility of enriched comparative value factor is its standard deviation across trailing said rolling time-period of full calendar years;
said upper bound of an enriched comparative value factor is the sum of its mean and volatility; and
said lower bound of an enriched comparative value factor is deduction of its volatility from its mean.

14. The method of claim 1, wherein:
If value of an enriched comparative value factor of a sub-index is above its Upper Bound, then said sub-index is over-valued in terms of said enriched comparative value factor;
If value of an enriched comparative value factor of a sub-index is below its Lower Bound, then said sub-index is under-valued in terms of said enriched comparative value factor; and
If value of an enriched comparative value factor of a sub-index is with in Upper Bound and Lower Bound, then said sub-index is fairly-valued in terms of said enriched comparative value factor.

15. The method of claim 1, wherein sum of weights of said sub-indexes in said enhanced index is 100.

16. The method of claim 1, wherein the method further comprising:
creating, by at least one processor, an unique data row identifier construct to identify data rows of a sub-index underlying a broad-based index benchmark in:
said Value Factors Database,
said Enriched Factors Database, and
said Factor Scores Database,
by populating the identifier fields of said rows of said databases with said broad-based index benchmark ticker name and said underlying sub-index ticker name separated by a period;
which allows for:
accumulating, by at least one processor, of historical data rows in Value Factors Database of:
sub-indexes of various sub-index types underlying various broad-based index benchmarks, and
various broad-based index benchmarks; and
accumulating, by at least one processor, of historical data rows in Enriched Factors Database and Factor Scores Database of:
sub-indexes of various sub-index types underlying various broad-based index benchmarks;
creating, by at least one processor, an unique data row identifier construct to identify data rows of a sub-index underlying an enhanced index benchmark in:
said Enhanced Index Weights Database,
by populating the identifier field of said rows of said database with said enhanced ticker name and said underlying sub-index ticker name separated by a period;
which allows for:
accumulating, by at least one processor, historical data rows in Enriched Index Weights Database of:
sub-indexes underlying various enhanced indexes;
creating, by at least one processor, an unique data row identifier construct to identify data rows of a sub-index underlying an enhanced index benchmark or broad-based index benchmark in:
said ETF Descriptor Database,
by populating the identifier field of said rows of said database with said sub-index ticker name;
integrating, by at least one processor, said databases, by linking them, using said data row identifier constructs into a single logical relational database, which:
follows the integrity rules that govern commercially available relational databases comprising of:
entity integrity, and
referential integrity, and
forms an enhanced indexes repository.

17. The method of claim 16, data rows of a said sub-index on a specific date in:
said Value Factors Database,
said Enriched Factors Database,
said Factor Scores Database, or
said Enhanced Index Weights Database,
identified by conjoining identifier and date fields of said rows.

18. The method of claim 16, wherein ticker names are sourced from at least one of:
Bloomberg,
Thomson Reuters,
Compustat, or
Factset.

19. The method of claim 16, wherein different enhanced indexes derived from a single broad-based index benchmark are distinctly named by replacing the first letter of the ticker name of said broad-based index benchmark by at least one of:
A thru Z, or
0 thru 9.

20. A system of assembling a commercial repository of enhanced indexes comprising: at least one processor; and a non-transitory computer readable medium configured to store: tabular Value Factors Database, tabular Enriched Factors Database, tabular Factor Scores Database, tabular Enhanced Index Weights Database, and tabular ETF Descriptor Database, on fixed-length flat files without the oversight of a relational database management system (RDBMS) based on at least one of: Oracle, IBM DB2, or Microsoft SQL Server; wherein said at least one processor is configured: to create an unique data row identifier construct to identify data rows of a sub-index underlying a broad-based index benchmark in: said Value Factors Database, said Enriched Factors Database, and said Factor Scores Database, by populating the identifier fields of said rows of said databases with said broad-based index benchmark ticker name and said underlying sub-index ticker name separated by a period; which allows to: accumulate historical data rows in Value Factors Database of: sub-indexes of various sub-index types underlying various broad-based index benchmarks, and various broad-based index benchmarks; and accumulate historical data rows in Enriched Factors Database and Factor Scores Database of; sub-indexes of various sub-index types underlying various broad-based index benchmarks; to create an unique data row identifier construct to identify data rows of a sub-index underlying an enhanced index benchmark in: said Enhanced Index Weights Database, by populating the identifier field of said rows of said database with said enhanced ticker name and said underlying sub-index ticker name separated by a period; which allows to: accumulate, by at least one processor, historical data rows in Enriched Index Weights Database of: sub-indexes underlying various enhanced indexes; to create an unique data row identifier construct to identify data rows of a sub-index underlying an enhanced index benchmark or broad-based index benchmark in: said ETF Descriptor Database, by populating the identifier field of said rows of said database with said sub-index ticker name; and to integrate said databases, by linking them, using said data row identifier constructs into a single logical relational database, which: follows the integrity rules that govern commercially available relational databases comprising of: entity integrity, and referential integrity, and forms an enhanced indexes repository.

* * * * *